US012175820B2

(12) United States Patent
Hamada

(10) Patent No.: US 12,175,820 B2
(45) Date of Patent: Dec. 24, 2024

(54) MEDIUM HANDLING DEVICE

(71) Applicant: Glory Ltd., Himeji (JP)

(72) Inventor: Takuro Hamada, Himeji (JP)

(73) Assignee: GLORY LTD., Himeji (JP)

( * ) Notice: Subject to any disclaimer, the term of this patent is extended or adjusted under 35 U.S.C. 154(b) by 308 days.

(21) Appl. No.: 17/493,861

(22) Filed: Oct. 5, 2021

(65) Prior Publication Data

US 2022/0108580 A1 Apr. 7, 2022

(30) Foreign Application Priority Data

Oct. 7, 2020 (JP) ................................ 2020-169495

(51) Int. Cl.
*G07D 11/13* (2019.01)
*G07D 11/14* (2019.01)
*G07D 11/40* (2019.01)

(52) U.S. Cl.
CPC ............. *G07D 11/13* (2019.01); *G07D 11/14* (2019.01); *G07D 11/40* (2019.01); *G07D 2211/00* (2013.01)

(58) Field of Classification Search
CPC ........ G07D 11/13; G07D 11/14; G07D 11/40; G07D 2211/00; G07D 11/10; G07D 11/12; G07D 11/125; B65H 2402/441; B65H 2404/623; B65H 75/4463; B65H 2701/1912; B65H 2301/4314; E05B 13/101; E05B 47/0676
See application file for complete search history.

(56) References Cited

U.S. PATENT DOCUMENTS

| | | | | | |
|---|---|---|---|---|---|
| 5,068,758 | A * | 11/1991 | Choi | G11B 15/67584 | |
| 5,999,364 | A * | 12/1999 | Aoki | G11B 15/67565 | |
| 6,014,649 | A * | 1/2000 | Kobayashi | G07D 11/245 | 705/42 |
| 6,371,303 | B1 * | 4/2002 | Klein | G07D 11/10 | 271/186 |
| 7,516,633 | B1 * | 4/2009 | Chang | E05B 13/101 | 70/279.1 |
| 8,567,585 | B2 * | 10/2013 | Okamura | G07D 11/25 | 194/216 |
| 8,689,962 | B2 * | 4/2014 | Mizoro | G07D 11/50 | 194/350 |

(Continued)

FOREIGN PATENT DOCUMENTS

| | | | |
|---|---|---|---|
| EP | 3 032 506 | A1 | 6/2016 |
| JP | 6088453 | B2 | 3/2017 |

(Continued)

OTHER PUBLICATIONS

English Translation of WO 2012066730 A1 (Year: 2012).*

*Primary Examiner* — Jeffrey A Shapiro
(74) *Attorney, Agent, or Firm* — XSENSUS LLP

(57) ABSTRACT

A medium handling device includes a first portion having a first transport, a recognition circuit, and a connection port to a first transport path; a second portion having an internal storage; and a third portion having a mounter to which an external cassette is detachably mounted, and a second transport that transports a medium along a second transport path. At least a part of the third portion is supported by the second portion on an outside of the second portion, and the second transport is moved to connect to the first transport path via the connection port when the third portion is used.

21 Claims, 30 Drawing Sheets

(56) References Cited

U.S. PATENT DOCUMENTS

| | | | | |
|---|---|---|---|---|
| 8,708,127 | B2 * | 4/2014 | Roosch | G07D 11/245 109/58 |
| 9,474,394 | B2 * | 10/2016 | Komatsu | A47B 96/00 |
| 9,499,359 | B2 * | 11/2016 | Jeong | B65H 1/266 |
| 10,109,134 | B2 * | 10/2018 | Jeong | G07D 11/50 |
| 10,339,744 | B2 * | 7/2019 | Lee | G07D 11/135 |
| 11,508,200 | B2 * | 11/2022 | Yokawa | G07D 11/12 |
| 2004/0031661 | A1 * | 2/2004 | Richard | G07D 11/125 194/247 |
| 2005/0189266 | A1 * | 9/2005 | Fujita | G07F 19/205 209/534 |
| 2006/0081441 | A1 * | 4/2006 | Vysma | G07F 1/04 194/206 |
| 2012/0012435 | A1 * | 1/2012 | Roosch | G07D 11/40 194/206 |
| 2014/0217669 | A1 * | 8/2014 | Aoji | B65H 31/24 271/297 |
| 2015/0243119 | A1 * | 8/2015 | Hayashi | G07D 11/14 194/206 |
| 2015/0307306 | A1 * | 10/2015 | Kadota | B65H 29/52 271/3.19 |
| 2018/0108200 | A1 * | 4/2018 | Kojima | B65H 29/22 |
| 2019/0279453 | A1 * | 9/2019 | Yokoo | B65H 29/46 |

FOREIGN PATENT DOCUMENTS

| | | | | |
|---|---|---|---|---|
| KR | 102012349 | B1 | 8/2019 | |
| WO | WO-2012066730 | A1 * | 5/2012 | G07D 11/50 |

* cited by examiner

MEDIUM HANDLING DEVICE

CROSS-REFERENCE TO RELATED APPLICATION

This application claims priority to Japanese Patent Application No. 2020-169495 filed on Oct. 7, 2020, the entire disclosure of which is incorporated herein by reference.

BACKGROUND

Conventionally, a banknote handling apparatus includes an external cassette and an external transport device. The external cassette is placed on a placement part provided outside a housing of the banknote handling apparatus. The transport device is detachably attached to the banknote handling apparatus. The transport device attached to the banknote handling apparatus connects the external cassette and an internal transport path of the banknote handling apparatus.

At a time of replenishing banknotes, the transport device transports the banknotes in the external cassette from the external cassette into the banknote handling apparatus. At a time of collecting the banknotes, the transport device transports the banknotes in the banknote handling apparatus from the banknote handling apparatus to the external cassette.

SUMMARY

The technique disclosed herein relates to a medium handling device. This medium handling device includes a first portion having a first transport, a recognition circuit, and a connection port to a first transport path; a second portion having an internal storage; and a third portion having a mounter to which an external cassette is detachably mounted, and a second transport that transports a medium along a second transport path. At least a part of the third portion is supported by the second portion on an outside of the second portion, and the second transport is moved to connect to the first transport path via the connection port when the third portion is used.

DETAILED DESCRIPTION OF THE DRAWINGS

Figure 1:
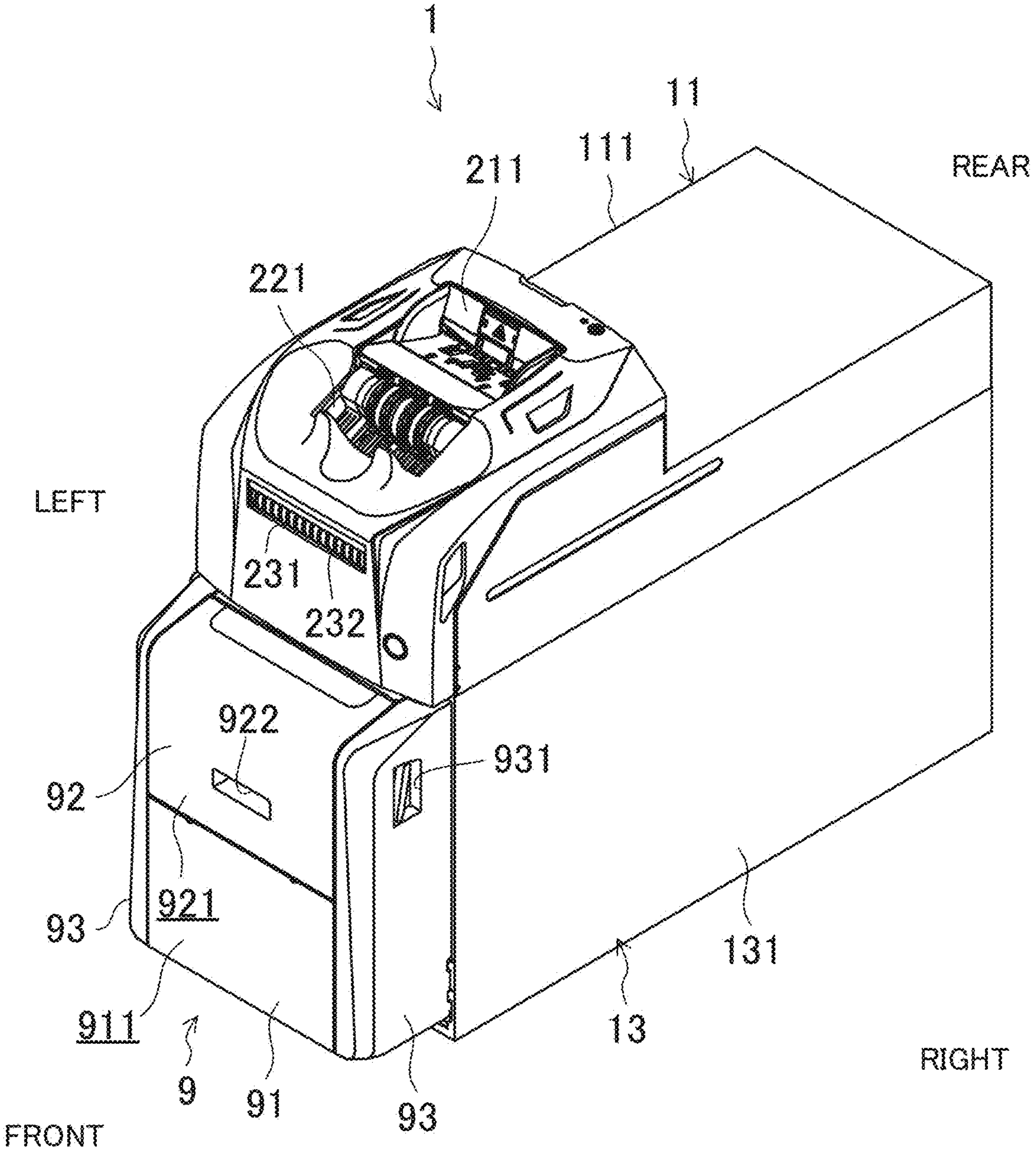
FIG. 1 is a perspective view illustrating an appearance of a banknote handling device.

In a conventional banknote handling apparatus, an operator needs to attach a transport device to the banknote handling apparatus in a case of using an external cassette. Further, the operator needs to detach the transport device from the banknote handling apparatus in a case of not using an external cassette. This makes work by the operator complicated. Therefore, the usability of such a banknote handling apparatus is not good.

The technique disclosed herein relates to a medium handling device. This medium handling device includes: a first unit having a first transport unit that transports a medium along a first transport path, a recognition unit that recognizes the medium that has been transported by the first transport unit, and a connection port to the first transport path; a second unit having an internal storage unit that stores the medium to be transported to or from the first unit; and a third unit having a mounter on which an external cassette that stores the medium is mounted and a second transport unit that transports the medium along a second transport path between the external cassette and the first transport unit. At least a part of the third unit is supported by the second unit on an outside of the second unit, and the second transport unit is moved to connect to the first transport path via the connection port when the third unit is used.

The third unit having the second transport unit is supported by the second unit. An operator does not attach or detach the third unit to or from the medium handling device.

The third unit may have a link mechanism that moves the second transport unit between a state in which the second transport path connects to the first transport path and a state in which the second transport path does not connect to the first transport path.

The operator can easily connect and disconnect the second transport unit to and from the first transport unit.

The first unit may be positioned above the second unit, and the third unit may be positioned on a lateral side of the second unit, and the second transport unit may move upward from the lateral side of the second unit to connect the second transport path to the first transport path.

The operator can easily move the second transport unit.

The mounter may deform in conjunction with a movement of the second transport unit.

The mounter deforms when the third unit is used and when the third unit is not used.

The mounter may deform from a state that does not allow mounting of the external cassette to a state that allows mounting of the external cassette, in conjunction with the movement of the second transport unit so as to connect the second transport path to the first transport path.

When the operator moves the second transport unit, the operator is able to mount the external cassette on the mounter that has been deformed. This simplifies the operation by the operator.

After the second transport unit moves, the external cassette mounted on the mounter may be disposed in a space of the second transport unit before the movement of the second transport unit.

The third unit is compact both with and without the external cassette.

The third unit further may include a coupling mechanism that couples the second transport unit to the mounter, and transmits a movement of the second transport unit to the mounter, and the coupling mechanism may have a torque limiter provided between the second transport unit and the mounter.

The torque limiter releases coupling of the second transport unit and the mounter, when the mounter interferes with something while the operator moves the second transport unit. The operator can smoothly move the second transport unit.

The second transport unit may reciprocate in a curved manner around a first axis extending in a horizontal direction, and the mounter may swing about a second axis parallel to the first axis.

The first transport path may include a first engagement part arranged at the connection port, the second transport path may include a second engagement part that engages with the first engagement part, the connection port may be positioned on a side face of the first unit, the second engagement part may engage with the first engagement part by having the second transport unit approach the connection port in substantially horizontal direction.

The moving second transport path is suitably connected to the first transport path. The operator can easily connect the second transport path to the first transport path.

The mounter may move in a direction away from the second unit to be in the state that allows mounting of the external cassette.

When the external cassette is not used, the mounter is positioned near the second unit, which can cause the medium handling device to be compact.

The second unit may include an opening/closing door, and the third unit may be located at a position covering the opening/closing door.

The third unit also serves as a cover for the opening/closing door. This increases security of the medium handling device.

The third unit may be supported by the second unit so as to move from a position covering the opening/closing door to a position where the opening/closing door is exposed.

The operator can open and close the opening/closing door by moving the third unit.

The second transport path may be opened when the third unit is positioned at the position where the opening/closing door is exposed.

Even if the medium is jammed in the second transport path, the operator can remove the jammed medium by opening the second transport path.

The third unit may include a first handle operated when the second transport unit is moved away from the mounter, and a second handle operated when the third unit is moved without moving the second transport unit away from the mounter.

The operator can use the two handles to operate the third unit.

The third unit may lock the second handle when the first handle is operated, and may lock the first handle when the second handle is operated.

Since the operator cannot simultaneously operate both the first handle and the second handle, an erroneous operation is suppressed.

The third unit may further include a release switch, and the first handle may be operable after the release switch is operated.

The release switch suppresses erroneous operations.

The first unit may further include a shutter provided at the connection port, and the shutter may operate based on a signal of a sensor that detects an operation of the first handle.

Since the shutter automatically opens when the first handle is operated, the operation by the operator is simplified.

The mounter may have a first surface, the second transport unit may have a second surface, the first surface and the second surface may be substantially continuous without a step in a non-using state of the third unit, and the first surface and the second surface may not be continuous in a using state of the third unit.

The first surface and the second surfaces being continuous enhance the good appearance of the medium handling device.

The first surface may cover at least a part of the external cassette, while the external cassette is mounted on the mounter.

The first surface protects the external cassette.

In the non-using state of the third unit, the third unit may protrude from the outer surface of the first unit.

For example, in a case where the second unit is pulled out toward the third unit side for the purpose of maintenance of the second unit, if the first unit protrudes from the outer surface of the third unit, the amount of pulling out of the second unit increases. With the above-described configuration, the amount of the second unit pulled out toward the third unit can be reduced.

The internal storage unit may include an internal cassette and a second mounter on which the internal cassette is detachably mounted, and the external cassette may be mountable on the second mounter.

The external cassette can be diverted to the internal cassette.

Hereinafter, exemplary embodiments of a medium handling device will be described with reference to the drawings. The medium handling devices described herein are exemplary.

(First Configuration)

Figure 24:
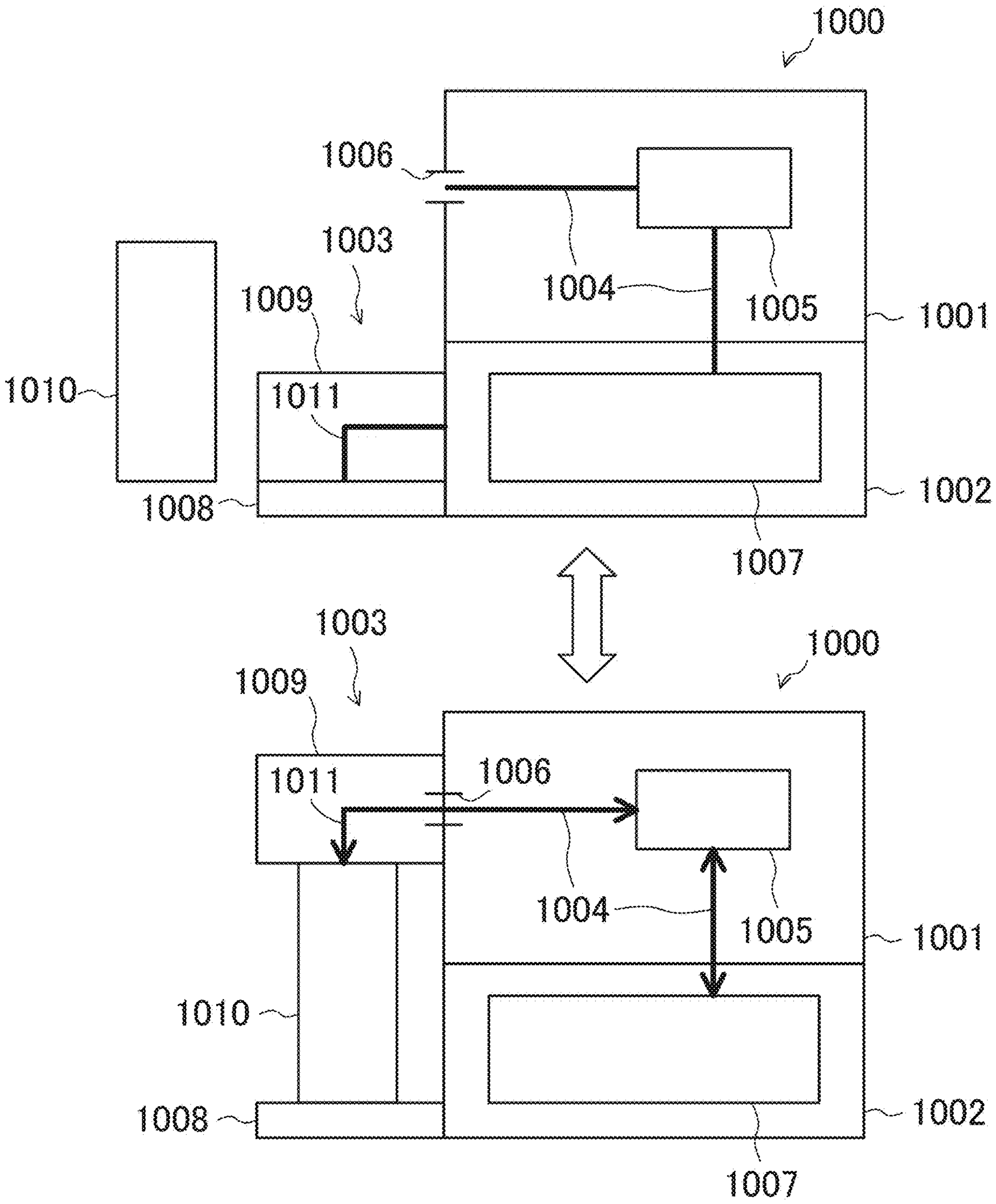
FIG. 24 illustrates an exemplary medium handling device.

FIG. 24 illustrates an exemplary medium handling device 1000. The medium handling device 1000 handles a medium. The medium handling device 1000 includes a first unit 1001, a second unit 1002, and a third unit 1003. Additionally, in one aspect, it should be appreciated that the term unit in reference to a first, second, and/or third unit of the medium handling device can correspond to a predetermined physical portion of the medium handling device 1000 (or medium handling device 1).

The first unit 1001 includes a first transport unit that transports the medium along the first transport path 1004, and an identification unit 1005 that identifies the medium transported by the first transport unit. On the outer surface of the first unit 1001, a connection port 1006 to the first transport path 1004 is provided.

The second unit 1002 is provided with an internal storage unit 1007. The internal storage unit 1007 stores the medium to be transported from the first unit 1001 or to the first unit 1001.

The third unit 1003 includes a mounter 1008 and a second transport unit 1009. On the mounter 1008, an external cassette 1010 storing a medium is detachably mounted. The second transport unit 1009 transports the medium along the second transport path 1011 between the external cassette 1010 and the first transport unit. At least a part of the third unit 1003 is attached to the second unit 1002 outside the second unit 1002.

The upper view of FIG. 24 shows a state in which the third unit 1003 is not used. The lower view of FIG. 24 shows a state in which the third unit 1003 is used. The second transport unit 1009 moves when the third unit 1003 is used. This way, the second transport path 1011 is connected to the first transport path 1004 via the connection port 1006. This improves usability of the medium handling device 1000.

(Second Configuration)

FIG. 1 shows an appearance of a banknote handling device 1 which is an example of the medium handling device. The banknote handling device 1 is a modification of the medium handling device 1000 of FIG. 24.

The banknote handling device 1 handles banknotes as media. More specifically, the banknote handling device 1 handles loose notes. The banknote handling device 1 is installed in, for example, a financial institution such as a bank. The banknote handling device 1 is installed in, for example, a teller counter in a bank. The banknote handling device 1 performs various processes including a depositing process and a dispensing process.

Generally, the banknote handling device 1 is elongated in the front-rear direction. A front of the banknote handling device 1 refers to a portion where an inlet 211 and an outlet 221, which will be described later, are formed. A rear of the banknote handling device 1 refers to a portion opposite to the portion where the inlet 211 and the outlet 221 are formed.

The banknote handling device 1 may be shared by two tellers. The two tellers are positioned on both right and left sides of the banknote handling device 1. Note that a right-left direction of the banknote handling device 1 is a direction orthogonal to the front-rear direction. The left and right sides are based on a direction facing the front surface of the banknote handling device 1.

The banknote handling device 1 may be installed in, for example, a back office of a retail store, in addition to a financial institution.

(Overall Configuration of Banknote Handling Device)

Figure 2:
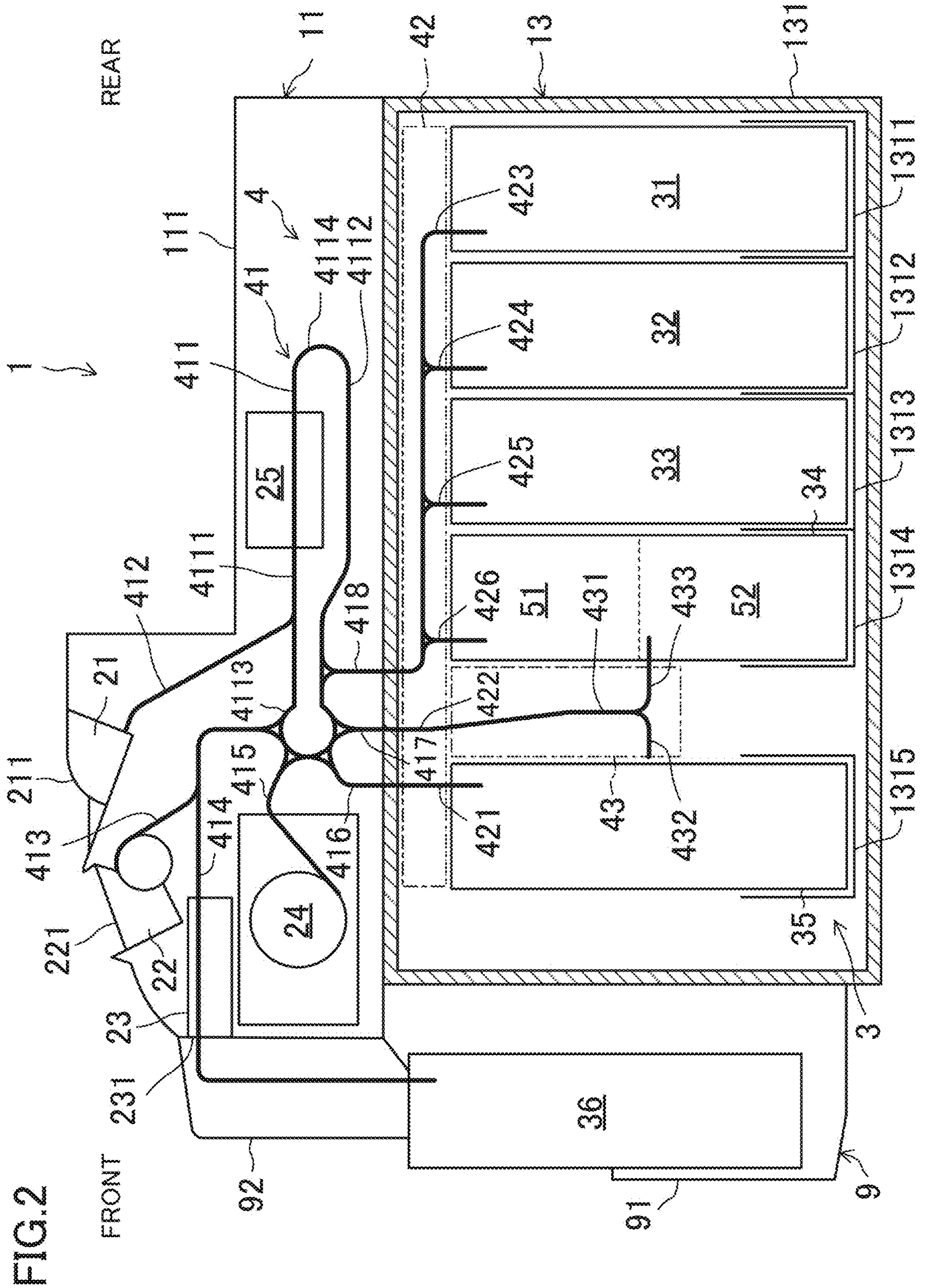
FIG. 2 is a diagram illustrating an internal configuration of the banknote handling device.
Figure 3:
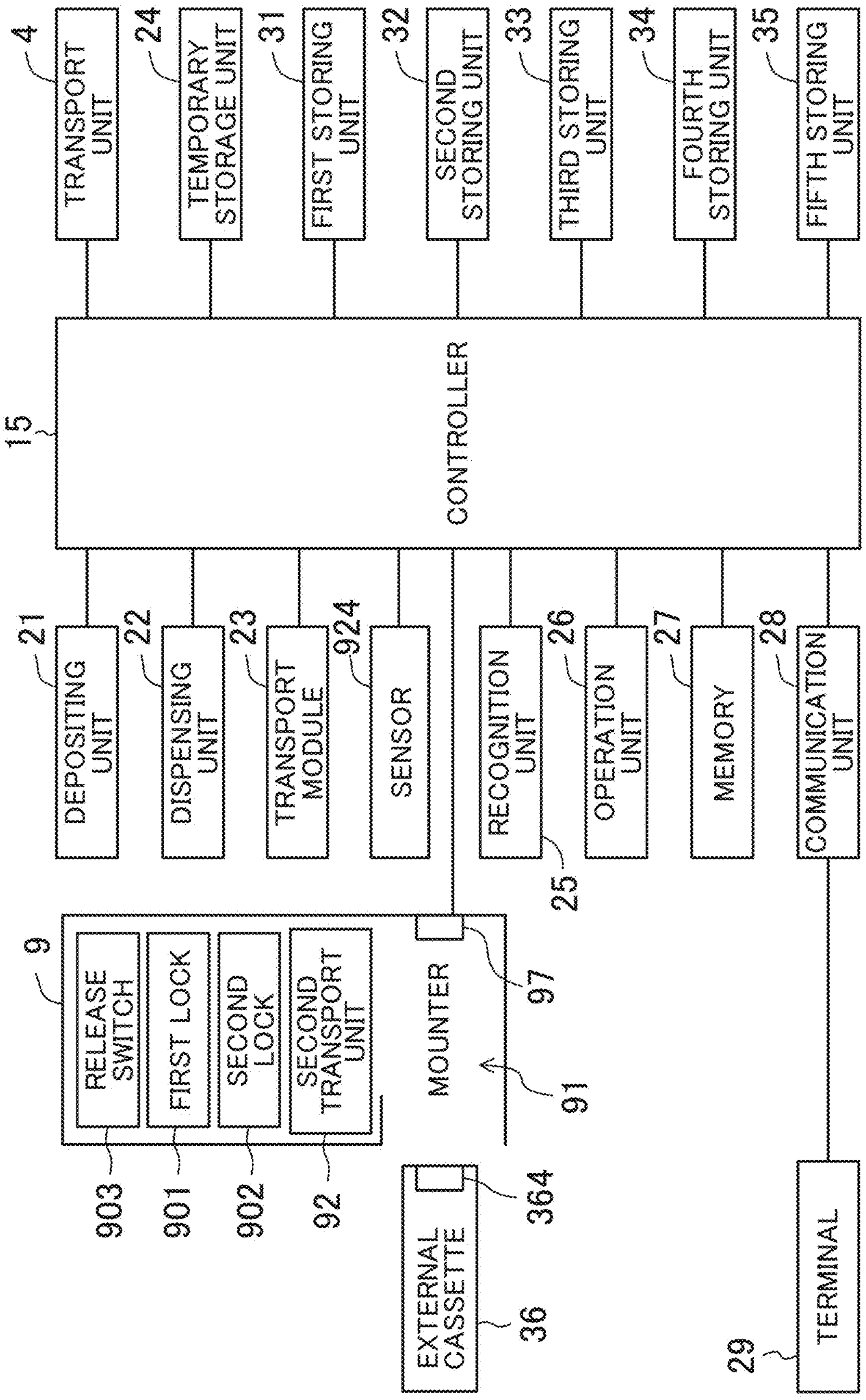
FIG. 3 is a block diagram illustrating a configuration of the banknote handling device.

FIG. 2 illustrates the internal configuration of the banknote handling device 1. FIG. 3 is a block diagram illustrating a configuration of the banknote handling device 1. The banknote handling device 1 includes an upper handling unit 11 and a lower safe unit 13.

The handling unit 11 is comprised of an upper housing 111. In the upper housing 111, a depositing unit 21, a dispensing unit 22, a transport module 23, a temporary storage unit 24, a recognition unit 25, and an upper transport unit 41 are disposed. The upper transport unit 41 is a part of a transport unit 4. In an exemplary implementation, the recognition unit 25 includes circuitry (e.g., an imaging device).

The safe unit 13 is comprised of a safe housing 131. In the safe housing 131, a plurality of storing units 31 to 35, a lower transport unit 42, and a second lower transport unit 43 are disposed. The lower transport unit 42 and the second lower transport unit 43 are a part of the transport unit 4. The safe housing 131 protects the storing units 31 to 35 at a security level equal to or higher than a predetermined level. The security level of the safe housing 131 is higher than that of the upper housing 111. The safe unit 13 is an example of the second unit in which the storing units 31 to 35, which are internal storage units, are arranged. FIG. 2 shows an example where the storing units 31 to 35 are each a cassette.

Figure 7:
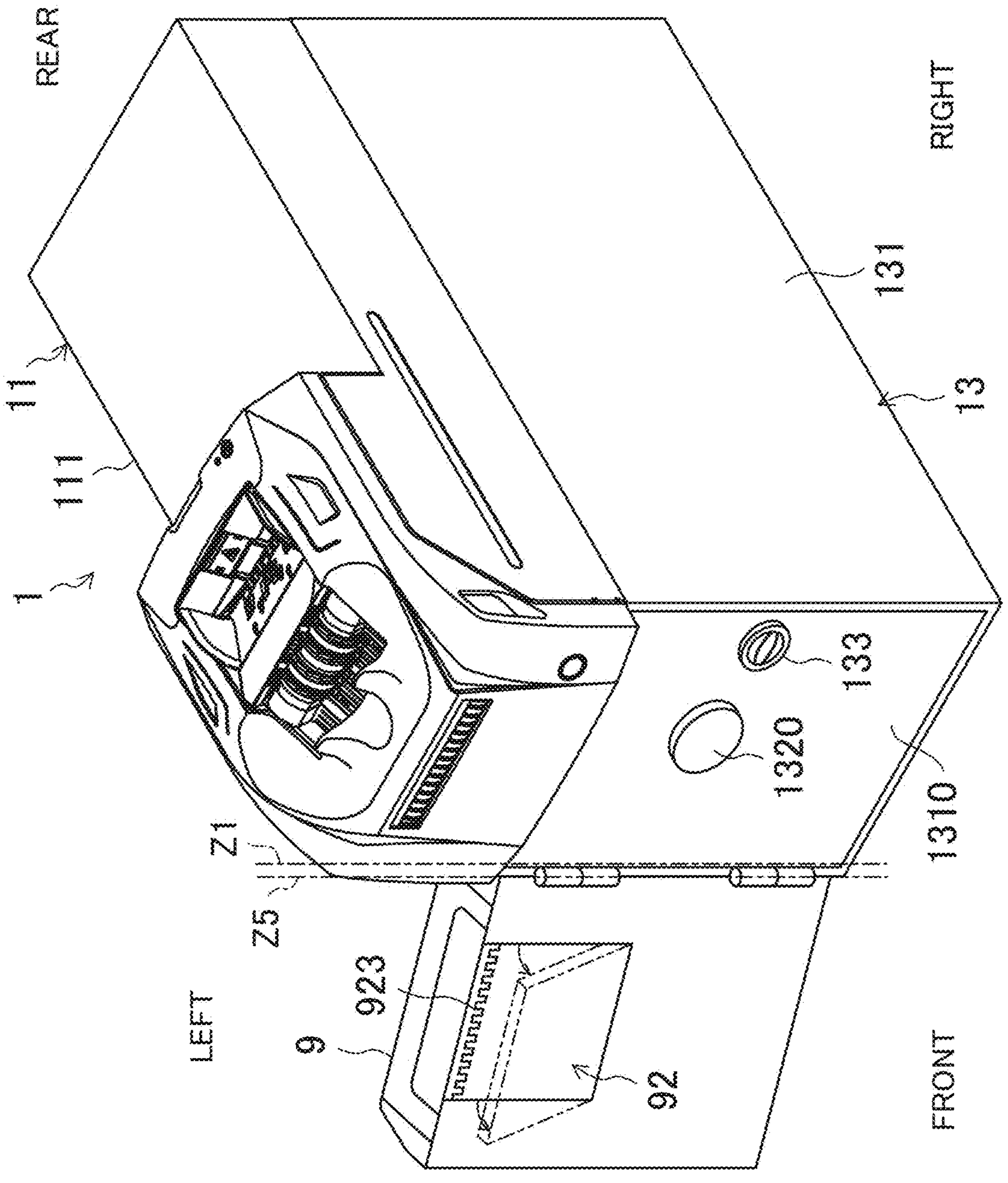
FIG. 7 is a view showing a retracted state in which the mounting unit is rotated.

The safe housing 131 has a door 1310 on its front portion (see FIG. 7). When the door 1310 is opened, the operator can pull out the storing units 31 to 35, the lower transport unit 42, and the second lower transport unit 43 forward from the safe housing 131. The door 1310 is provided with an electronic lock 1320. The operator can open the door 1310 by unlocking the electronic lock 1320.

The banknote handling device 1 is configured to allow a use of an external cassette 36. The banknote handling device 1 includes a mounting unit 9. The external cassette 36 is detachably attached to the mounting unit 9. The mounting unit 9 is an example of the third unit. The structure of the mounting unit 9 will be described in detail later.

The depositing unit 21 is a portion of the device into which the banknotes to be deposited are placed, for example, in a depositing process. The depositing unit 21 has the inlet 211. The inlet 211 opens upward at a front portion of the upper housing 111. The operator manually inserts the banknotes into the depositing unit 21 through the inlet 211. The depositing unit 21 is capable of holding a plurality of banknotes while the banknotes are stacked. The depositing unit 21 has a mechanism that takes the banknotes one by one into the banknote handling device 1.

The dispensing unit 22 is a portion of the device to which banknotes fed from the storing unit are transported, for example, in a dispensing process. The dispensing unit 22 is capable of holding a plurality of banknotes while the banknotes are stacked. The dispensing unit 22 has the outlet 221. The outlet 221 opens upward at a position closer to the front than the inlet 211. The operator can manually remove the banknotes stacked in the dispensing unit 22 through the outlet 221. The outlet 221 may be provided with a shutter which opens and closes.

The transport module 23 transports a banknote. The transport module 23 is disposed in the front portion of the upper housing 111. To the transport module 23, the mounting unit 9 is connected. The handling unit 11 has a connection port 231. The connection port 231 opens forward at the front portion of the upper housing 111. In the connection port 231, a first engagement part 232 of the transport module 23 is disposed. The transport module 23 includes a shutter 70. The shutter 70 opens and closes the connection port 231. FIG. 1 shows a state in which the shutter 70 is open. When the shutter 70 is opened, a second engagement part 923 (see FIG. 7 and FIG. 15) of the later-described mounting unit 9 can engage with the first engagement part 232 via the connection port 231. The transport module 23 and the mounting unit 9 are connected to each other.

As indicated by a thick solid line in FIG. 2, the transport module 23 has a transport path. The transport path connects the mounting unit 9 and a later described fourth transport path 414 together. As will be described later, the banknote transported from the mounting unit 9 is transported toward the fourth transport path 414 along the transport path of the transport module 23. Further, the banknote transported from the fourth transport path 414 is transported toward the mounting unit 9 along the transport path of the transport module 23.

The temporary storage unit 24 can temporarily store banknotes to be deposited, for example, during a depositing process. The temporary storage unit 24 can also temporarily store banknotes that have not been determined to be proper banknotes during, for example, a replenishing process or a collection process. The temporary storage unit 24 can feed the stored banknotes. The temporary storage unit 24 is disposed at a front position in the upper housing 111. The temporary storage unit 24 is disposed below the transport module 23. The temporary storage unit 24 is a tape-winding storing unit. The temporary storage unit 24 stores the banknotes by wrapping them around a drum together with a tape. The tape-winding storing unit is advantageous because the order of banknotes does not change when the banknotes are stored and fed. Further the tape-winding storing unit is also advantageous because it is capable of storing mixed banknotes of various sizes. A known configuration of the tape-winding storing unit may be employed as the temporary storage unit 24.

The recognition unit 25 is disposed in a later described first transport path 411. The recognition unit 25 recognizes at least whether each banknote being transported through the first transport path 411 is authentic or not, a denomination of each banknote, or whether each banknote is fit or unfit. The recognition unit 25 further acquires a serial number of each of the banknotes.

The handling unit 11 is an example of the first unit having the transport unit 4 that transports the banknote along the transport path and the recognition unit 25 that recognizes the banknote transported by the transport unit 4, and having the connection port 231 to the transport path on the outer surface.

The banknote handling device 1 includes a first storing unit 31, a second storing unit 32, a third storing unit 33, a fourth storing unit 34, and a fifth storing unit 35. The first storing unit 31, the second storing unit 32, the third storing unit 33, the fourth storing unit 34, and the fifth storing unit 35 are linearly aligned in the front-rear direction inside the safe housing 131.

The safe housing 131 is provided with fitting parts 1311 to 1315. The first fitting part 1311, the second fitting part 1312, the third fitting part 1313, the fourth fitting part 1314, and the fifth fitting part 1315 are provided in this order from the rear to the front of the device inside the safe housing 131. The storing units 31 to 35 have the same outer dimensions. Each of the storing unit 31 to 35 can be detachably attached to the fitting parts 1311 to 1315, respectively.

The first to third and fifth storing units 31 to 33 and 35 have the same configuration. Each of the storing units 31 to 33 and 35 is a stack-type storing unit. The stacking storing unit stores banknotes by stacking them. Each of the first to third and fifth storing units 31 to 33 and has one storage. Each of the first to third and fifth storing units 31 to 33 and 35 has inlet/outlet port at its upper end. The inlet/outlet port is connected to a later-described transport path or branches. The first to third and fifth storing units 31 to 33 and 35 also have a transport mechanism. The transport mechanism supplies the banknotes from the outside to the inside of the storing unit through the inlet/outlet port and stores the banknotes in the storage. The transport mechanism also ejects the banknotes stored in the storage out of the storing unit through the inlet/outlet port.

The fourth storing unit 34 has two storages, that is, an upper storage 51 and a lower storage 52. The upper storage 51 is provided on an upper side. The lower storage 52 is provided under the upper storage 51. The upper storage 51 and the lower storage 52 are independent from each other. An inlet/outlet port is provided in each of the upper end surface and a side face of the fourth storing unit 34. The inlet/outlet port of the upper end surface is an inlet/outlet port for the upper storage 51. The inlet/outlet port of the side face is an inlet/outlet port for the lower storage 52. The fourth storing unit 34 includes a first transport mechanism for the upper storage 51 and a second transport mechanism for the lower storage 52. The fourth storing unit 34 is capable of storing banknotes in the upper storage 51 and feeding the banknotes from the upper storage 51, and is also capable of storing banknotes in the lower storage 52 and feed the banknotes from the lower storage 52.

The first storing unit 31, the second storing unit 32, the third storing unit 33, and the fourth storing unit 34 store the banknotes of different denominations. The first storing unit 31, the second storing unit 32, the third storing unit 33, and the fourth storing unit 34 store the banknotes to be dispensed. The fifth storing unit 35 stores the banknotes that are not stored in the first storing unit 31, the second storing unit 32, the third storing unit 33, and the fourth storing unit 34. The fifth storing unit 35 may not store banknotes to be dispensed. The fifth storing unit 35 may also store the banknotes to be collected from the banknote handling device 1.

The transport unit 4 transports the banknotes one by one at intervals in the banknote handling device 1. The transport unit 4 has a transport path. The transport path is comprised of a combination of a large number of rollers, a plurality of belts, a motor for driving the rollers, and a plurality of guides. The transport unit 4 conveys the banknotes, for example, with their long edges facing forward. The transport unit 4 may transport the banknotes with their short edges facing forward.

The transport unit 4 includes the upper transport unit 41, the lower transport unit 42, and the second lower transport unit 43. The upper transport unit 41 is disposed in the upper housing 111, as mentioned above. The lower transport unit 42 and the second lower transport unit 43 are disposed in the safe housing 131. Note that three transport paths pass through an upper wall defining the safe housing 131 in the up-down direction. Each of the three transport paths connects the upper transport unit 41 to the lower transport unit 42.

The upper transport unit 41 includes the first transport path 411, a second transport path 412, a third transport path 413, a fourth transport path 414, a fifth transport path 415, the sixth transport path 416, the seventh transport path 417, and the eighth transport path 418.

The first transport path 411 is looped. More specifically, the first transport path 411 includes an upper path 4111 extending in the front-rear direction, a lower path 4112 approximately parallel to the upper path 4111, a front curved portion 4113 connecting the upper path 4111 and the lower path 4112 on the front side together, and a rear curved portion 4114 connecting the upper path 4111 and the lower path 4112 on the rear side together. The recognition unit 25 is disposed in the upper path 4111.

The banknote is transported along the first transport path 411 in each of the clockwise direction (that is, the forward direction) and the counterclockwise direction (that is, the reverse direction) in FIG. 2. The banknote is circulated and transported along the first transport path 411.

The second transport path 412 connects the depositing unit 21 and the upper path 4111 of the first transport path 411 together. The banknote is transported from the depositing unit 21 toward the first transport path 411 along the second transport path 412.

The third transport path 413 connects the dispensing unit 22 and the front curved portion 4113 of the first transport path 411 with each other. The banknote is transported from the first transport path 411 toward the dispensing unit 22 along the third transport path 413. A junction between the third transport path 413 and the front curved portion 4113 is provided with a diverter for changing the destination of the banknotes.

The fourth transport path 414 connects the transport module 23 and an intermediate location of the third transport path 413 with each other. The banknote is transported along the fourth transport path 414 from the third transport path 413 toward the transport module 23 or from the transport module 23 toward the third transport path 413. A junction between the fourth transport path 414 and the third transport path 413 is provided with a diverter.

The fifth transport path 415 connects the temporary storage unit 24 and the front curved portion 4113 of the first transport path 411 together. The banknote is transported along the fifth transport path 415 from the first transport path 411 toward the temporary storage unit 24 or from the temporary storage unit 24 toward the first transport path 411. A junction between the fifth transport path 415 and the front curved portion 4113 is provided with a diverter.

The sixth transport path 416 connects the lower transport unit 42 and the front curved portion 4113 of the first transport path 411 together. The banknote is transported along the sixth transport path 416 from the first transport path 411 toward the lower transport unit 42 or from the lower transport unit 42 toward the first transport path 411. A junction between the sixth transport path 416 and the front curved portion 4113 is provided with a diverter.

Similarly to the sixth transport path 416, the seventh transport path 417 connects the lower transport unit 42 and the front curved portion 4113 of the first transport path 411 together. The banknote is transported along the seventh transport path 417 from the first transport path 411 toward the lower transport unit 42 or from the lower transport unit 42 toward the first transport path 411. A junction between the seventh transport path 417 and the front curved portion 4113 is provided with a diverter.

The eighth transport path 418 connects the lower transport unit 42 and the lower path 4112 of the first transport path 411 together. The banknote is transported along the eighth transport path 418 from the first transport path 411 toward the lower transport unit 42 or from the lower transport unit 42 toward the first transport path 411. A junction between the eighth transport path 418 and the lower path 4112 is provided with a diverter.

The lower transport unit 42 is disposed above the first to fifth storing units 31 to 35. The lower transport unit 42 extends in the front-rear direction. The lower transport unit 42 includes a ninth transport path 421, a tenth transport path 422, and an eleventh transport path 423. The lower transport unit 42 is configured as one unit which includes the ninth transport path 421, the tenth transport path 422, and the eleventh transport path 423.

The ninth transport path 421 connects the fifth storing unit 35 and the sixth transport path 416 together. The banknote is transported along the ninth transport path 421 from the sixth transport path 416 toward the fifth storing unit 35 or from the fifth storing unit 35 toward the sixth transport path 416.

The tenth transport path 422 connects the second lower transport unit 43 and the seventh transport path 417 together. The banknote is transported along the tenth transport path 422 from the seventh transport path 417 toward the second lower transport unit 43 or from the second lower transport unit 43 toward the seventh transport path 417.

The eleventh transport path 423 connects each of the first storing unit 31, the second storing unit 32, the third storing unit 33, and the upper storage 51 of the fourth storing unit 34 to the eighth transport path 418. The banknotes are transported along the eleventh transport path 423 from the eighth transport path 418 toward the storing units 31 to 34 or from the storing units 31 to 34 toward the eighth transport path 418. More specifically, the eleventh transport path 423 extends in the front-rear direction. An end of the eleventh transport path 423 is connected to the first storing unit 31. The eleventh transport path 423 includes three branches 424, 425, and 426. The branch 424 is connected to the second storing unit 32. The branch 425 is connected to the third storing unit 33. The branch 426 is connected to the upper storage 51 of the fourth storing unit 34. Note that, junctions of the branches 424, 425, and 426 are provided with diverters.

The second lower transport unit 43 is disposed between the fourth storing unit 34 and the fifth storing unit 35. The second lower transport unit 43 extends in the up-down direction. The second lower transport unit 43 includes a twelfth transport path 431. The twelfth transport path 431 extends in the up-down direction. The twelfth transport path 431 includes a branch 432 and a branch 433. Junctions of the branches 432 and 433 are provided with diverters. The branch 433 is connected to the lower storage 52 of the fourth storing unit 34. The banknote is transported from the tenth transport path 422 to the lower storage 52 of the fourth storing unit 34, or from the lower storage 52 of the fourth storing unit 34 to the tenth transport path 422, along the twelfth transport path 431 and the branch 433.

Note that the configuration of the storing unit in the banknote handling device 1 shown in FIG. 2 is an example. The number, disposition, and the configuration of the storing units accommodated in the safe housing 131 are not limited to those shown in FIG. 2. For example, the fourth storing unit 34 may be a storage device having one storage like the first to third and fifth storage unit 31 to 33 and 35. The fifth storing unit 35 may be a storing unit having two storages like the fourth storing unit 34. The branch 432 may be connected to the lower storage out of the two storages.

Respective portions of the first to twelfth transport paths 411 to 418, 421 to 426, and 431 to 433 are provided with a tracking sensor for detecting passing of a banknote and a timing sensor for detecting an edge of a banknote. A later-described controller 15 controls the diverters through the transport unit 4, based on a detection signal of the tracking sensor and the timing sensor. This configuration allows the banknotes to be transported to a predetermined transport destination.

As described above, the external cassette 36 is connected to the banknote handling device 1 via the mounting unit 9. As schematically shown in FIG. 2, the mounting unit 9 includes a mounter 91 and a second transport unit 92.

Figure 6A:
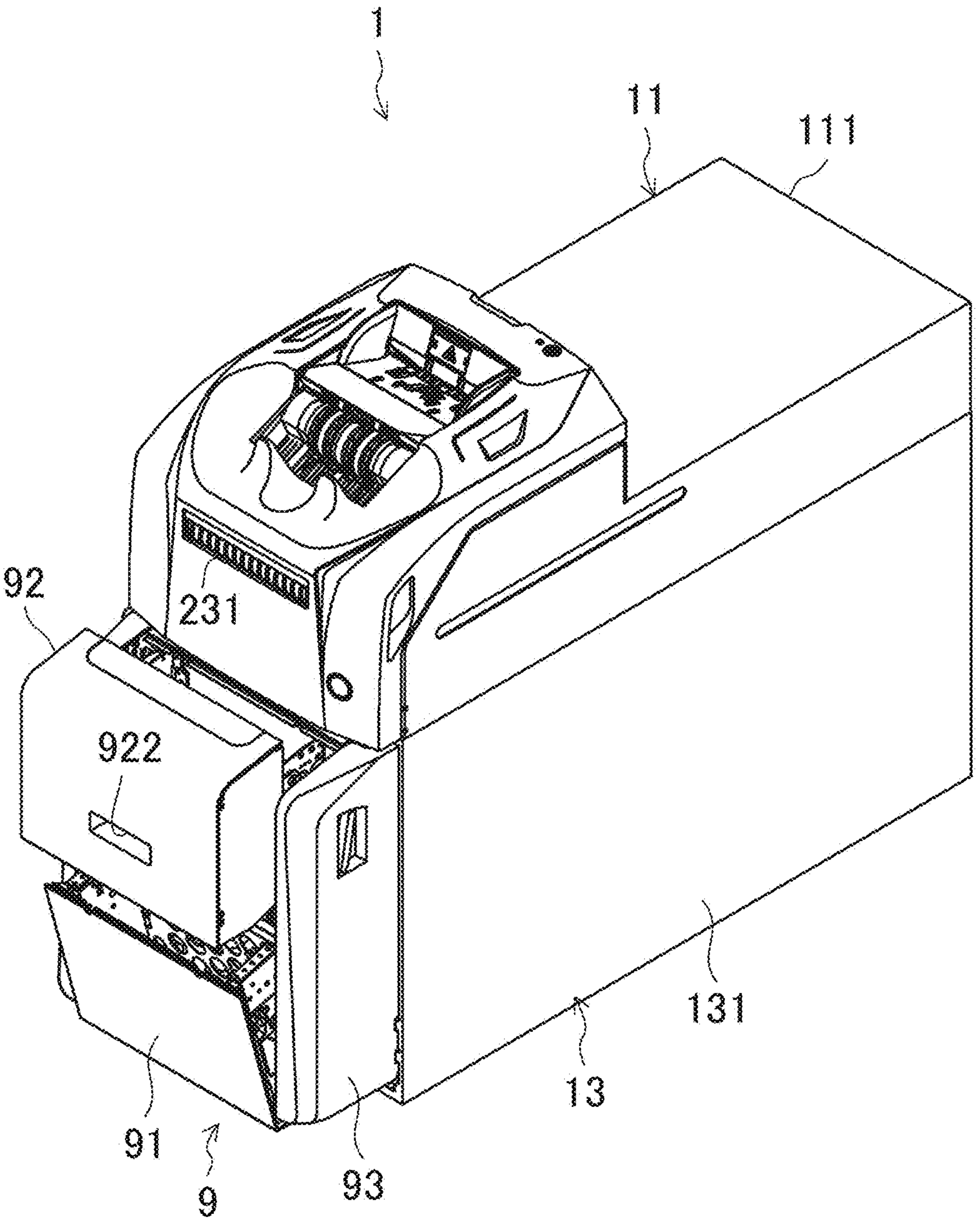
FIG. 6A is a view showing a process of changing a mounting unit between a stowed state and an unfolded state.
Figure 6B:
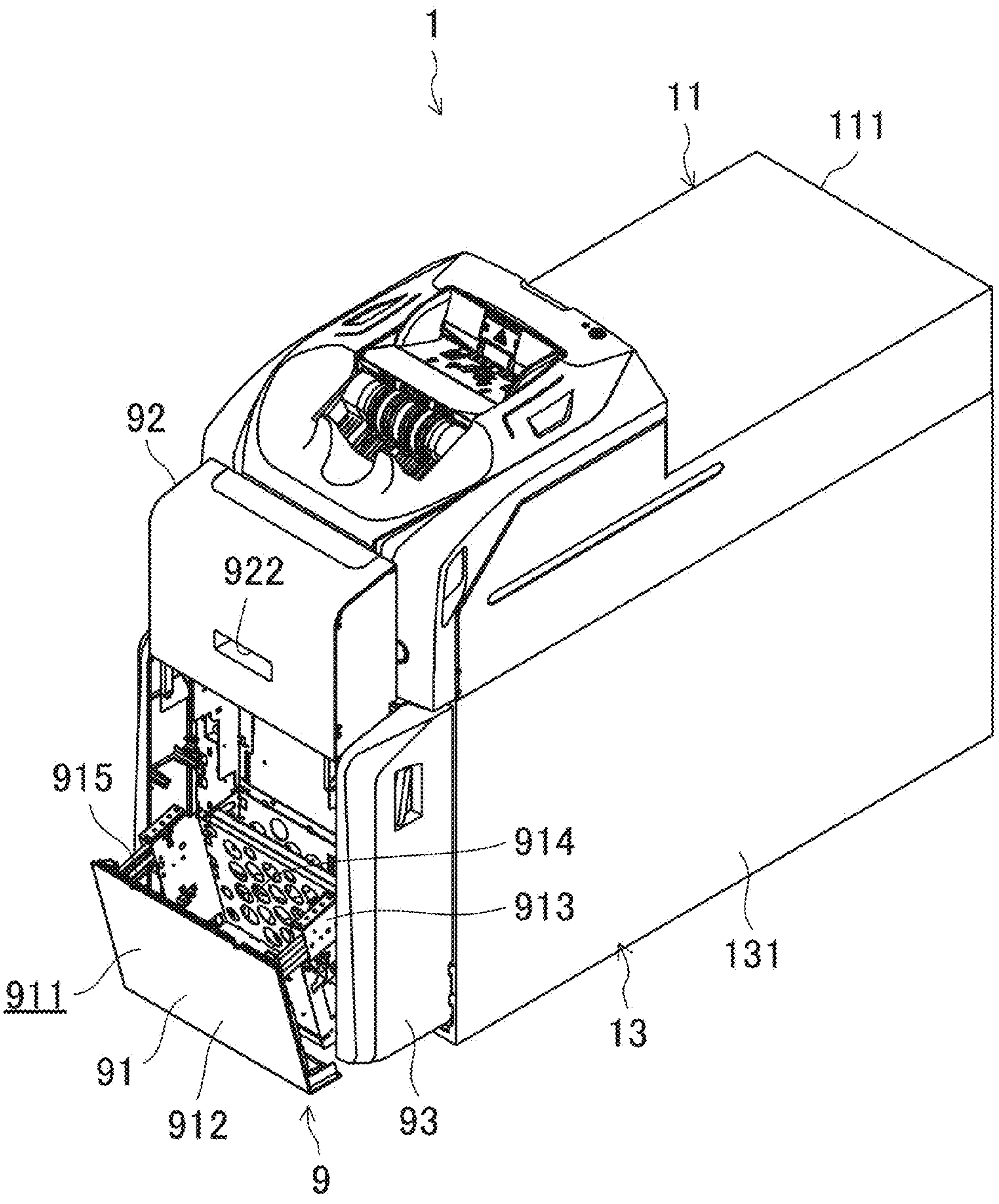
FIG. 6B is a view showing a process of changing the mounting unit between the stowed state and the unfolded state.
Figure 6C:
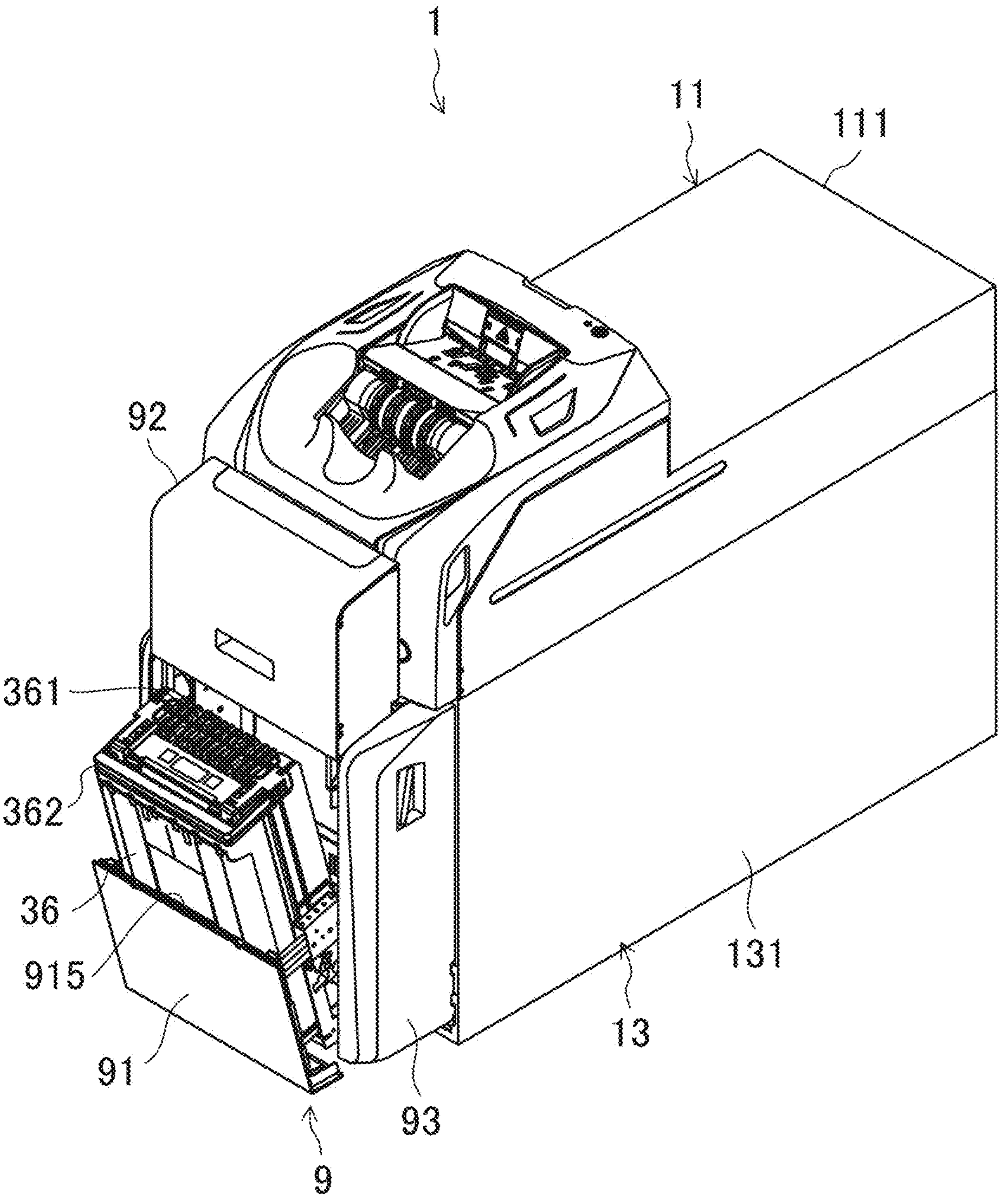
FIG. 6C is a view showing a process of changing the mounting unit between the stowed state and the unfolded state.

As shown in FIG. 6C, the external cassette 36 has an inlet/outlet port 361. The inlet/outlet port 361 is formed at the upper end of the external cassette 36. The banknote enters from the outside of the external cassette 36 and exit from the inside of the external cassette 36 through the inlet/outlet port 361. The external cassette 36 also has a carry handle 362. The carry handle 362 is attached to the upper end of external cassette 36. The external cassette 36 is a stack-type storage cassette. The external cassette 36 has a transport mechanism therein. The transport mechanism inserts the banknotes from the outside to the inside of the storing unit and stores the banknotes in the storage. The transport mechanism further dispenses the banknotes stored in the storage from the inside to the outside of the storing unit.

The external cassette 36 has substantially the same structure as the first to third and fifth storing unit 31 to 33 and 35. The external cassette 36 also has the same outer dimensions as the first to fifth storing units 31 to 35. The external cassette 36 can be detachably attached to each of the fitting parts 1311 to 1315 in the safe housing 131. The external cassette 36 can be diverted to the first to third and fifth storing units 31 to 33 and 35.

The external cassette 36 is mounted on the mounter 91. The mounter 91 holds the external cassette 36. Details of the configuration of the mounter 91 will be described later.

The second transport unit 92 is connected to the connection port 231 of the transport module 23. The second transport unit 92 has a transport path as indicated by a thick solid line in FIG. 2. This transport path connects the transport path of the transport module 23 and the external cassette 36 together. The second transport unit 92 transports the banknotes fed from the external cassette 36 to the transport module 23. The second transport unit 92 also transports the banknotes sent from the transport module 23 to the external cassette 36.

As shown in FIG. 3, the banknote handling device 1 includes the controller 15. The controller 15 can include a central processing unit (CPU), a memory, and an I/O circuit. The CPU executes a program. The memory stores programs and data for the operation of the banknote handling device 1. The memory is, for example, a random access memory (RAM) and/or a read only memory (ROM). The I/O circuit performs input and output of an electric signal between the controller 15 and each device connected to the controller 15. The controller 15 is connected so as to be capable of exchanging signals with each of the depositing unit 21, the dispensing unit 22, the transport module 23, the temporary storage unit 24, the recognition unit 25, the transport unit 4, the first storing unit 31, the second storing unit 32, the third storing unit 33, the fourth storing unit 34, the fifth storing unit 35, and the mounting unit 9. In an exemplary implementation, controller 15 is encompassed by or may include processing circuitry which will be discussed later with respect to FIG. 25.

The banknote handling device 1 includes an operation unit 26 operated by an operator, a memory 27 for storing various data, and a communication unit 28 for establishing communication with a terminal 29. The operation unit 26, the memory 27, and the communication unit 28 are connected to the controller 15 so as to be capable of exchanging signals with the controller 15. The operator (for example, a teller) operates the terminal 29 to execute various processes performed by using the banknote handling device 1. The terminal 29 may be, for example, a personal computer (PC) installed outside the banknote handling device 1 and connected to the banknote handling device 1.

The controller 15 controls the depositing unit 21, the dispensing unit 22, the transport module 23, the temporary storage unit 24, the recognition unit 25, the transport unit 4, the first storing unit 31, the second storing unit 32, the third storing unit 33, the fourth storing unit 34, the fifth storing unit 35, and the mounting unit 9 so that various processes be executed when the operator operates the operation unit 26 or when the operator operates the terminal 29. It will be described below how the banknote handling device 1 executes various processes with reference to the drawings.

(Depositing Process)

During depositing process, the banknote handling device 1 stores banknotes in the storing unit. The operator inserts the banknotes to be deposited into the depositing unit 21. The depositing unit 21 takes the banknotes one by one into the device. The transport unit 4 transports the banknote to the recognition unit 25. The recognition unit 25 recognizes the banknote. The transport unit 4 transports the banknotes to the first storing unit 31, the second storing unit 32, the third storing unit 33, the fourth storing unit 34, or the fifth storing unit 35, in accordance with the recognition results of the recognition unit 25. The storing units 31 to 35 store banknotes. The transport unit 4 transports the banknotes recognized by the recognition unit 25 as banknotes to be rejected to, for example, the dispensing unit 22.

When all the banknotes inserted into the depositing unit 21 are taken into the banknote handling device 1, the terminal 29, for example, shows the deposited amount. The depositing process ends when the operator operates the terminal 29 or the operation unit 26 to confirm the depositing process. The controller 15 stores the data relating to the banknotes stored in the storing units 31 to 35 in the memory 27.

In the case of using the temporary storage unit 24 during the depositing process, the transport unit 4 transports the banknotes that have passed through the recognition unit 25 to the temporary storage unit 24. The temporary storage unit 24 stores the banknotes. After all the banknotes inserted into the depositing unit 21 are taken into the banknote handling device 1, the terminal 29, for example, shows the deposited amount. The operator may choose whether to confirm the depositing process or to cancel the depositing process by operating the terminal 29 or the operation unit 26. When the operator confirms the depositing process, the transport unit 4 transports the banknotes fed by the temporary storage unit 24 to the first storing unit 31, the second storing unit 32, the third storing unit 33, the fourth storing unit 34, or the fifth storing unit 35. The storing units 31 to 35 store banknotes. When the operator cancels the depositing process, the transport unit 4 transports the banknotes fed by the temporary storage unit 24 to the dispensing unit 22. Thus, the banknotes to be deposited are returned.

(Dispensing Process)

During dispensing process, the banknote handling device 1 dispenses the banknotes to the outside of the banknote handling device 1. For example, the first to fourth storing units 31 to 34 feed out banknotes to be dispensed. The transport unit 4 transports the banknote to the recognition unit 25. The recognition unit 25 recognizes the banknotes. The transport unit 4 transports the banknotes after recognition to the dispensing unit 22. The dispensing unit 22 keeps the banknotes to be dispensed. The transport unit 4 transports the banknotes recognized as rejected banknotes by the recognition unit 25 to, for example, the temporary storage unit 24. The temporary storage unit 24 stores the rejected banknotes. The dispensing process ends when all the banknotes to be dispensed are dispensed to the dispensing unit 22. The controller 15 deletes the data relating to the banknotes fed by the storing units 31 to 35 from the memory 27. The temporary storage unit 24 feeds the rejected banknotes, and the transport unit 4 transports the rejected banknotes to the original storing unit.

(Replenishing Process)

During replenishing process, the banknote handling device 1 stores banknotes in the storing unit. The replenishing process is an exemplary accepting process of the banknote handling device 1 accepting a medium from outside to the inside. The banknote handling device 1 is capable of executing the replenishing process using the external cassette 36. By utilizing the external cassette 36, the operator does not have to manually handle the banknotes to be replenished. This increases the security. The replenishing process is performed by an organization other than the financial institution in which the banknote handling device 1 is installed, for example, a person in charge from a cash-in-transit company. The operator of the banknote handling device 1 described below is a person in charge from a cash-in-transit company.

Figure 4A:
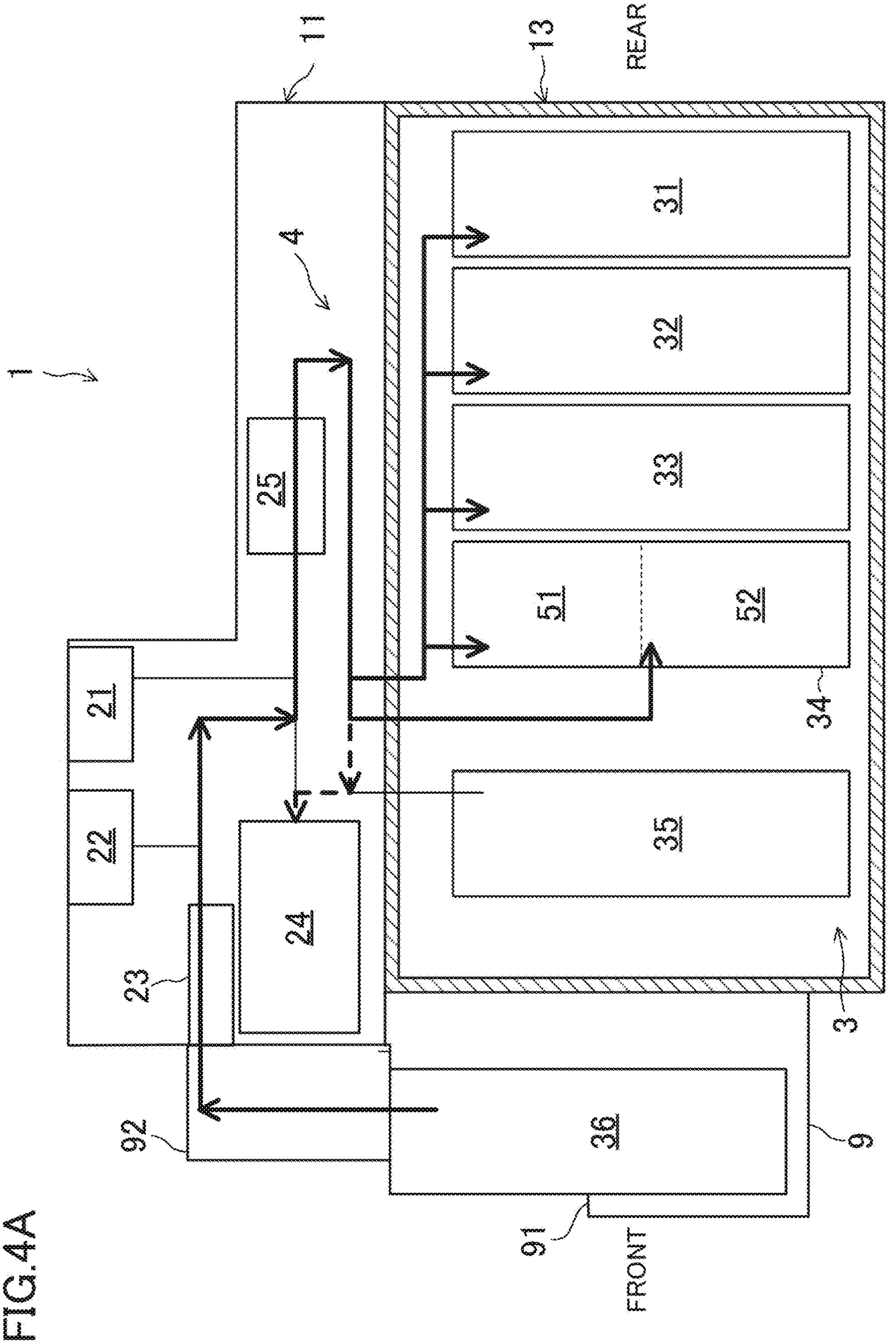
FIG. 4A is a view showing a transport route of banknotes at a time of replenishing the banknotes by using an external cassette.

In FIG. 4A, the transport route of the banknotes during the replenishing process is indicated by an arrow. The operator mounts the external cassette 36 on the mounting unit 9. The external cassette 36 stores banknotes to be replenished. The external cassette 36 and the mounting unit 9 feed the banknotes stored in the external cassette 36 one by one into the device. The transport unit 4 transports the banknote to the recognition unit 25. The recognition unit 25 recognizes the banknote. The transport unit 4 transports the banknotes to a storing unit that stores banknotes to be dispensed, for example, the first storing unit 31, the second storing unit 32, the third storing unit 33, or the fourth storing unit 34, according to the recognition result of the recognition unit 25. The storing units 31 to 34 store banknotes (see solid arrows in FIG. 4A). The transport unit 4 transports the banknotes recognized by the recognition unit 25 as banknotes to be rejected to, for example, the temporary storage unit 24. The temporary storage unit 24 stores the rejected banknotes (see broken arrow in FIG. 4A).

When all the banknotes to be replenished are fed into the banknote handling device 1, the replenishing process ends. The controller 15 stores the data relating to the banknotes stored in the storing units 31 to 35 in the memory 27.

Note that the temporary storage unit 24 feeds out the stored rejected banknotes, and the transport unit 4 transports the rejected banknotes to the external cassette 36, for example, in the reverse direction along the same route as described above.

The recognition unit 25 may once again recognize the rejected banknotes. The transport unit 4 may transport the banknote determined as a proper banknote as a result of recognition performed again by the recognition unit 25 to the first storing unit 31, the second storing unit 32, the third storing unit 33, or the fourth storing unit 34, according to the result of the recognition. The transport unit 4 may transport the banknotes determined to be rejected as a result of the recognition performed again to the external cassette 36. Note that the transport route for the rejected banknotes from the temporary storage unit 24 to the recognition unit 25 is not limited to the route indicated by the arrow in FIG. 4A.

When the rejected banknotes are stored in the external cassette 36, the person in charge from the cash-in-transit company can carry the rejected banknotes back, without touching the rejected banknotes.

(Modification Relating to Replenishing Process)

During the replenishing process, the rejected banknotes may be transported to a location other than the temporary storage unit 24.

As a first modification, the transport unit 4 may transport the rejected banknotes to, for example, the dispensing unit 22. The operator manually takes out and manages the rejected banknotes dispensed to the dispensing unit 22. When the banknote handling device 1 includes another stacking unit instead of the dispensing unit 22, the transport unit 4 may transport the rejected banknotes to the stacking unit.

As a second modification, in a case where the dispensing unit 22 has a retraction function of taking the banknotes into the device, the dispensing unit 22 may take the rejected banknotes dispensed to the dispensing unit 22 into the device for re-recognition of the rejected banknotes. The rejected banknotes include banknotes that are determined to be rejected banknotes due to a transport abnormality such as skew feeding or double feeding. Unlike the tape-winding storing unit, the dispensing unit 22 holds the dispensed banknotes in a stacked state. For this reason, the transport abnormality of the banknotes taken into the device from the dispensing unit 22 may be resolved. With the dispensing unit 22, the number of rejected banknotes occurring during the replenishing process is expected to be reduced.

As a third modification, the transport unit 4 may transport the rejected banknotes to a storing unit that does not store banknotes to be dispensed, for example, to the fifth storing unit 35. If there is an empty storing unit, the transport unit 4 may transport the rejected banknote to the empty storing unit. The operator does not have to manually handle the rejected banknotes.

As a fourth modification, if the banknote handling device 1 has a configuration such that a small cassette (BIN) can be detachably attached, the transport unit 4 may transport the rejected banknote to the small cassette. Note that the banknote handling device 1 may be configured so as to enable removal of the small cassette by, for example, unlocking only when rejected banknotes are stored in the small cassette during the replenishing process. In order to prevent the operator from forgetting to remove the small cassette, the banknote handling device 1 may issue an alert. The banknote handling device 1 may also be provided with a shutter at the position of where the small cassette is attached. The shutter may be opened only when the small cassette is attached or detached, and may be closed otherwise. With the small cassette, the operator can take back the rejected banknotes without directly touching them by hand. This increases its security.

Further, the transport unit 4 may change the transport destination of the rejected banknote according to the cause of determining that the banknote is a rejected banknote by the recognition unit 25. For example, the transport unit 4 may transport a banknote determined to be a rejected banknote due to a transport abnormality to the dispensing unit 22 having a retraction function, and may transport a banknote determined to be a rejected banknote due to other causes (for example, a denomination abnormality) to the temporary storage unit 24. As described above, there is a possibility that the transport abnormality may be resolved by taking the banknote rejected due to the transport abnormality from the dispensing unit 22 into the device. The rejected banknote due to a cause other than the transport abnormality is stored in the temporary storage unit 24, because the possibility of having the cause of rejection being resolved is low even if such a rejected banknote from the dispensing unit 22 into the device.

Further, as candidates of the transport destination of the rejected banknotes, "temporary storage unit", "dispensing unit", and "(any) storing unit" may be set and stored in the memory 27 in advance, and the transport unit 4 may transport the rejected banknote to the transport destination selected from the plurality of the candidates. The transport destination may be selected as an initial setting when the banknote handling device 1 is installed. The operator may select the transport destination every time the replenishing process is executed.

(Collection Process)

The banknote handling device 1 is capable of executing the collection process using the external cassette 36. The banknote handling device 1 stores banknotes to be collected in the external cassette during collection process. By using the external cassette 36, the operator does not have to manually handle the banknotes to be collected. This increases the security. The collection process is performed by, for example, a person in charge from a cash-in-transit company. The operator of the banknote handling device 1 described below is a person in charge from a cash-in-transit company.

Figure 4B:
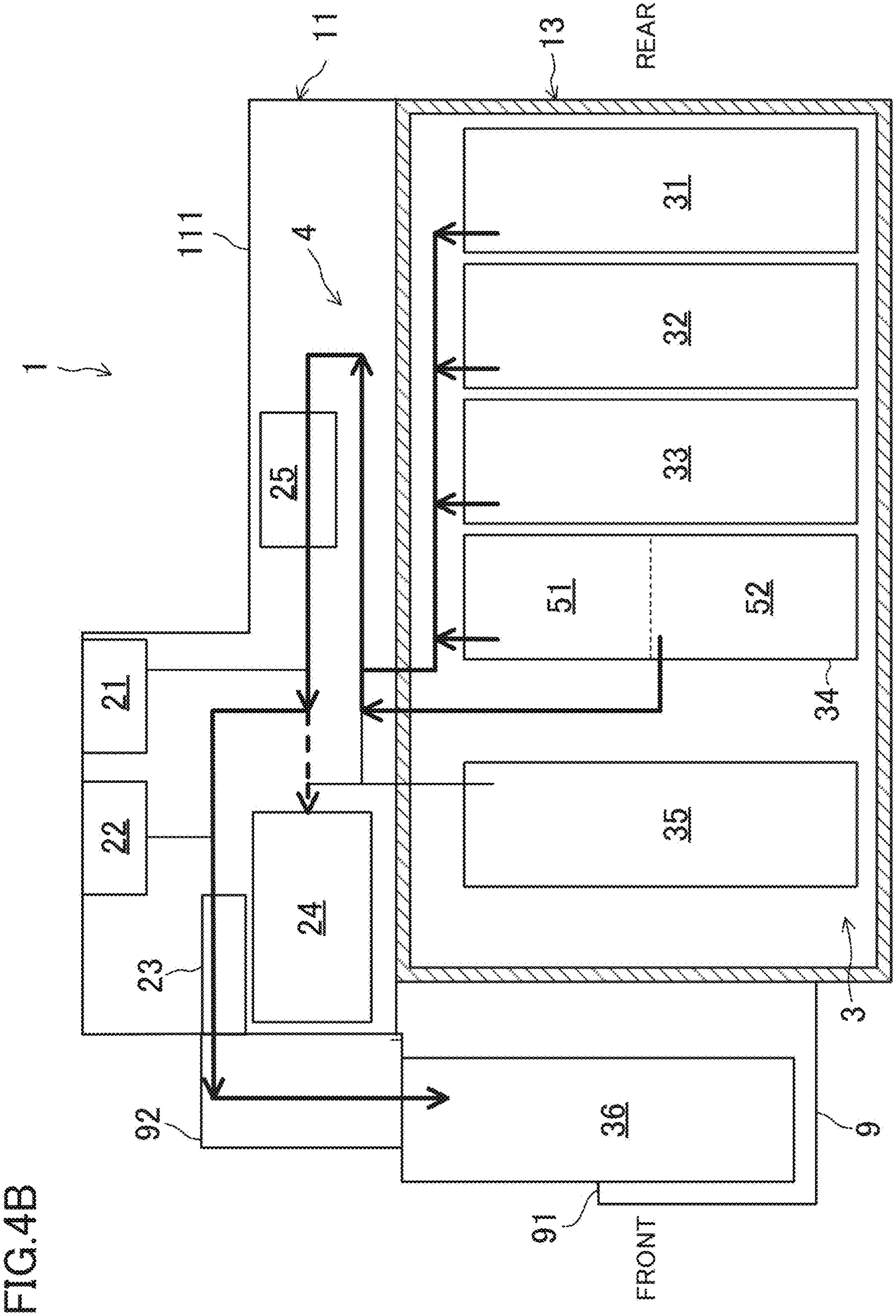
FIG. 4B is a view showing a transport route of banknotes at a time of collecting the banknotes by using an external cassette.

In FIG. 4B, the transport route of the banknotes during the collection process is indicated by an arrow. The operator mounts the external cassette 36 on the mounting unit 9. The storing unit storing the banknotes to be collected, the first storing unit 31, the second storing unit 32, the third storing unit 33, the fourth storing unit 34, or the fifth storing unit 35 feeds out the banknotes. The transport unit 4 transports the banknote to the recognition unit 25 (see solid arrow in FIG. 4B). The recognition unit 25 recognizes the banknote. The transport unit 4 transports the banknote determined to be a proper banknote by the recognition unit 25 to the external cassette 36 via the transport module 23 and the second transport unit 92. The external cassette 36 stores banknotes (see solid arrows in FIG. 4B). The transport unit 4 transports the banknotes recognized by the recognition unit 25 as banknotes to be rejected to the temporary storage unit 24. The temporary storage unit 24 stores the rejected banknotes (see broken arrow in FIG. 4B).

When all the banknotes to be collected are stored in the external cassette 36, the collection process ends. The controller 15 deletes the data relating to the banknotes dispensed from the banknote handling device 1 from the memory 27.

Note that the temporary storage unit 24 feeds out the stored rejected banknotes, and the transport unit 4 transports the rejected banknotes to the storing units 31 to 35, for example, in the reverse direction along the same route as described above.

When the banknotes to be collected are stored in the external cassette 36, the person in charge from a cash-in-transit company removes the external cassette 36 from the banknote handling device 1 and carries it back.

(Configuration of Transport Path of Banknote Handling Device)

Figure 5:
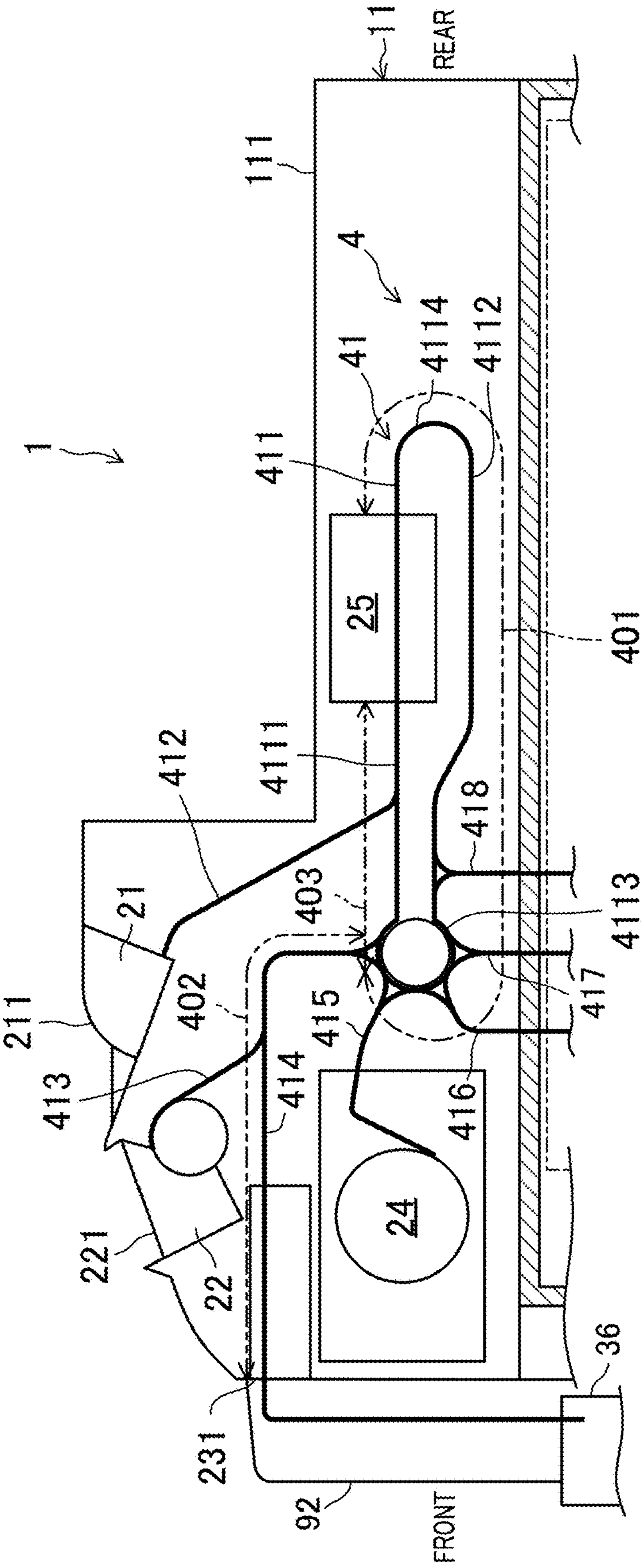
FIG. 5 is an enlarged view showing a configuration of the transport path.

As shown in FIG. 5, the recognition unit 25 and the temporary storage unit 24 are connected to each other via a first specific transport path 401. The first specific transport path 401 includes a portion of an upper path 4111, a rear curved portion 4114, a lower path 4112, and a portion of a front curved portion 4113 of the first transport path 411. During replenishing process, the banknote that has passed through the recognition unit 25 in a front to rear direction is transported to the temporary storage unit 24 via the first specific transport path 401.

The external cassette 36 is connected to the recognition unit 25 via a second specific transport path 402 and a third specific transport path 403, including a part of the upper path 4111 of the loop-shaped first transport path 411. The second specific transport path 402 includes the transport module 23, the fourth transport path 414, and a part of the third transport path 413 in the upper housing 111. The third specific transport path 403 includes a part of the front curved portion 4113 and a part of the upper path 4111 in the loop-shaped first transport path 411. The second specific transport path 402 is connected to the third specific transport path 403. The second specific transport path 402 is connected to the recognition unit 25 via the third specific transport path 403. At the time of the replenishing process, the banknotes fed from the external cassette 36 are transported to the recognition unit 25 via the second specific transport path 402 and the third specific transport path 403.

The external cassette 36 is connected to the recognition unit 25 without passing through the first specific transport path 401. Therefore, the banknote transported from the external cassette 36 to the recognition unit 25 and the banknote transported from the recognition unit 25 to the temporary storage unit 24 do not collide with each other. At the time of the replenishing process, the banknotes fed out from the external cassette 36 are transported to the recognition unit 25 through the second specific transport path 402, and the rejected banknotes are transported from the recognition unit 25 to the temporary storage unit 24 through the first specific transport path 401. The upper transport unit 41 can transport an unrecognized banknote from the external cassette 36 to the recognition unit 25 along the second specific transport path 402 at the timing of transporting the banknote recognized by the recognition unit 25 toward the temporary storage unit 24 along the first specific transport path 401. This enables smooth transport of banknotes at the time of replenishing process. The external cassette 36 can feed the banknotes without delay, and the upper transport unit 41 can transport the banknotes recognized by the recognition unit 25 to the temporary storage unit 24 without delay.

During the replenishing process, the upper transport unit 41 transports the banknotes fed from the external cassette 36 to the recognition unit 25 through the second specific transport path 402, and the upper transport unit 41 transports the banknotes determined to be proper banknotes by the recognition unit 25 to the first storing unit 31, the second storing unit 32, the third storing unit 33, or the fourth storing unit 34. That is, the upper transport unit 41 selectively transports the banknote recognized by the recognition unit 25 to the first storing unit 31, the second storing unit 32, the third storing unit 33, the fourth storing unit 34, or the temporary storage unit 24 through the first specific transport path 401 based on the determination result of the banknote recognized by the recognition unit 25.

During the collection process, the upper transport unit 41 transports the banknotes fed from the first storing unit 31, the second storing unit 32, the third storing unit 33, or the fourth storing unit 34 to the recognition unit 25 through the first specific transport path 401, and transports the banknotes determined to be proper banknotes by the recognition unit 25 to the external cassette 36 through the third specific transport path 403 and the second specific transport path 402.

During the collection process, the upper transport unit 41 transports the banknote determined to be abnormal by the recognition unit 25 to the temporary storage unit 24 through the third specific transport path 403. The upper transport unit 41 selectively transports the banknote recognized by the recognition unit 25 to the external cassette 36 or the temporary storage unit 24 through the second specific transport path 402 and the third specific transport path 403 based on the determination result of the banknote recognized by the recognition unit 25.

The first specific transport path 401 is connected to a rear portion of the recognition unit 25. The third specific transport path 403 is connected to a front portion of the recognition unit 25. The first specific transport path 401 and the third specific transport path 403 form a loop in which banknotes are circulated through the recognition unit 25. The first specific transport path 401 and the third specific transport path 403 extend substantially in the horizontal direction. In the upper housing 111, a loop-shaped transport path is compactly arranged. The upper transport unit 41 can smoothly transport banknotes between the external cassette 36 and the temporary storage unit 24 using the first specific transport path 401 and the third specific transport path 403 forming a loop.

In the upper housing 111, the temporary storage unit 24 is disposed at a position closer in the front-rear direction to the external cassette 36 arranged outside the upper housing 111 than the recognition unit 25. That is, the temporary storage unit 24 is disposed at the front portion in the upper housing 111. The second specific transport path 402 is disposed above the temporary storage unit 24 so as to bypass the temporary storage unit 24. The second specific transport path 402 bypasses the temporary storage unit 24 and is connected to the recognition unit 25. With this layout, the second specific transport path 402 can be connected to the recognition unit 25 without being connected to the first specific transport path 401.

Figure 21:
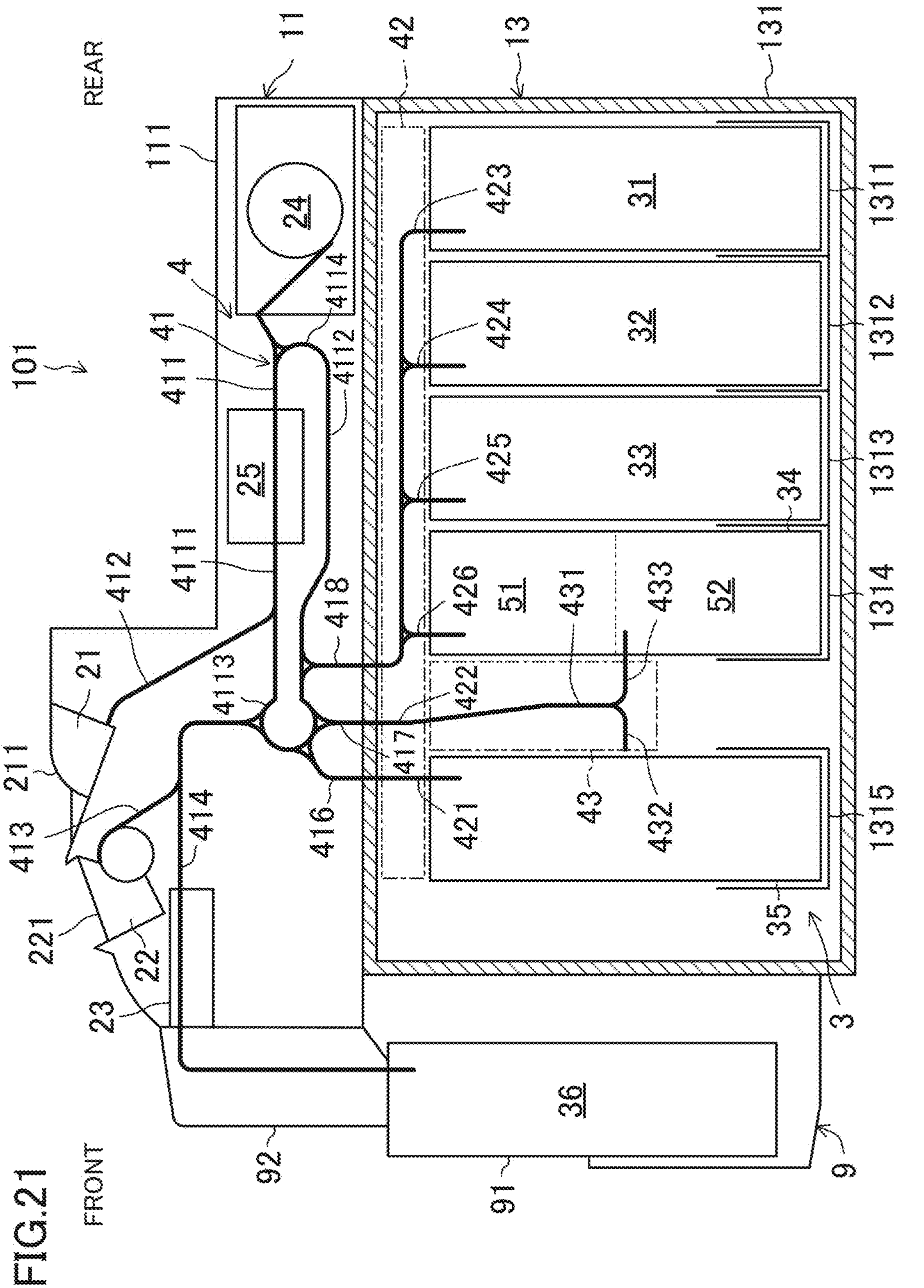
FIG. 21 is a view showing a modification of the banknote handling device in relation to an arrangement position of a temporary storage unit.

Note that, as shown in FIG. 21 for example, in the upper housing 111, the temporary storage unit 24 may be at a position more distant in the front-rear direction from the external cassette 36 disposed outside the upper housing 111 as compared to the recognition unit 25. That is, the temporary storage unit 24 may be disposed at the rear portion in the upper housing 111. The temporary storage unit 24 may be connected to the rear curved portion 4114 via a transport path. As in the configuration of the banknote handling device 1 shown in FIG. 2, the banknote handling device 101 having the above configuration also enables smooth transport of banknotes during the replenishing process and the collection process using the external cassette 36.

(Configuration of Mounting Unit)

Figure 8:
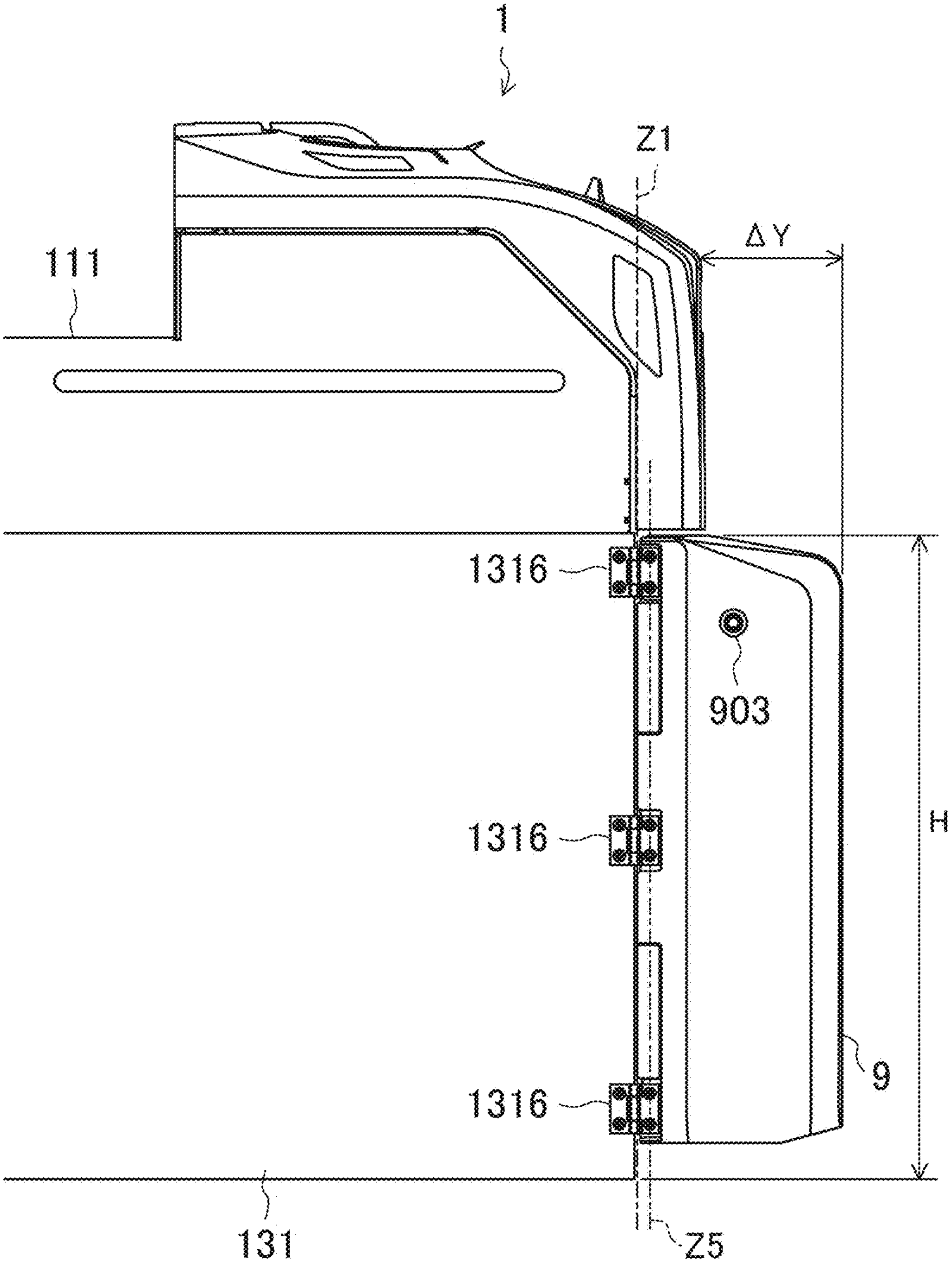
FIG. 8 is a left side view of the mounting unit.

As shown in FIG. 1, the mounting unit 9 is provided on the front side of the safe housing 131. The mounting unit 9 covers the door 1310 of the safe housing 131. As shown in FIG. 8, the mounting unit 9 protrudes forward by ΔY from the front surface of the upper housing 111. The height of the mounting unit 9 does not exceed the height H of the safe housing 131.

The mounting unit 9 includes the mounter 91, the second transport unit 92, and supports 93. The mounter 91 is positioned at a lower portion of the mounting unit 9, and the second transport unit 92 is positioned above the mounter 91. The supports 93 are disposed on both left and right sides with the mounter 91 and the second transport unit 92 interposed therebetween. The supports 93 movably supports the mounter 91 and the second transport unit 92. By the movement of the mounter 91 and the second transport unit 92, the mounting unit 9 changes between a stowed state and an unfolded state. FIG. 1 shows the mounting unit 9 in the stowed state. The external cassette 36 cannot be attached to the mounting unit 9 in the stowed state. FIG. 1 corresponds to the non-using state of the mounting unit 9. FIG. 6B shows the mounting unit 9 in the unfolded state.

The mounter 91 has a first surface 911. The first surface 911 constitutes the front surface of the mounter 91. The second transport unit 92 has a second surface 921. The second surface 921 constitutes the front surface of the second transport unit 92. In the non-using state of the mounting unit 9, the first surface 911 and the second surface 921 are continuous in the up-down direction substantially without a step (see also the partially enlarged view of FIG. 10A). The first surface 911 and the second surface 921 constitute the front surface of the mounting unit 9 in the non-using state. In the non-using state of the mounting unit 9, the continuous first surface 911 and second surface 921 enhance the good appearance of the banknote handling device 1. The supports 93 constitutes a right side surface and a left side surface of the mounting unit 9.

As described above, the second transport unit 92 is configured to be movable. The mounter 91 is configured to deform in conjunction with the movement of the second transport unit 92. The second surface 921 is provided with a first handle 922. The first handle 922 is a handle operated by an operator when moving the second transport unit 92. The first handle 922 is recessed from the second surface 921 at a position lower than the center position of the second surface 921 in the up-down direction. The operator puts his/her finger on the first handle 922 to raise the second transport unit 92 upward. The operator also places his/her finger on the first handle 922 to lower the second transport unit 92.

When the second transport unit 92 is moved and the mounter 91 is deformed, the mounting unit 9 changes to the unfolded state. The external cassette 36 can be attached to the mounting unit 9 in the unfolded state. The mounting unit 9 in the unfolded state corresponds to the using state of the mounting unit 9.

Figure 9:
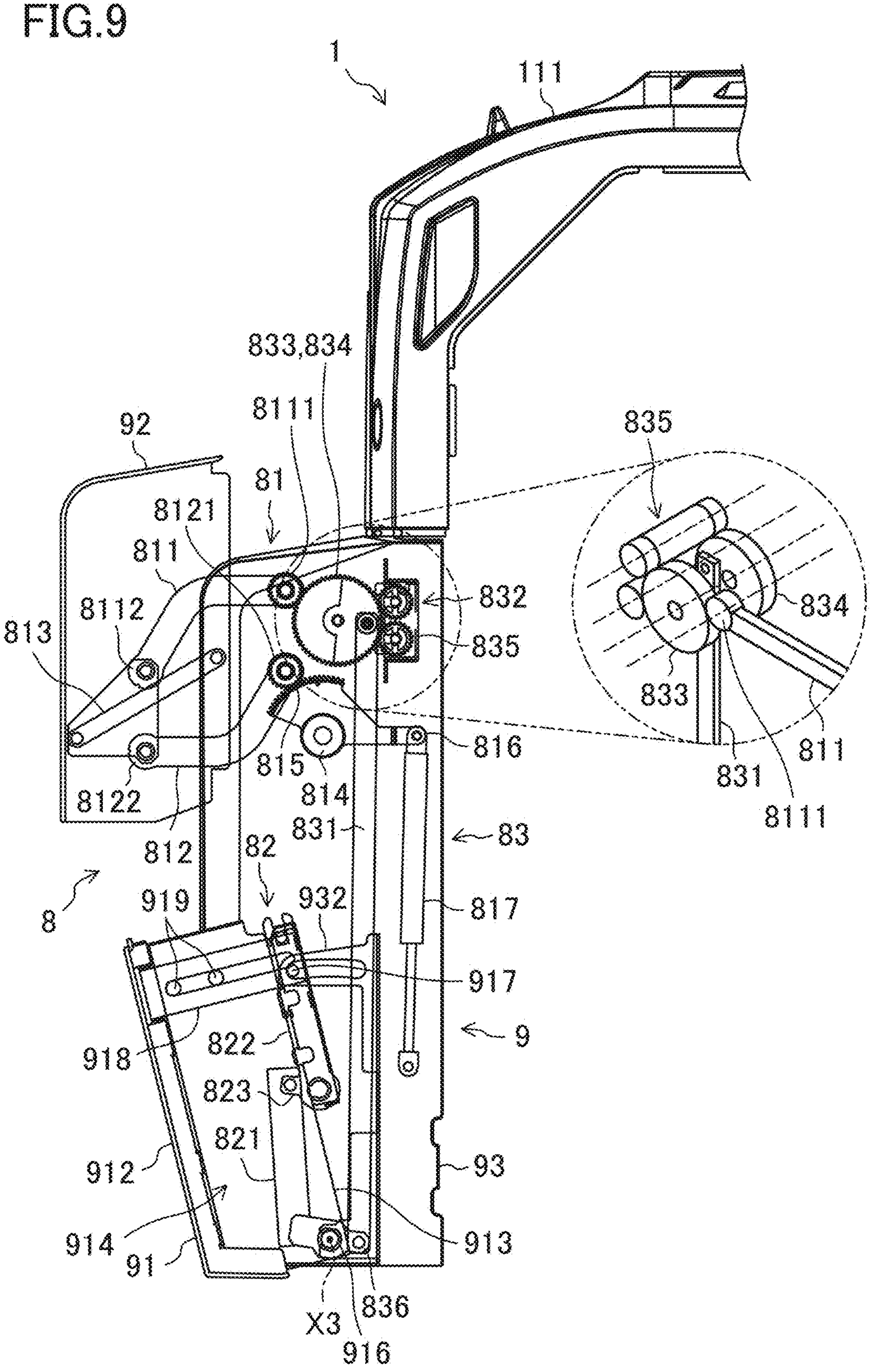
FIG. 9 is a view illustrating a link mechanism incorporated in the mounting unit.

The mounting unit 9 includes a link mechanism 8 (see FIG. 9). The link mechanism 8 is built in the supports 93. The link mechanism 8 moves and deforms the mounter 91 and the second transport unit 92. The configuration of the link mechanism 8 will be described later in detail.

FIG. 6A, FIG. 6B, FIG. 6C, and FIG. 6D show how the mounter 91 and the second transport unit 92 move (and/or deform). The second transport unit 92 moves obliquely upward to the front (FIG. 6A) from a position on the front side of the safe unit 13, and then moves obliquely upward to the rear (FIG. 6B). The second transport unit 92 is positioned on the front side of the handling unit 11. In this state, the second transport unit 92 is fixed to the upper housing 111, and the second transport unit 92 is connected to the connection port 231 of the transport module 23.

On the other hand, when the movement of the second transport unit 92 is started, the mounter 91 starts to rotate forward with the lower end portion as a fulcrum (FIG. 6A). The mounter 91 is inclined forward relative to the supports 93. In other words, the mounter 91 tilts forward relative to the safe unit 13. The mounter 91 is switched between a mount state that allows mounting of the external cassette 36 and a non-mount state that does not allow mounting of the external cassette 36 by swinging in the front-rear direction.

As shown in FIG. 6B, the mounter 91 has a cover 912 and a main body 913. The cover 912 constitutes the first surface 911. The main body 913 is disposed behind the cover 912. The cover 912 and the main body 913 form a space 914 therebetween in which the external cassette 36 is mounted. The main body 913 supports the rear side portion of the external cassette 36, and the cover 912 supports the front side portion of the external cassette 36.

When the second transport unit 92 further moves, the cover 912 slides forward relative to the main body 913 (FIG. 6B). The cover 912 moves away from the safe housing 131. This way, the mounter 91 deforms to a shape that allows mounting of the external cassette 36. That is, as illustrated in FIG. 6B, an insertion port 915 into which the external cassette 36 can be inserted is largely open toward the obliquely upper front. The space 914 formed between the cover 912 and the main body 913 has a larger volume in the mount state of the external cassette 36 than in the non-mount state of the external cassette 36 (see also FIG. 10A and FIG. 10B).

When the second transport unit 92 is connected to the connection port 231 of the transport module 23 and the mounter 91 is deformed into a shape that allows mounting of the external cassette 36, the operator mounts the external cassette 36 on the mounter 91. As shown in FIG. 6C, the operator inserts the vertically long external cassette 36 into the space 914 through the insertion port 915. The external cassette 36 is inserted until the lower end portion of the external cassette 36 abuts against the bottom portion of the mounter 91.

Figure 6D:
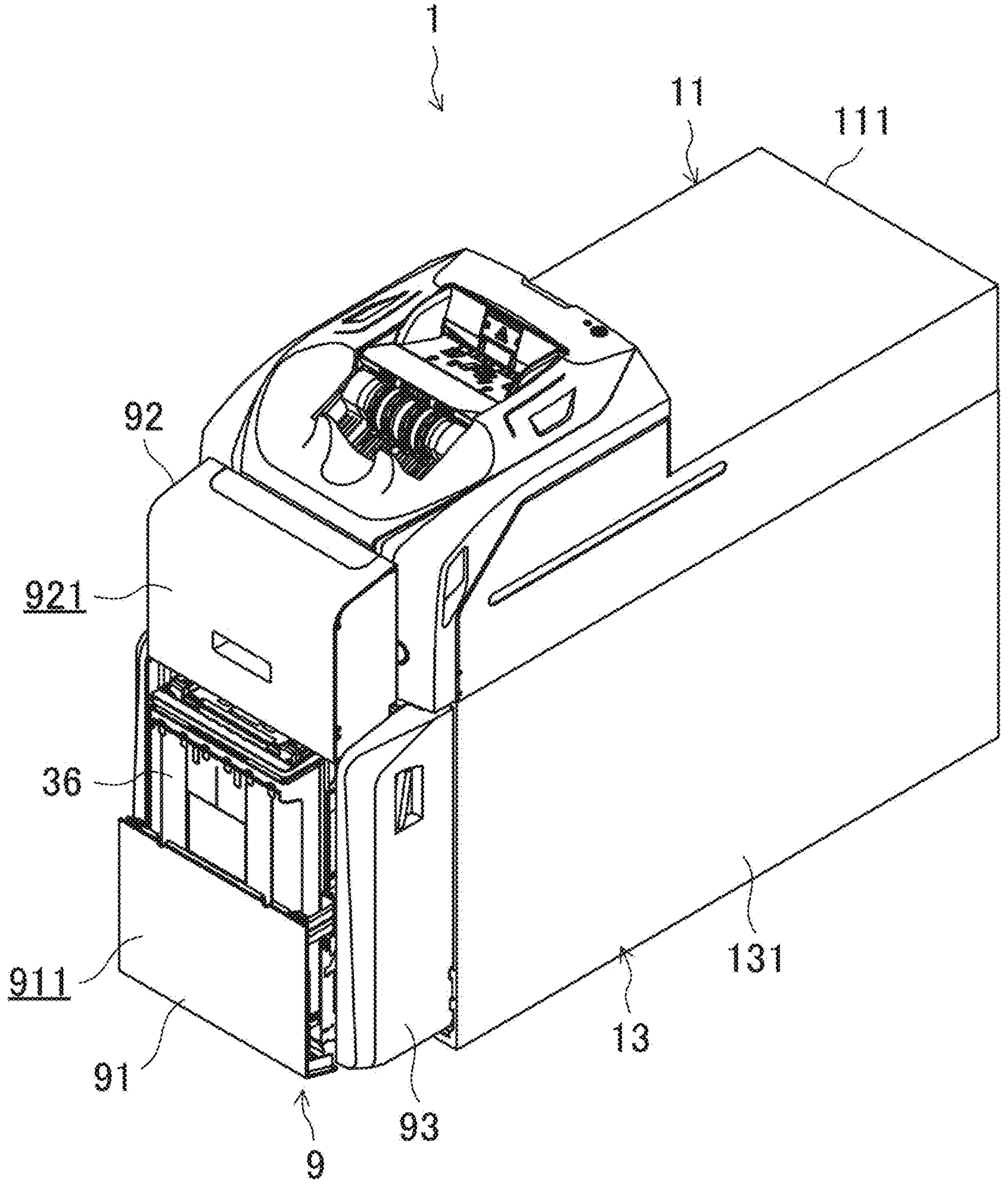
FIG. 6D is a view showing a process of changing the mounting unit between the stowed state and the unfolded state.

After inserting the external cassette 36 into the mounter 91, the operator rotates the mounter 91 and the external cassette 36 rearward so as to push the external cassette 36 into the space below the second transport unit 92 and between the left and right supports 93. The mounter 91 and the external cassette 36 that have been inclined forward stand up (FIG. 6D). The external cassette 36 is disposed in a space of the second transport unit 92 before the movement of the second transport unit 92. In other words, the external cassette 36 is arranged in an empty space formed by the movement of the second transport unit 92.

In this state, the inlet/outlet port 361 provided on the upper end surface of the external cassette 36 is connected to the second transport unit 92. The external cassette 36 is connected to the transport module 23 of the banknote handling device 1 via the second transport unit 92 so as to be able to transport banknotes. The mounter 91 transits from the mount state (FIG. 6C) in which the external cassette 36 is mounted to a set state (FIG. 6D) in which the external cassette 36 is connected to the banknote handling device 1 so as to enable transport of banknotes. When the mounting unit 9 is in the using state, the first surface 911 of the mounter 91 and the second surface 921 of the second transport unit 92 are not continuous with each other.

The first surface 911 constitutes a cover that covers a lower portion of the external cassette 36. The first surface 911 protects the external cassette 36. The upper end of the first surface 911 is lower than the upper end of the external cassette 36. Apart of the external cassette 36 mounted on the mounter 91 is exposed to the outside. Since the operator can visually recognize the external cassette 36, chances of forgetting to attach and detach the external cassette 36 are reduced.

In the banknote handling device 1, the mounting unit 9 includes the second transport unit 92. The second transport unit 92 is integrally fixed to the banknote handling device 1. At a time of connecting the external cassette 36 to the banknote handling device 1, there is no need for the operator to perform an operation of attaching or detaching a transport unit separate from the banknote handling device 1 to or from the banknote handling device 1. This increases the usability of the external cassette 36. In addition, since the second transport unit 92 moves in the up-down direction, the operator can easily move the second transport unit 92.

When the operator puts his/her finger on the first handle 922 of the second transport unit 92 to lift the second transport unit 92, that is, when the operator pulls the second transport unit 92, the mounter 91 is automatically deformed into a shape that allows mounting of the external cassette 36. This simplifies the operation by the operator. The mounter 91 may be configured to switch from the non-mount state to the mount state when the operator performs at least one of pulling, pushing, or rotating the operating portion.

Specifically, the mounter 91 switches between the mount state and the non-mount state by reciprocating in the direction of aligning the first to the fifth storing units 31 to 35 of the banknote handling device 1, that is, in the front-rear direction.

The mounter 91 is exposed to the outside of the banknote handling device 1 in both the non-mount state (see FIG. 1) that does not allow mounting of the external cassette 36 and the mount state (see FIG. 6B) that allows mounting of the external cassette 36. In the banknote handling device 1, there is no need to perform a troublesome operation of, for example, unfolding an attachment unit provided inside the door to use the external cassette. The operation of the operator attaching the external cassette 36 is simple.

The external cassette 36 is disposed in a space of the second transport unit 92 before the movement of the second transport unit 92. The second transport unit 92 is positioned adjacent to the front side of the upper housing 111 when the external cassette 36 is used, and positioned adjacent to the front side of the safe housing 131 when the external cassette 36 is not used. Further, when the external cassette 36 is not used, the mounter 91 is positioned close to the safe housing 131. The banknote handling device 1 is compact both when the mounting unit 9 is unfolded and the external cassette 36 is used and when the mounting unit 9 is stowed and the external cassette 36 is not used.

(Rotation Configuration of Mounting Unit)

The mounting unit 9 is disposed at a position covering the door 1310 of the safe housing 131. The mounting unit 9 also serves as a cover for the door 1310. This increases security of the banknote handling device 1.

The mounting unit 9 is supported by the safe housing 131 so as to move from a position where the door 1310 is covered (see FIG. 1) to a position where the door 1310 is exposed (see FIG. 7). More specifically, as shown in FIG. 8, the mounting unit 9 is such that the rear end portion of the left side surface of the support 93 is attached to the safe housing 131 via three first hinges 1316. This way, the mounting unit 9 rotates about a first axis Z1 (see FIG. 7) extending in the up-down direction. The mounting unit 9 changes to the stowed state, the unfolded state, or a retracted state that exposes the door 1310.

When the mounting unit 9 is in the retracted state, the back side of the mounting unit 9 is exposed. The operator can open the transport path of the second transport unit 92 as indicated by the chain line in FIG. 7. When a banknote is jammed in the second transport unit 92 during transport of the banknote, the operator can resolve the jam by opening the transport path of the second transport unit 92.

As shown in FIG. 1, a second handle 931 is provided on the right side surface of the support 93. The second handle 931 is a handle operated by the operator when the mounting unit 9 is rotated. The second handle 931 is recessed from the right side surface of the support 93 at an upper position of the right side surface. The operator can rotate the mounting unit 9 by putting a finger on the second handle 931 and moving the mounting unit 9 forward.

(Configuration for Avoiding Erroneous Operation of Mounting Unit)

Here, the mounting unit 9 is configured to be rotatable only in the stowed state shown in FIG. 1. That is, the mounting unit 9 includes a first lock 901 and a second lock 902, as shown in FIG. 3. The first lock 901 is a lock that permits and prohibits movement of the second transport unit 92 (and the mounter 91) by operation of the first handle 922. The second lock 902 is a lock that permits and prohibits the rotation of the mounting unit 9 by the operation of the second handle 931. Note that the first lock 901 is configured to fix the second transport unit 92 in the stowed state to the supports 93. Further, the first lock 901 fixes the second transport unit 92 to the upper housing 111, when the mounting unit 9 is in the unfolded state. Note that the first lock 901 may fix the first handle 922 so that the first handle 922 cannot be operated. The second lock 902 is configured to fix the supports 93 of the mounting unit 9 to the safe housing 131. Note that the second lock 902 may fix the second handle 931 so that the second handle 931 cannot be operated.

When the mounting unit 9 is in the stowed state shown in FIG. 1, the second lock 902 permits the rotation of the mounting unit 9. The operator can rotate the mounting unit 9 by operating the second handle 931. When the mounting unit 9 is in the unfolded state, the second lock 902 prohibits the rotation of the mounting unit 9. The operator cannot rotate the mounting unit 9.

Therefore, when a paper jam occurs in the second transport unit 92 while the external cassette 36 is mounted on the mounting unit 9 and the banknote handling device 1 is performing handling, the operator can detach the mounted external cassette 36 from the mounting unit 9, switch the mounting unit 9 to the stowed state, and then operate the second handle 931 to rotate the mounting unit 9 (see FIG. 7).

When the mounting unit 9 is in the retracted state shown in FIG. 7, the first lock 901 prohibits the movement of the second transport unit 92. The operator cannot move the second transport unit 92. When the mounting unit 9 is in the stowed state shown in FIG. 1 or in the unfolded state shown in FIG. 6A, the first lock 901 permits movement of the second transport unit 92. The operator can move the second transport unit 92 upward or downward by operating the first handle 922.

In other words, the mounting unit 9 includes the first handle 922 operated to move the second transport unit 92 by moving the second transport unit 92 away from the mounter 91, and a second handle 931 operated to move the mounting unit 9 without moving the second transport unit 92 away from the mounter 91. The operator can operate the mounting unit 9 by using the two handles selectively.

Further, when the second transport unit 92 is moved by operating the first handle 922, the operation of the second handle 931 is locked by the second lock 902, and when the mounting unit 9 is rotated by operating the second handle 931, the operation of the first handle 922 is locked by the first lock 901. Since the operator cannot operate both the first handle 922 and the second handle 931 at the same time, operability is improved.

The mounting unit 9 has a release switch 903. As shown in FIG. 8, the release switch 903 is provided on the upper portion of the left side surface of the support 93. The release switch 903 is a so-called push-button switch. The operator presses the release switch 903 or holds the release switch 903 in the pressed state. This way, the controller 15 releases the first lock 901. By operating the release switch 903, the operator can operate the first handle 922 to move the second transport unit 92. Since the release switch 903 restricts the operation of the mounting unit 9, the chances of erroneous operation of the mounting unit 9 are reduced. This increases the security of the banknote handling device 1.

Further, instead of operating the release switch 903, the controller 15 may be configured to enable movement of the second transport unit 92 by the operator performing a predetermined operation on the terminal 29 and operating the first handle 922. Specifically, the controller 15 releases the first lock 901 when a lock release signal is received from the terminal 29 via a communication unit 28. The operator can move the second transport unit 92 by operating the first handle 922.

The controller 15 may further release the first lock 901 by the operator performing a predetermined operation on the terminal 29 and pressing the release switch 903 of the mounting unit 9.

The controller 15 may release the first lock 901 based on a preset operation out of the operation of the release switch 903, the operation of the terminal 29, and the combination of the operation of the terminal 29 and the operation of the release switch 903.

The lock releasing operation in the banknote handling device 1 may be a unique operation. For example, when the release switch 903 is successively pressed five times, the controller 15 may release the first lock 901.

Further, a display part displaying the state of the banknote handling device 1, for example, the display device of the terminal 29 may display information related to releasing of the lock. Further, when the first lock 901 is released through any of the above-described operations and the operator can move the second transport unit 92, for example, the display device of the terminal 29 may display, instead of a normal screen, a screen related to the above-described replenishing process or the collection process, which is to be operated by a person in charge from the cash-in-transit company.

(Configuration of Link Mechanism)

As described above, the mounting unit 9 includes the link mechanism 8. The configuration of the link mechanism 8 will be described with reference to FIG. 9, FIG. 10A, and FIG. 10B. FIG. 9 shows a state in which the mounting unit 9 is in the middle between the stowed state and the unfolded state for the sake of easier understanding of the configuration of the link mechanism 8.

The link mechanism 8 is built in each of the left and right supports 93. The link mechanism 8 supports both left and right side portions of the mounter 91 and the second transport unit 92. The link mechanism 8 includes a first link mechanism 81 configured to move the second transport unit 92, a second link mechanism 82 configured to move the mounter 91, and a third link mechanism 83 that links the first link mechanism 81 and the second link mechanism 82. The third link mechanism 83 is an example of the coupling mechanism that transmits the movement of the second transport unit 92 to the mounter 91.

The first link mechanism 81 has a first arm 811 and a second arm 812. The first arm 811 and the second arm 812 are arranged to face each other. The first arm 811 and the second arm 812 have substantially the same length. The first arm 811 and the second arm 812 constitute a planar quadrilateral linkage. The first arm 811 and the second arm 812 are bent. Interference between the first arm 811 and the second arm 812 is avoided.

A first end portion 8111 of the first arm 811 is rotatably supported by the supports 93. A second end portion 8112 of the first arm 811 is rotatably supported by the second transport unit 92. Similarly, a first end portion 8121 of the second arm 812 is rotatably supported by the supports 93. A second end portion 8122 of the second arm 812 is rotatably supported by the second transport unit 92. The first end portion 8111 of the first arm 811 and the first end portion 8121 of the second arm 812 are disposed, spaced from each other in the up-down direction. The second end portion 8112 of the first arm 811 and the second end portion 8122 of the second arm 812 are disposed, spaced from each other in the up-down direction.

Figure 10A:
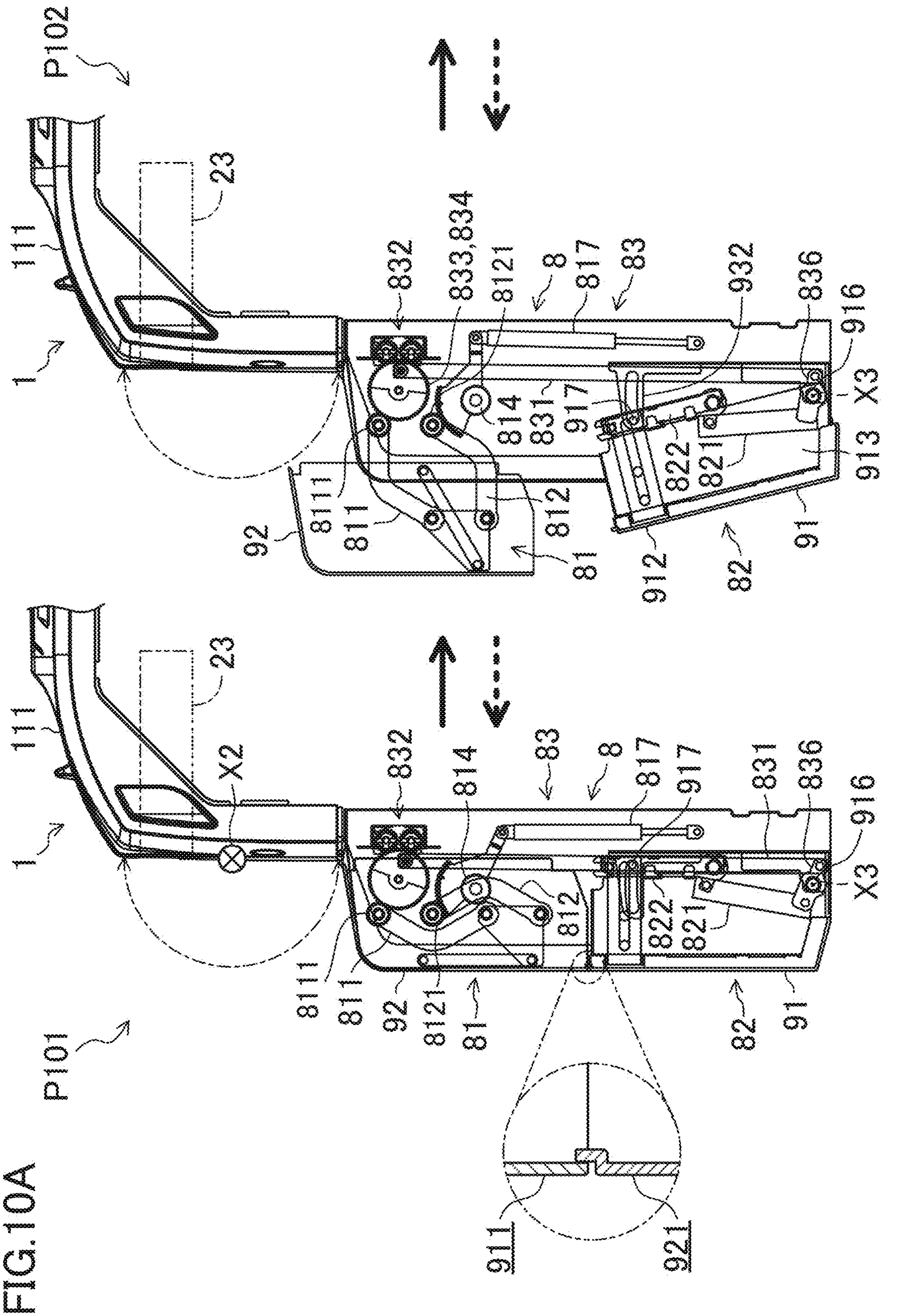
FIG. 10A is a transition diagram showing a movement of the link mechanism when the mounting unit changes between the stowed state and the unfolded state.
Figure 10B:
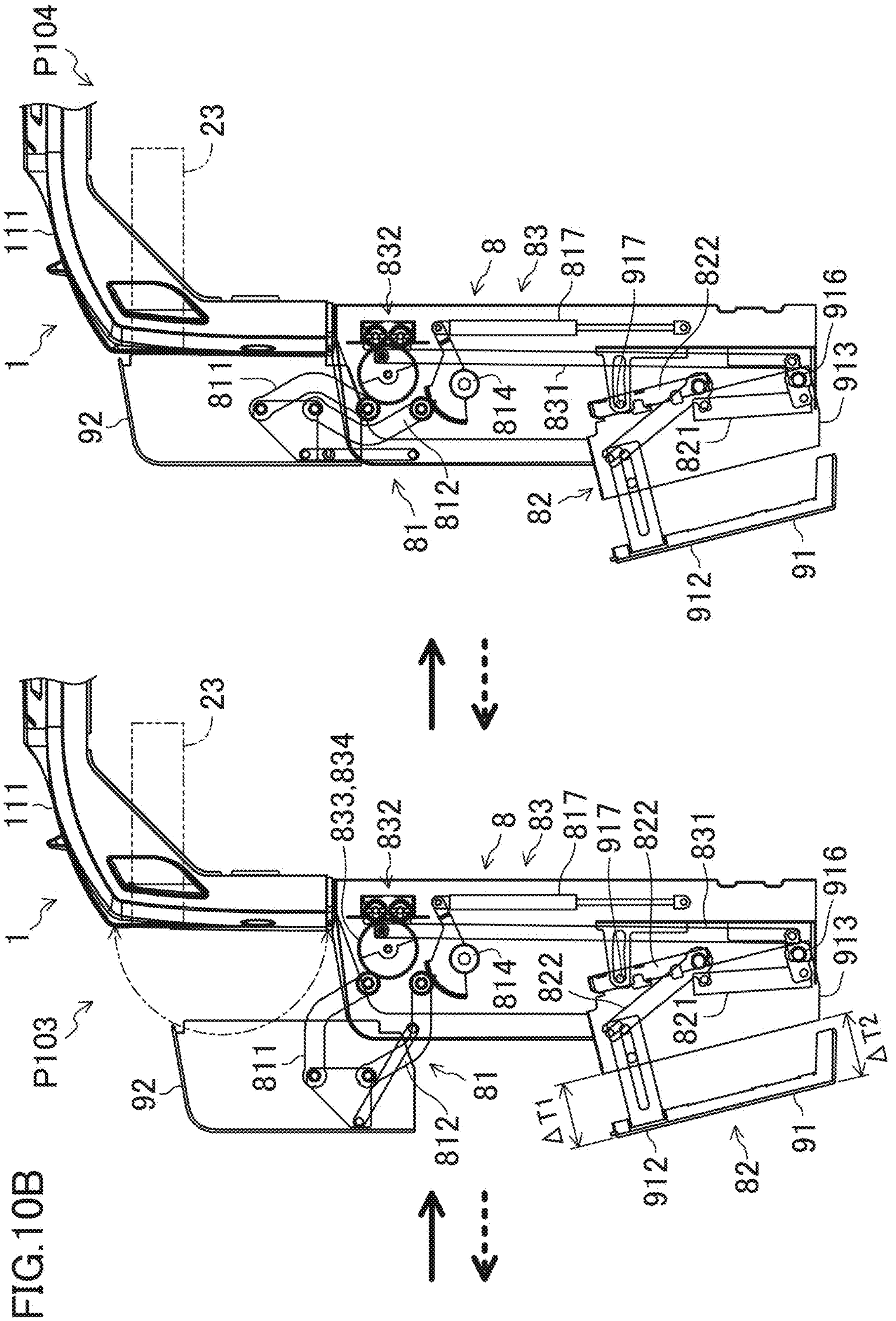
FIG. 10B is a transition diagram showing a movement of the link mechanism when the mounting unit changes between the stowed state and unfolded state.

When the first arm 811 and the second arm 812 rotate with the first end portions 8111, 8121 as their respective fulcrums, the second transport unit 92 reciprocates, while maintaining its posture, in a curved manner about an axis X2 extending to the right and left in the horizontal direction, as shown by a chain line of FIG. 10A and FIG. 10B. The chain lines in the FIG. 10A and FIG. 10B indicate the movement trajectory of the rear position of the upper end of the second transport unit 92. In the exemplary configuration of the figures, the movement trajectory is a semicircular arc about the axis X2. The axis X2 is an example of the first axis.

The first link mechanism 81 also has a third arm 813. A first end portion of the third arm 813 is rotatably supported by the supports 93. A second end portion of the third arm 813 is rotatably supported by the second transport unit 92. The third arm 813 increases the rigidity of the first link mechanism 81. The third arm 813 enables stable movement of the second transport unit 92.

To the first end portion 8121 of the second arm 812, a gear is provided. The gear of the first end portion 8121 meshes with a first swing member 814. The first swing member 814 is swingably supported by the supports 93. The first swing member 814 has a gear portion 815 on the front side and an attachment portion 816 on the rear side with a swing support point therebetween. The gear portion 815 meshes with the gear of the first end portion 8121. When the second arm 812 rotates, the first swing member 814 swings. To the attachment portion 816, an upper end portion of an assist damper 817 is attached. The assist damper 817 is supported by the supports 93 so as to be stretchable in the up-down direction.

When the operator lifts the second transport unit 92 so as to cause transition of the mounting unit 9 from the stowed state to the unfolded state, the first end portion 8121 of the second arm 812 rotates in the clockwise direction while the first swing member 814 rotates in the counterclockwise direction, in FIG. 10A and FIG. 10B. This causes the assist damper 817 attached to the first swing member 814 to extend. Since the assist damper 817 has resistance in a contracting direction, it can support the weight of the second transport unit 92. The assist damper 817 allows the operator to easily lift the second transport unit 92.

Further, when the operator lowers the second transport unit 92 so as to cause transition of the mounting unit 9 from the unfolded state to the stowed state, the first end portion 8121 of the second arm 812 rotates in the counterclockwise direction while the first swing member 814 rotates in the clockwise direction, in FIG. 10A and FIG. 10B. This causes the assist damper 817 to contract. Since the assist damper 817 supports the weight of the second transport unit 92, the operator can slowly lower the second transport unit 92. The assist damper 817 improves the operability of the mounting unit 9.

The third link mechanism 83 includes a main rod 831, an upper coupling portion 832, and a lower coupling portion 836. The main rod 831 is disposed so as to extend in the up-down direction. The upper coupling portion 832 links the main rod 831 and the first link mechanism 81 together. The lower coupling portion 836 links the main rod 831 and the second link mechanism 82 together.

As shown in an enlarged view of FIG. 9, the upper coupling portion 832 has a first gear 833, a second gear 834, and a torque limiter 835. The enlarged view of FIG. 9 shows the upper coupling portion 832 from a direction different from that of FIG. 9. The first gear 833 and the second gear 834 are arranged side by side in the left-right direction, and rotate about a common axis extending horizontally. Note that the first gear 833 and the second gear 834 are rotatable independently of each other.

The first gear 833 meshes with a gear provided to the first end portion 8111 of the first arm 811. To the second gear 834, an upper end portion of the main rod 831 is attached. Rotating the second gear 834 moves the main rod 831 in the up-down direction.

The torque limiter 835 meshes with both the first gear 833 and the second gear 834. The torque limiter 835 links the first gear 833 and the second gear 834. When the first gear 833 meshing with the gear on the first arm 811 rotates with the movement of the second transport unit 92, the rotational force is transmitted to the second gear 834 via the torque limiter 835, and the second gear 834 also rotates in the same direction as the first gear 833.

As will be described later, when the operator moves the second transport unit 92, the mounter 91 moves or deforms in conjunction with the movement. If the mounter 91 interferes with something and the mounter 91 is unable to move while the operator moves the second transport unit 92, a load acting on the torque limiter 835 between the first gear 833 and the second gear 834 exceeds a predetermined load. When the load exceeds the predetermined load, the torque limiter 835 slips and the torque limiter 835 interrupts transmission of torque between the first gear 833 and the second gear 834. That is, even if the first gear 833 rotates, the second gear 834 does not rotate. As a result of the torque limiter 835 interrupting the transmission of torque, the operator can continue the movement of the second transport unit 92.

The lower coupling portion 836 is fixed to the main body 913 of the mounter 91. More specifically, a pivot 916 constituting a third axis X3 is provided at the rear portion of the lower end portion of the main body 913. The third axis X3 extends in the left-right horizontal direction. The pivot 916 is pivotally supported by the supports 93 of the mounting unit 9. A guide pin 917 is provided at an upper end portion of the main body 913. The guide pin 917 engages with a first rail 932. The first rail 932 is fixed to the supports 93. The first rail 932 has an arc-shaped groove about the pivot 916, and the guide pin 917 can reciprocate along the groove. The mounter 91 swings forward and backward about the third axis X3 with respect to the supports 93. The third axis X3 of the mounter 91 is parallel to the axis X2 of the second transport unit 92. The third axis X3 is an example of the second axis.

The lower coupling portion 836 is fixed to the pivot 916. The lower coupling portion 836 includes a first coupling portion positioned on the rear side of the pivot 916 and a second coupling portion positioned on the front side of the pivot 916. The lower end of the main rod 831 is coupled to the first coupling portion. When the main rod 831 moves upward, the first coupling portion moves upward, so that the mounter 91 rotates forward. On the other hand, when the main rod 831 moves downward, the first coupling portion moves downward, so that the mounter 91 having inclined forward rotates rearward.

The second link mechanism 82 includes a sub-rod 821 and a second swing member 822. The sub-rod 821 is disposed so as to extend in the up-down direction. The lower end portion of the sub-rod 821 is coupled to a second support of the lower coupling portion 836. The upper end portion of the sub-rod 821 is coupled to the second swing member 822.

The second swing member 822 is rotatably supported with respect to the main body 913 of the mounter 91. More specifically, the second swing member 822 is disposed so as to extend in the up-down direction. The lower end portion of the second swing member 822 is supported by the main body 913 so as to be rotatable about an axis extending in the horizontal direction. The second swing member 822 can swing in the front-rear direction about the axis. Note that, in FIG. 9, the main body 913 is inclined forward. Therefore, the second swing member 822 is inclined forward with respect to the supports 93. The second swing member 822, however, is not inclined with respect to the main body 913.

To the lower end portion of the second swing member 822, a coupling portion 823 is provided. To the coupling portion 823, the upper end portion of the sub-rod 821 is coupled. The position of the coupling portion 823 deviates forward from the axis of the second swing member 822. When the sub-rod 821 moves downward, the second swing member 822 rotates in the counterclockwise direction in FIG. 9. When the sub-rod 821 moves upward, the second swing member 822 rotates in the clockwise direction in FIG. 9.

To the cover 912, a second rail 918 is fixed. The second rail 918 has a groove extending straight in the substantially front-rear direction. On both left and right sides of the main body 913, two engagement pins 919 that engage with the groove of the second rail 918 are provided spaced from each other in the front-rear direction. When the two engagement pins 919 are engaged with the groove of the second rail 918, the cover 912 is supported by the main body 913 and moves in the front-rear direction relative to the main body 913.

The upper end portion of the second swing member 822 is engaged with the rear end portion of the second rail 918. When the second swing member 822 rotates in the counterclockwise direction in FIG. 9, the cover 912 slides in a direction away from the main body 913, that is, in the forward direction. When the second swing member 822 rotates in the clockwise direction in FIG. 9, the cover 912 slides in a direction toward the main body 913, that is, in the rearward direction. Since the main body 913 and the cover 912 are interlocked with each other, an operation of mounting the external cassette 36 is simplified.

The cover 912 is an example of the slider that forms the space 914 in which the external cassette 36 is mounted. The second link mechanism 82 is an example of the coupling mechanism that couples the main body 913 to the cover 912 and transmits the movement of the main body 913 to the cover 912. The second swing member 822 is an example of the arm that slides the cover 912 by swinging about an axis (that is, the first axis) extending in the horizontal direction.

Next, the following describes interlocking between the first link mechanism 81 and the second link mechanism 82, with reference to FIG. 10A and FIG. 10B.

First, when the second transport unit 92 starts to move upward from P101 to P102 in FIG. 10A, the first arm 811 rotates in the clockwise direction, and the first gear 833 and the second gear 834 of the upper coupling portion 832 rotate in the counterclockwise direction. The main rod 831 moves upward.

When the main rod 831 moves upward, the first coupling portion of the lower coupling portion 836 moves upward, the cover 912 and the main body 913 of the mounter 91 rotates forward via the lower coupling portion 836. At this time, the cover 912 and the main body 913 are still integrated.

When the second transport unit 92 moves further upward, the main rod 831 moves further upward. When the guide pin 917 engages with the front end of the first rail 932, the main body 913 of the mounter 91 stops rotating forward. After that, when the second coupling portion of the lower coupling portion 836 moves further downward with the upward movement of the main rod 831, the sub-rod 821 moving downward causes the second swing member 822 to rotate in the counterclockwise direction, as indicated by P103 of FIG. 10B. With this, the cover 912 slides forward relatively to the main body 913. At this time, as illustrated in FIG. 10B, a movement amount ΔT1 of the upper end portion and a movement amount ΔT2 of the lower end portion of the cover 912 are the same or substantially the same.

When the second transport unit 92 is connected to the transport module 23 as indicated by P104 of FIG. 10B, the mounter 91 inclines forward and the cover 912 slides, thereby allowing the external cassette 36 to be mounted.

Note that, as described above, the torque limiter 835 releases coupling of the first link mechanism 81 and the second link mechanism 82, when the mounter 91 interferes with something while the operator moves the second transport unit 92. The operator can smoothly move the second transport unit 92.

After inserting the external cassette 36 into the mounter 91, the operator rotates the mounter 91 and the external cassette 36 so as to push the mounter 91 and the external cassette 36 inclined forward into the banknote handling device 1. At this time, the lower coupling portion 836 of the third link mechanism 83 moves in the opposite direction. That is, the main rod 831 moves upward. The second transport unit 92 is fixed to the upper housing 111 while being coupled to the transport module 23. Therefore, even if the main rod 831 moves upward, the torque limiter 835 slides. The first link mechanism 81 and the second link mechanism 82 are not interlocked with each other. Thus, the operator can manually let the mounter 91 and the external cassette 36 stand up.

Further, to remove the external cassette 36 mounted on the mounter 91 and stow the mounting unit 9, the operator first inclines the external cassette 36 and the mounter 91 to the front of the banknote handling device 1. In this case, the main rod 831 moves downward. However, since the torque limiter 835 of the third link mechanism 83 slides, the operator can manually incline the mounter 91 and the external cassette 36 forward.

When the mounter 91 and the external cassette 36 incline forward, the operator pulls out the external cassette 36 from the mounter 91 by pulling the external cassette 36 obliquely upward.

After pulling out the external cassette 36 from the mounter 91, the operator operates the first handle 922 of the second transport unit 92 to pull down the second transport unit 92. As shown in FIG. 10B and FIG. 10A, the second transport unit 92 is moved downward along an arc trajectory by the first link mechanism 81 in a direction opposite to that described above. The third link mechanism 83 transmits the movement of the first link mechanism 81 to the second link mechanism 82. The second link mechanism 82 moves the cover 912 rearward and rotates the mounter 91 rearward. Then, as indicated by P101 of FIG. 10A, when the second transport unit 92 is accommodated between the supports 93, stowing of the mounting unit 9 is completed. Note that the first lock 901 is configured to fix the second transport unit 92 to the supports 93.

Here, as shown in an enlarged view of FIG. 10A, a step is formed at the upper edge of the first surface 911 of the mounter 91. With this step, the lower edge of the second surface 921 of the second transport unit 92 is engaged. The second surface 921 of the second transport unit 92 is positioned further forward than the first surface 911 of the mounter 91, and presses the first surface 911 of the mounter 91 rearward. Since the second transport unit 92 is fixed to the supports 93 by the first lock 901, the mounter 91 is also fixed to the supports 93. Further, since the first surface 911 and the second surface 921 are continuous without a clearance and without a step, the good appearance of the banknote handling device 1 is improved.

(Modification of Second Link Mechanism)

Figure 11:
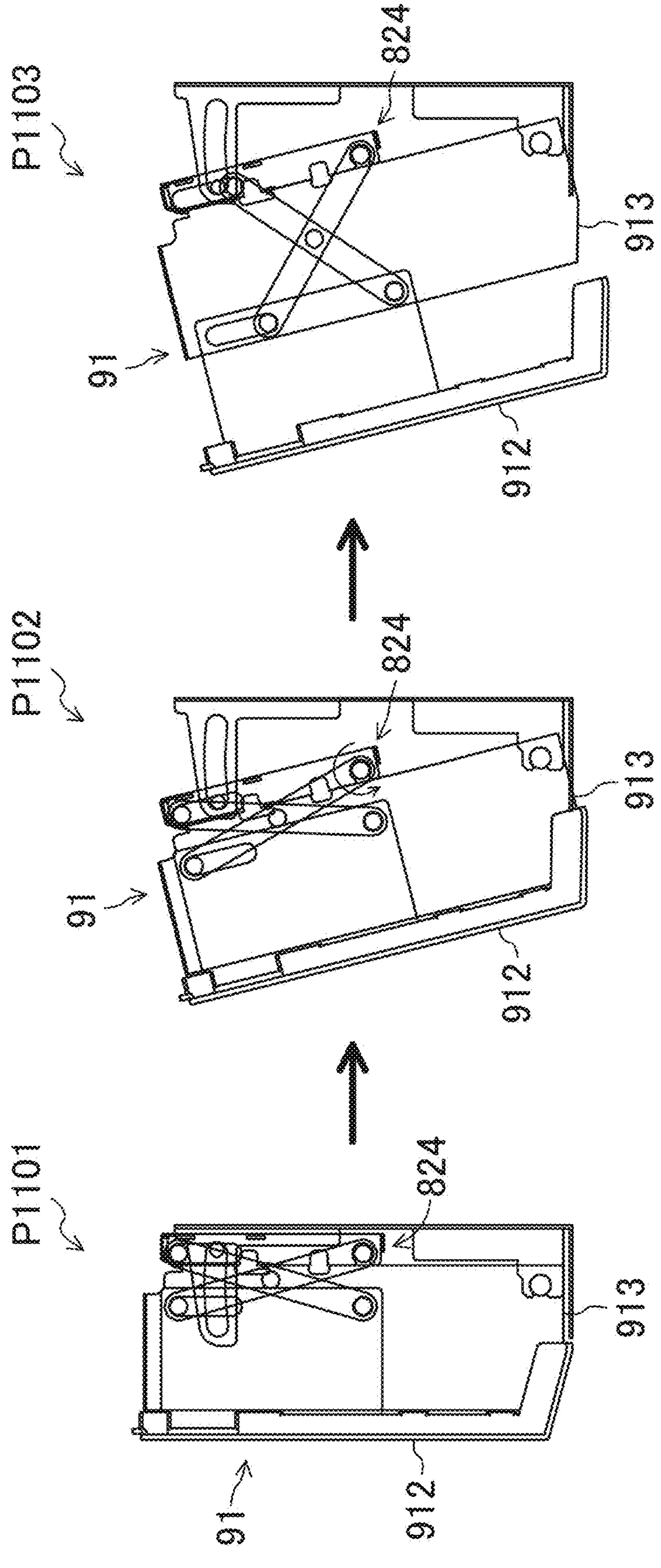
FIG. 11 shows a modification of the link mechanism that deforms a mounter.

The second link mechanism 82 illustrated in FIG. 9 includes the second swing member 822 that is an arm, and the cover 912 moves as the second swing member 822 swings. The second link mechanism is not limited to this configuration. FIG. 11 shows a first modification of the second link mechanism.

The link mechanism according to the first modification has a mechanism in which two arms are rotatably crossed with each other so as to be able to extend and contract (that is, the lazy tong mechanism 824). The first arm and the second arm are interposed between the main body 913 and the cover 912 of the mounter 91. The sub-rod 821 is coupled near the end of the first arm. When the sub-rod 821 moves downward as described above during a state in which the lazy tong mechanism 824 shown in P1101 is contracted, the lazy tong mechanism 824 extends as shown in P1102. Therefore, the cover 912 slides in the direction away from the main body 913 (see P1103).

Figure 12:
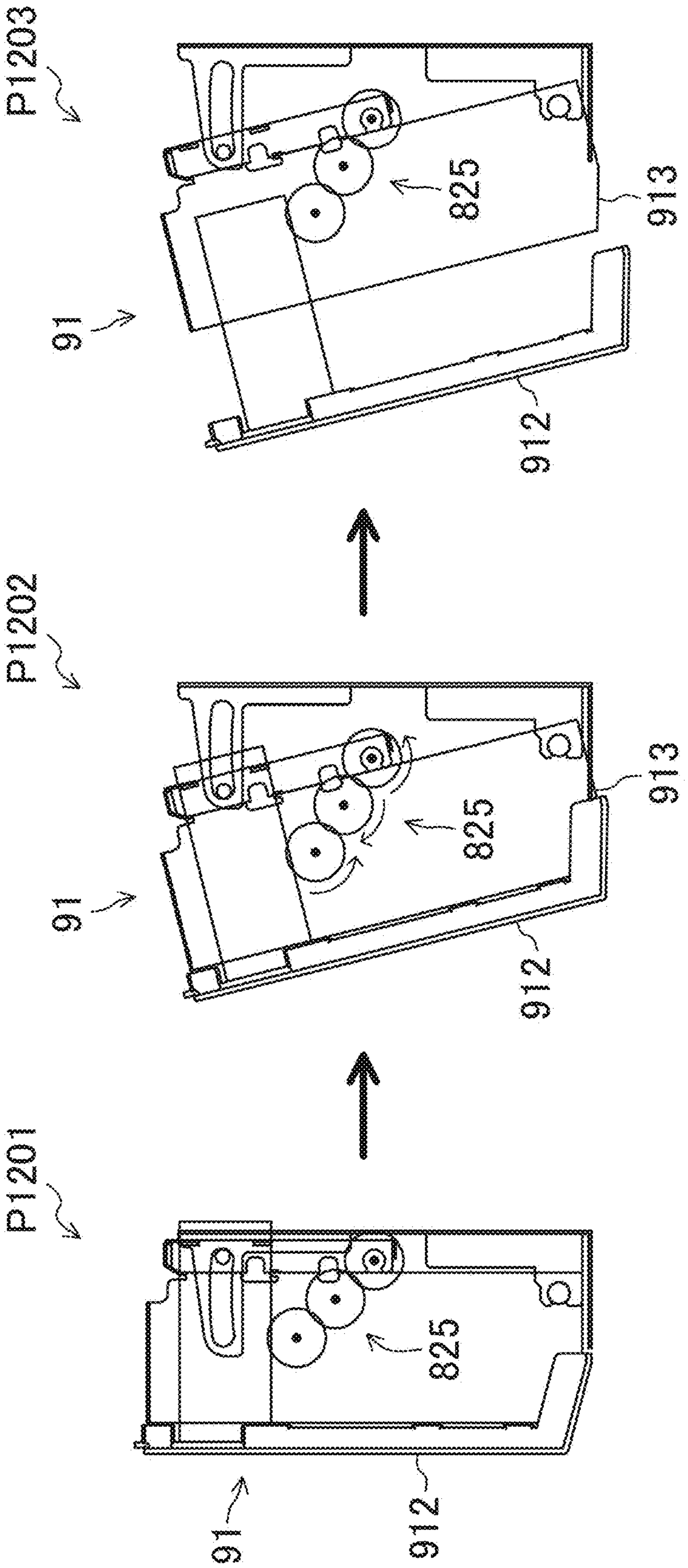
FIG. 12 shows another modification of the link mechanism that deforms the mounter.

FIG. 12 shows a link mechanism according to a second modification. This link mechanism has a rack and pinion mechanism 825. The rack and pinion mechanism 825 includes a rack fixed to the cover 912 and a pinion type gear meshing with the rack. The pinion type gear meshes with the first gear and the first gear meshes with the second gear. The pinion type gear, the first gear, and the second gear are supported by the main body 913 of the mounter 91. The sub-rod 821 is coupled to the second gear. When the sub-rod 821 moves downward as described above during a state in which the cover 912 and the main body 913 shown in P1201 are integrated, the second gear rotates in the counterclockwise direction as indicated in P1202. With the first gear transmitting its rotation to the pinion type gear, the pinion type gear rotates in the counterclockwise direction. Since this causes the rack to move forward, the cover 912 slides in the direction away from the main body 913 as shown in P1203.

(Shutter Configuration of Transport Module)

Figure 13:
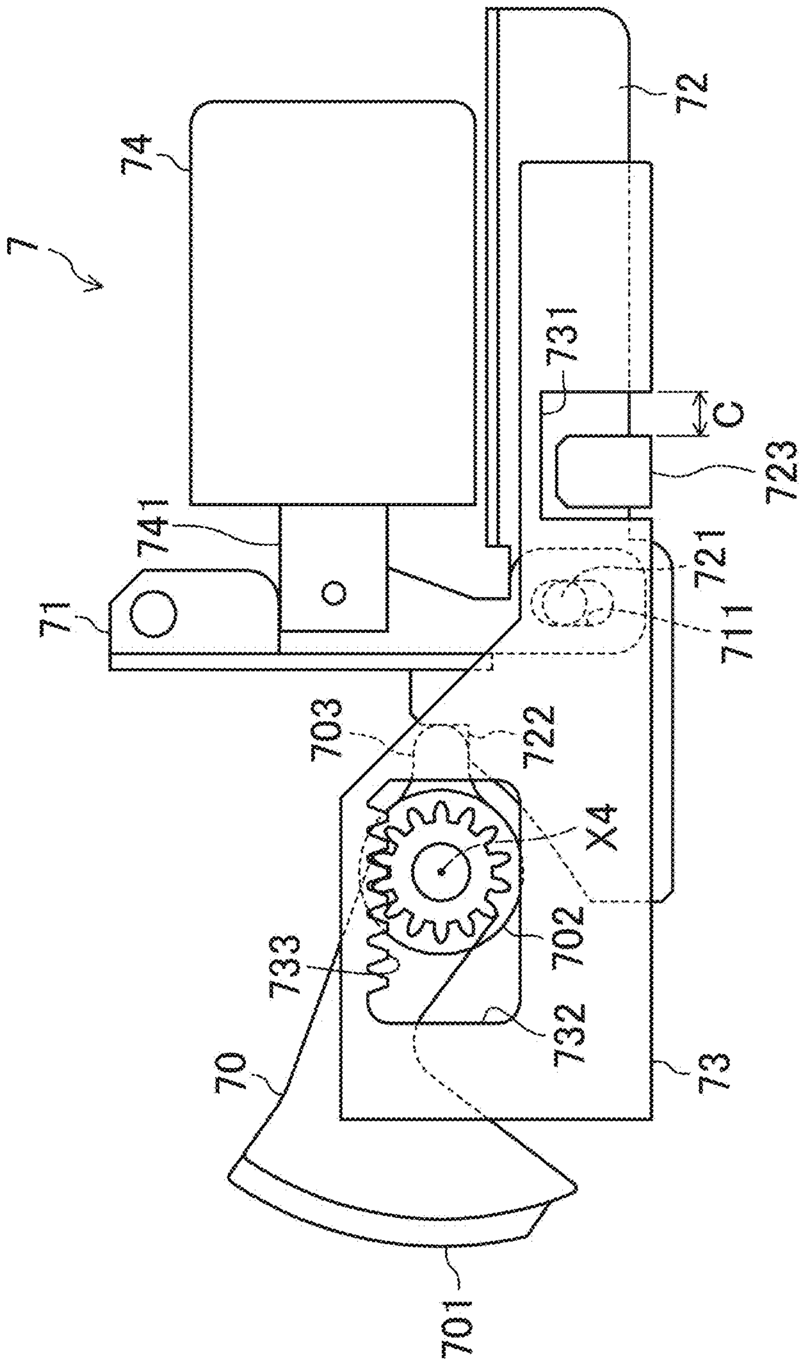
FIG. 13 is a view illustrating a shutter opening/closing mechanism.

The transport module 23 includes the shutter 70 that opens and closes the connection port 231. FIG. 13 illustrates a configuration of an opening/closing mechanism 7 that opens and closes the shutter 70 of the transport module 23.

The shutter 70 has an opening/closing part 701, a swing support 702 constituting a swing center of the opening/closing part 701, and an engagement piece 703. The opening/closing part 701 opens and closes the connection port 231 opened in the upper housing 111. The swing support 702 is positioned behind the opening/closing part 701 and is supported with respect to the upper housing 111. The swing support 702 and the opening/closing part 701 are connected by an arm extending in the front-rear direction. As the swing support 702 rotates about the fourth axis X4, the opening/closing part 701 swings in the up-down direction about the fourth axis X4 extending in the left-right horizontal direction. The engagement piece 703 is positioned on the opposite side to the opening/closing part 701 over the swing support 702. The engagement piece 703 is provided so as to protrude radially outward from the edge of the swing support 702. The engagement piece 703 is provided integrally with the swing support 702. When the swing support 702 rotates, the engagement piece 703 also rotates about the fourth axis X4. The engagement piece 703 engages with a later-described step portion 722 to restrict the opening/closing part 701 from opening.

The opening/closing mechanism 7 includes a first member 71, a second member 72, a third member 73, and an actuator 74. The actuator 74 is a linear solenoid actuator. The actuator 74 has a rod 741 that advances and retracts in the front-rear direction.

Figure 14:
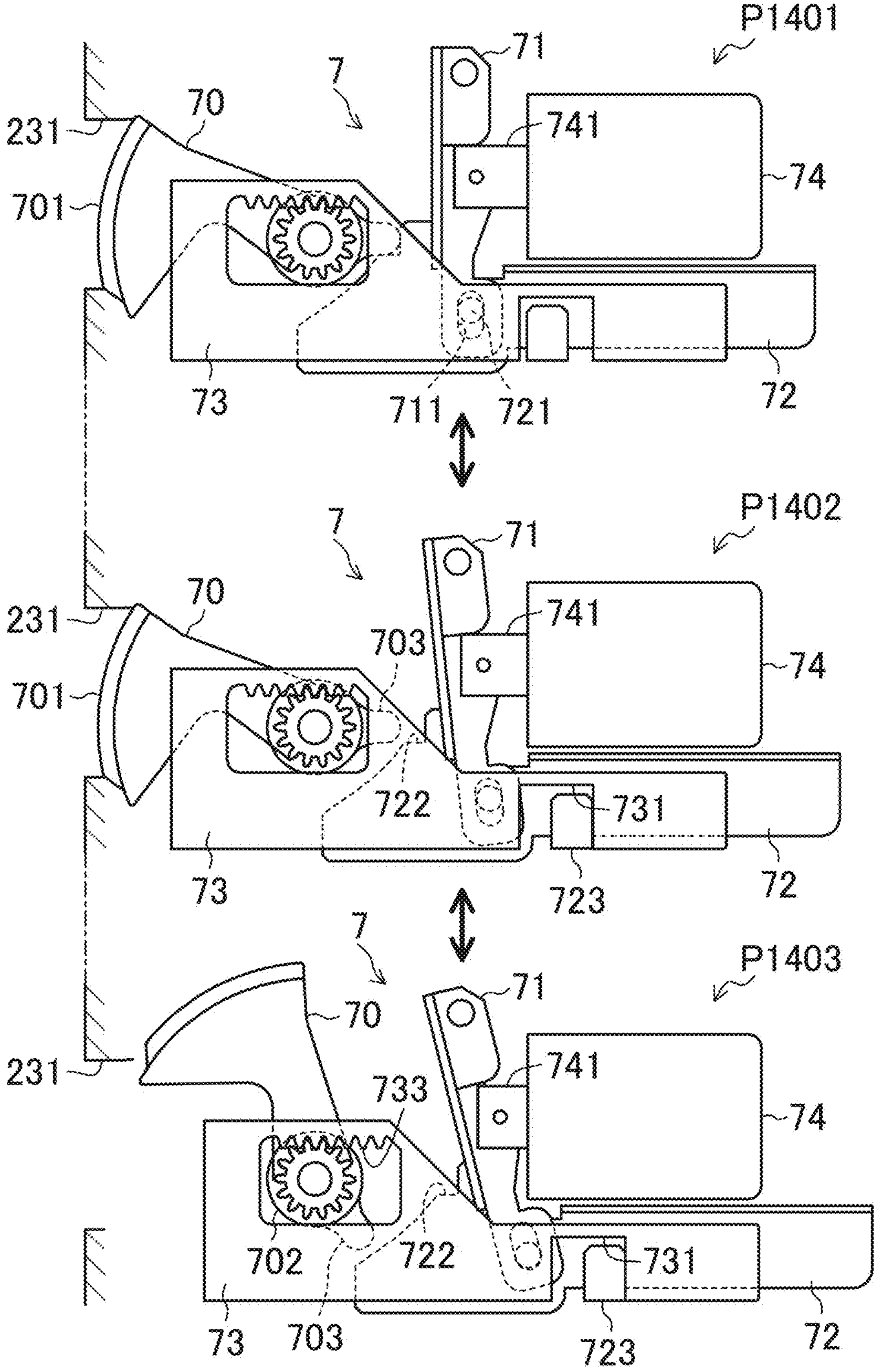
FIG. 14 is a transition diagram showing a movement of the opening/closing mechanism.

The first member 71 is engaged with the rod 741. The first member 71 extends in the up-down direction. The upper end portion of the first member 71 is rotatably supported with respect to the upper housing 111. An elongated hole 711 extending in the up-down direction is formed in a lower end portion of the first member 71. The rod 741 is engaged with an intermediate portion of the first member 71. As shown in FIG. 14, when the rod 741 moves forward and backward, the first member 71 swings in the front-rear direction.

The second member 72 is engaged with the first member 71. The second member 72 has a pin 721 inserted into the elongated hole 711 of the first member 71. The pin 721 is attached to an intermediate portion of the second member 72 extending in the front-rear direction. The second member 72 is supported so as to reciprocate in the front-rear direction with respect to the upper housing 111. When the first member 71 swings, the second member 72 reciprocates back and forth.

The step portion 722 is provided at a front end portion of the second member 72. The step portion 722 engages with the engagement piece 703 of the shutter 70. The edge of the front end of the second member 72 has an arc shape continuous with the step portion 722.

On the rear side of the pin 721 of the second member 72, a contact piece 723 is formed. The contact piece 723 engages with a later-described recessed portion 731 of the third member 73.

The third member 73 is disposed so as to overlap the second member 72. Similarly to the second member 72, the third member 73 is also supported so as to reciprocate in the front-rear direction with respect to the upper housing 111.

The third member 73 is provided with the recessed portion 731 that engages with the contact piece 723 of the second member 72. The recessed portion 731 is formed by cutting out a portion of the third member 73. In the recessed portion 731, the contact piece 723 of the second member 72 is accommodated. A clearance C of a predetermined amount is provided between the contact piece 723 and the edge of the recessed portion 731.

As described above, when the second member 72 moves rearward by the clearance C, the rear edge of the contact piece 723 abuts against the rear edge of the recessed portion 731. During this state, when the second member 72 further moves rearward, the third member 73 is pushed by the contact piece 723 and moves rearward.

In a front portion of the third member 73, a window 732 is formed. In an upper edge portion of the window 732, a rack 733 extending in the front-back direction is formed.

On the swing support 702 of the shutter 70, a gear is formed. The gear meshes with the rack 733 of the third member 73. When the third member 73 moves rearward, the gear meshed with the rack 733 rotates, thereby displacing the opening/closing part 701 from the state of closing the connection port 231 as shown in FIG. 14 to the state of opening the connection port 231.

In a state where the opening/closing part 701 closes the connection port 231, the engagement piece 703 of the shutter 70 engages with the step portion 722 of the second member 72. In this state, even if an attempt is made to manually rotate the opening/closing part 701 in the clockwise direction in FIG. 13, the engagement piece 703 is engaged with the step portion 722, and therefore the swing support 702 does not rotate. The shutter 70 is locked in the closed state.

Next, the operation of the opening/closing mechanism 7 will be described with reference to FIG. 14. P1401 in FIG. 14 shows a state in which the shutter 70 is closed. The rod 741 of the actuator 74 is extended.

P1402 shows a state in which the rod 741 of the actuator 74 is contracted. As described above, the first member 71 moves rearward, and the second member 72 moves rearward via the pin 721 engaged with the elongated hole 711. The contact piece 723 of the second member 72 abuts against the edge of the recessed portion 731. Up to this point, the third member 73 does not move. In this state, the step portion 722 of the second member 72 is shifted rearward relative to the engagement piece 703. The shutter 70 is unlocked.

P1403 shows a state in which the rod 741 of the actuator 74 is further contracted. The first member 71 further moves rearward, and the second member 72 further moves rearward. The contact piece 723 of the second member 72 pushes the third member 73 rearward. As the third member 73 moves rearward, the rack 733 moves rearward and the gear of the swing support 702 rotates in the clockwise direction. The opening/closing part 701 blocking the connection port 231 moves upward from the connection port 231 to open the connection port 231.

When the connection port 231 is closed, the energization to the actuator 74 is stopped. The contracted rod 741 is extended by the spring. The first member 71 rotates in the clockwise direction, and the second member 72 moves forward. Since the contact piece 723 pushes the third member 73 forward, the gear engaged with the rack 733 and the swing support 702 rotate in the counterclockwise direction. Then, the opening/closing part 701 closes the connection port 231 (P1402).

While the opening/closing part 701 is closed, the second member 72 further moves forward. The step portion 722 engages with the engagement piece 703. Thus, the shutter 70 is locked (P1401).

The opening/closing mechanism 7 performs locking and unlocking of the shutter 70 and opening/closing of the shutter 70 by a single actuator 74. Therefore, it is possible to downsize the opening/closing mechanism 7 and reduce the costs.

(Connection Configuration of Transport Module and Second Transport Unit)

Next, a connection configuration between the transport module 23 and the second transport unit 92 will be described with reference to FIG. 15. As described above, to move the second transport unit 92, the operator operates the release switch 903. After that, when the operator places a finger on the first handle 922 and operates the first handle 922, a sensor 924 (see FIG. 3) detects the movement of the first handle 922. The controller 15 drives the actuator 74 of the opening/closing mechanism 7 of the shutter 70, in response to a detection signal from the sensor 924. As described above, the shutter 70 moves to open the connection port 231.

The operator lifts the second transport unit 92. The second transport unit 92 is moved along an arc trajectory by the second link mechanism 82. As indicated by an arrow of a chain line in FIG. 15, the arc trajectory intersects the connection port 231 substantially straight. Therefore, the second engagement part 923 of the second transport unit 92 can be smoothly connected to the connection port 231.

Here, the second engagement part 923 of the second transport unit 92 protrudes rearward from the rear surface of the second transport unit 92. The second engagement part 923 is formed in a comb tooth shape that is uneven in the front-rear direction and extends in the left-right direction (see also FIG. 7). The transport module 23 also has the first engagement part 232 having a comb-tooth shape (see FIG. 1). The first engagement part 232 of the transport module 23 is positioned at the connection port 231. The comb teeth of the first engagement part 232 of the transport module 23 engage with the comb teeth of the second engagement part 923 of the second transport unit 92, thus connecting the transport module 23 and the second transport unit 92 with each other. By having the comb teeth engaged with one another, banknotes can smoothly pass between the transport module 23 and the second transport unit 92.

Figure 15:
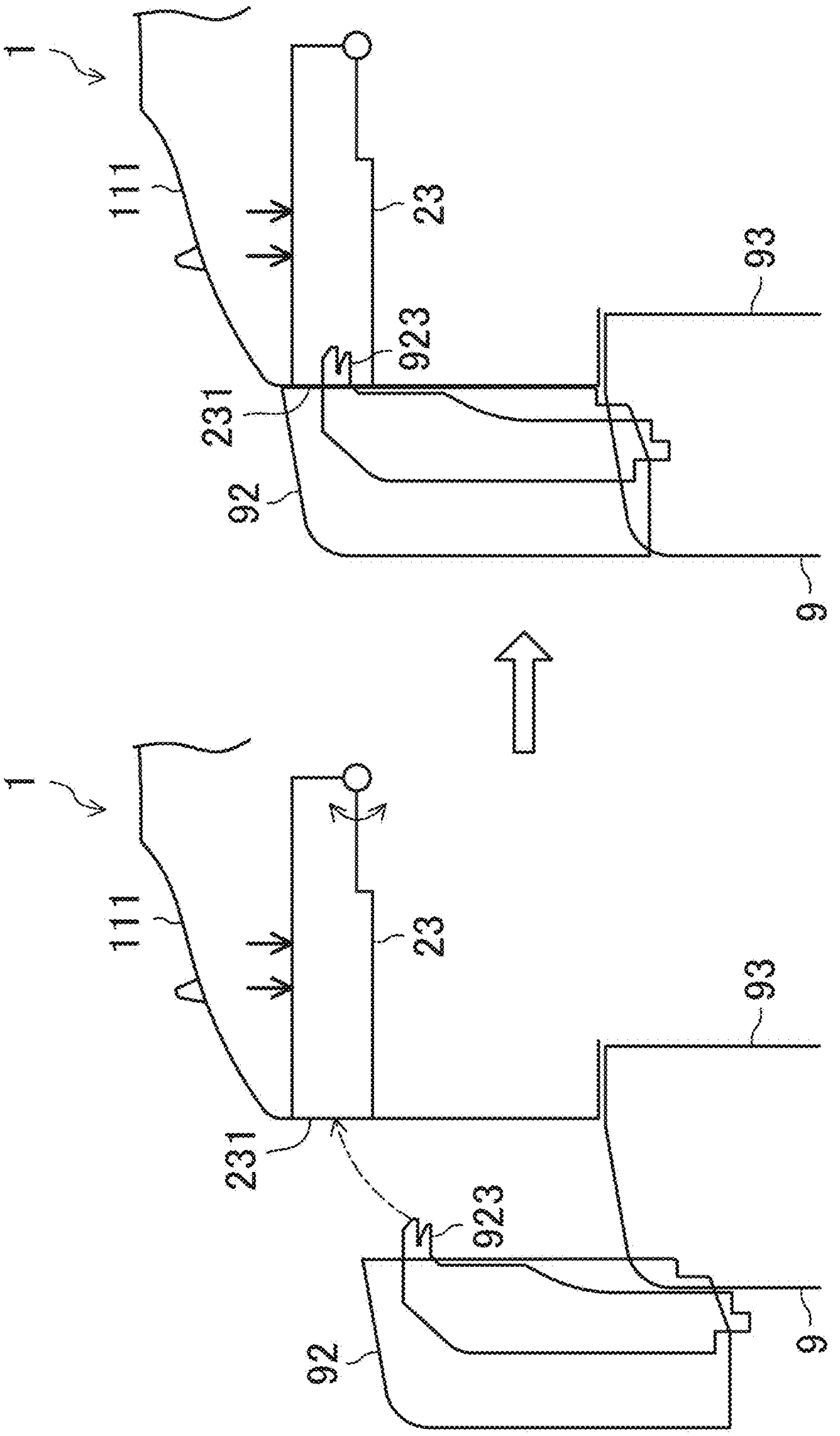
FIG. 15 is a view showing a connection structure between a first transport unit and a second transport unit.

As shown in FIG. 15, the transport module 23 supported by the upper housing 111 can rotate by a minute amount in the clockwise direction and the counterclockwise direction, with its rear end portion as the fulcrum. That is, the front end portion of the transport module 23 can be displaced by a minute amount in the up-down direction. Further, to the transport module 23, a downward biasing force is applied as indicated by the solid arrow of FIG. 15.

When the second transport unit 92 moving from the lower side to the upper side engages with the first engagement part 232 of the transport module 23, the positions of the second link mechanism 82 and the first engagement part 232 in the up-down direction may be misaligned due to backlash or the like. Since the front end portion of the transport module 23 is displaced upward and downward, the operator can reliably connect the second engagement part 923 of the second transport unit 92 to the first engagement part 232 of the transport module 23.

Further, since the transport module 23 is biased downward, the transport module 23 presses the second transport unit 92 downward, while the transport module 23 and the second transport unit 92 are connected to each other. Therefore, it is possible to accurately bring the second transport unit 92 connected to the transport module 23 to a predetermined position. The second transport unit 92 is fixed to the upper housing 111 during that state, by the first lock 901.

With the above described connection configuration, the operability of the second transport unit 92 by the operator is improved.

(Interlock of External Cassette)

The external cassette 36 has therein a banknote transport mechanism, and the transport mechanism stores and feeds banknotes through the inlet/outlet port 361. However, the external cassette 36 does not include a drive source for operating the transport mechanism. The external cassette 36, while being mounted on the mounting unit 9, receives drive force from the banknote handling device 1 by being mechanically coupled to a drive force transmission unit 94 provided to the mounter 91.

Figure 16:
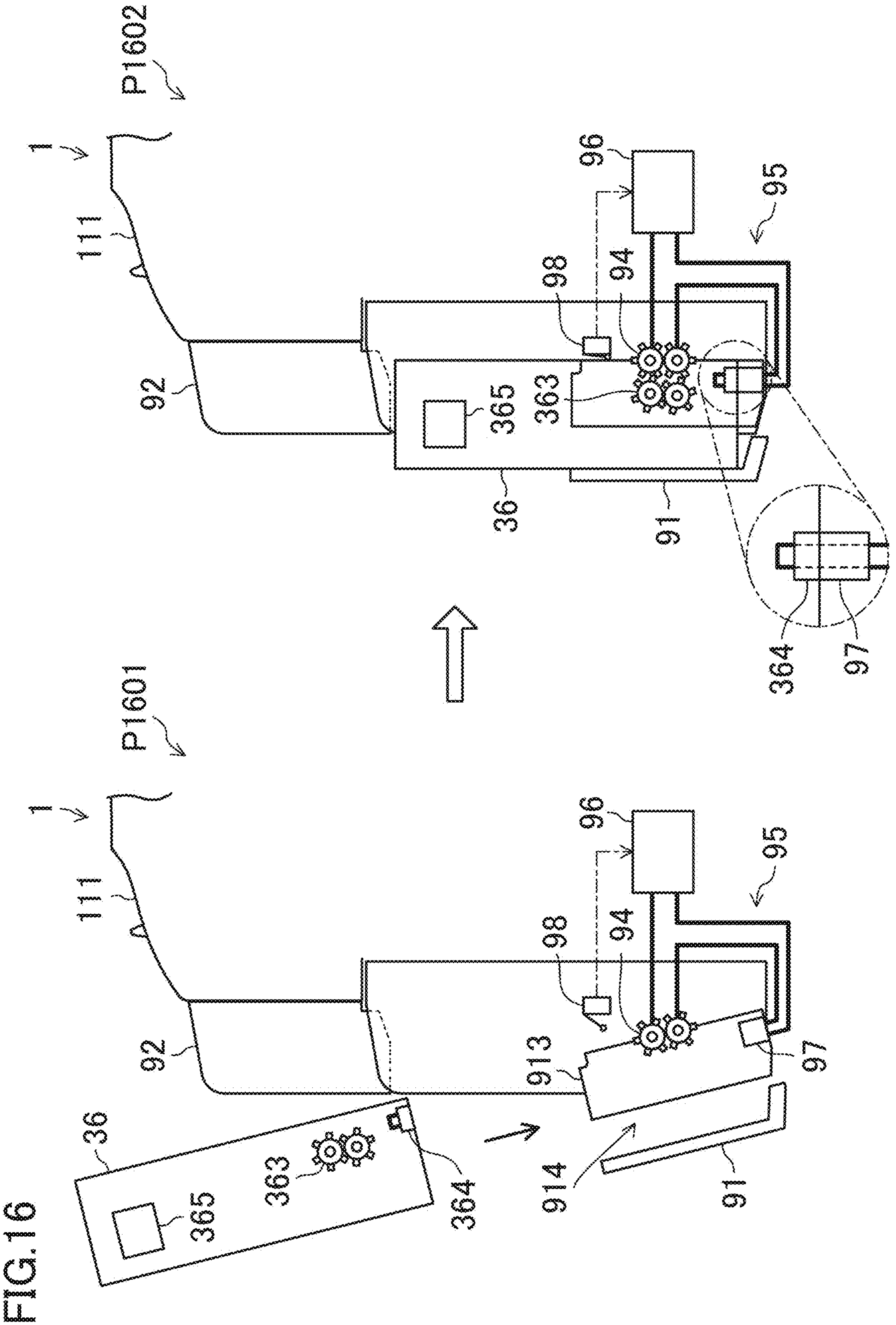
FIG. 16 is a view illustrating an interlock related to drive of the external cassette.

FIG. 16 schematically shows a configuration for transmitting the drive force to the external cassette 36. The banknote handling device 1 includes the drive force transmission unit 94 configured to transmit a drive force to the external cassette 36, an electric circuit 95 for supplying electric power to a drive source of the drive force transmission unit 94, and a control unit 96 configured to drive the drive force transmission unit 94.

The drive force transmission unit 94 has a gear. The gear is mechanically connected to the external cassette 36 as illustrated in FIG. 16. The external cassette 36 has a connection gear 363 connected to the gear of the drive force transmission unit 94. As shown in P1602 of FIG. 16, when the external cassette 36 is mounted on the mounter 91, the gear of the drive force transmission unit 94 is connected to the connection gear 363 of the external cassette 36. When the gear of the drive force transmission unit 94 rotates, the connection gear 363 of the external cassette 36 rotates, thus allowing the transport mechanism of the external cassette 36 to feed out and take in banknotes. In a state where the external cassette 36 is mounted on the mounter 91, the drive force transmission unit 94 is not exposed to the outside.

As shown in P1601 of FIG. 16, while the external cassette 36 is not mounted on the mounter 91, a portion of the drive force transmission unit 94 is exposed to the outside, more specifically, to the space 914. The operator can touch the drive force transmission unit 94 by putting his/her hand inside the space 914. The banknote handling device 1 may be provided with an interlock that restricts the exposed drive force transmission unit 94 from operating.

The mounter 91 is provided with a first connector 97 for electrically connecting the external cassette 36 and the banknote handling device 1. The external cassette 36 is provided with a second connector 364 (see also FIG. 3). The first connector 97 and the second connector 364 may be drawer connectors. When the external cassette 36 is mounted on the mounter 91, the first connector 97 and the second connector 364 are connected to each other. The first connector 97 and the second connector 364 may be, for example, connectors for communication of information read from the memory 365 of the external cassette 36 or written to the memory 365. The first connector 97 and the second connector 364 may be, for example, connectors for supplying electric power to the external cassette 36. The first connector 97 and the second connector 364 may be, for example, a communication connector and an electric power supply connector.

The electric circuit 95 connects the drive force transmission unit 94 and the control unit 96 together. The control unit 96 receives supply of electric power and controls the operation of the drive force transmission unit 94. The control unit 96 includes a drive source, and the electric circuit 95 supplies electric power to the drive source.

The first connector 97 provided on the mounter 91 is connected to the electric circuit 95. The electric circuit 95 is open at the first connector 97. In P1601 of FIG. 16, the drive force transmission unit 94 does not operate because the electric circuit 95 is not closed.

The second connector 364 includes a loop. That is, two terminals of the second connector 364 are directly connected to each other. When the first connector 97 and the second connector 364 are connected, as shown in an enlarged view in P1602 of FIG. 16, the loop of the second connector 364 closes the electric circuit 95.

Therefore, as shown in P1601 of FIG. 16, while the external cassette 36 is not mounted on the mounter 91, the first connector 97 and the second connector 364 are not connected to each other, and therefore the electric circuit 95 is not closed. The drive force transmission unit 94 while being exposed does not operate. As shown in P1602 of FIG. 16, when the operator mounts the external cassette 36 on the mounter 91 and the first connector 97 and the second connector 364 are connected to each other, the electric circuit 95 is closed and the drive force transmission unit 94 is hidden by the external cassette 36. In this state, electric power is supplied to the drive source, and the control unit 96 can operate the drive force transmission unit 94. The external cassette 36 connected to the banknote handling device 1 can feed out and store banknotes. The second connector 364 functions as a first switch (i.e., corresponding to the first detector) for operating the drive force transmission unit 94.

By using the connector that electrically connects the external cassette 36 and the banknote handling device 1, the banknote handling device 1 can achieve an interlock without additionally attaching a switch or the like. Further, the configuration of the interlock is not complicated and is simple. Further, since interlock is achieved by a mechanical configuration, malfunction can be suppressed.

Note that, other than providing the above-described interlock to the outside of the housing of the banknote handling device 1, the interlock may be provided inside the housing of the banknote handling device 1. For example, an interlock may be provided in each of the fitting parts 1311 to 1315.

Here, the mounting unit 9 may further include a second switch 98 in addition to the first switch. As illustrated in FIG. 16, the second switch 98 is attached to the mounting unit 9 so as to turn off when the mounter 91 is inclined forward and turn on when the mounter 91 stands up. The second switch 98 is connected to the control unit 96. The second switch 98 outputs an ON signal to the control unit 96. The second switch 98 is an example of the second detector.

The control unit 96 may be configured to operate the drive force transmission unit 94 when both the first switch and the second switch 98 are in the ON state. In this way, the banknote handling device 1 operates the drive force transmission unit 94 only when the following two conditions are satisfied:

(1) the first connector 97 and the second connector 364 are connected to each other and the electric circuit 95 is closed (that is, the first switch is turned on); and (2) the mounter 91 stands up and the second switch 98 turns on.

That is, processing using the external cassette 36 is executed.

With this configuration, the drive force transmission unit 94 does not operate in each of the following states (1) to (4). Namely, (1) the stowed state of the mounting unit 9 shown in FIG. 1; (2) a state in which the mounting unit 9 shown in FIG. 6A is between the stowed state and the unfolded state; (3) a state, while the mounting unit 9 is in the unfolded state shown in FIG. 6B, in which the external cassette 36 is not inserted, or in which the external cassette 36 is inserted but the mounter 91 is inclined as shown in FIG. 6C; and (4) the retracted state shown in FIG. 7 in which the mounting unit 9 is rotated. In all these states, the drive force transmission unit 94 does not operate. This further improves the safety of the banknote handling device 1.

(Attachment Configuration of Mounting Unit and Door of Safe Housing)

As described above, the mounting unit 9 is disposed in front of the door 1310 of the safe housing 131. The mounting unit 9 covers the door 1310. The supports 93 of the mounting unit 9 is supported by the safe housing 131 via a first hinge 1316 (see FIG. 17). The door 1310 is supported at its left end by the safe housing 131 via a second hinge 1317.

Figure 20:
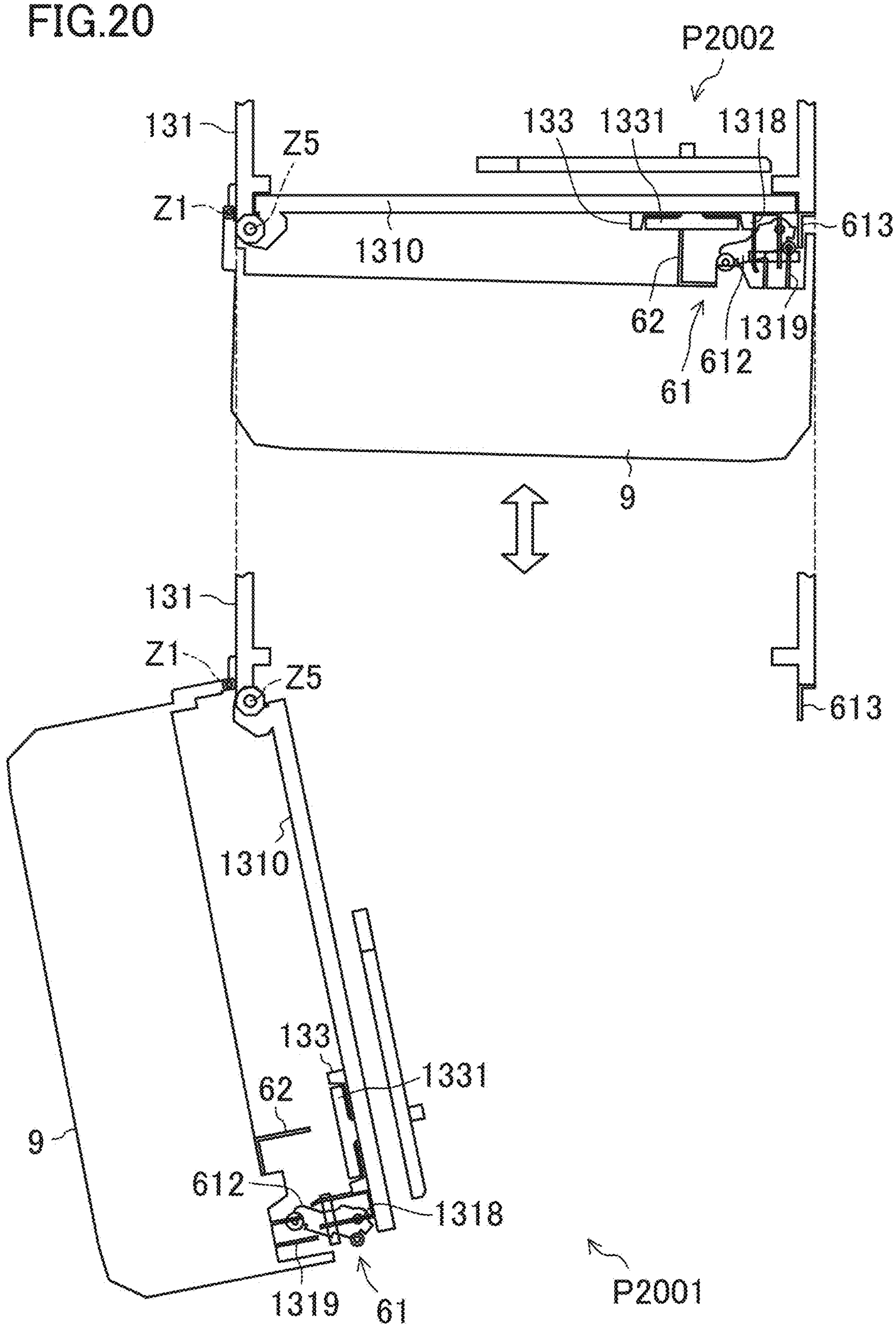
FIG. 20 is a view illustrating an interference state of the mounting unit and the door by the first interference part and the second interference part.

FIG. 20 shows a front end portion of the safe housing 131 in a plan view. As shown in FIG. 20, the position of the first axis Z1 of the first hinge 1316 is different from the position of a fifth axis Z5 of the second hinge 1317. The door 1310 and the mounting unit 9 can rotate independently of each other. The rotation trajectory of the door 1310 does not coincide with the rotation trajectory of the mounting unit 9.

Figure 17:
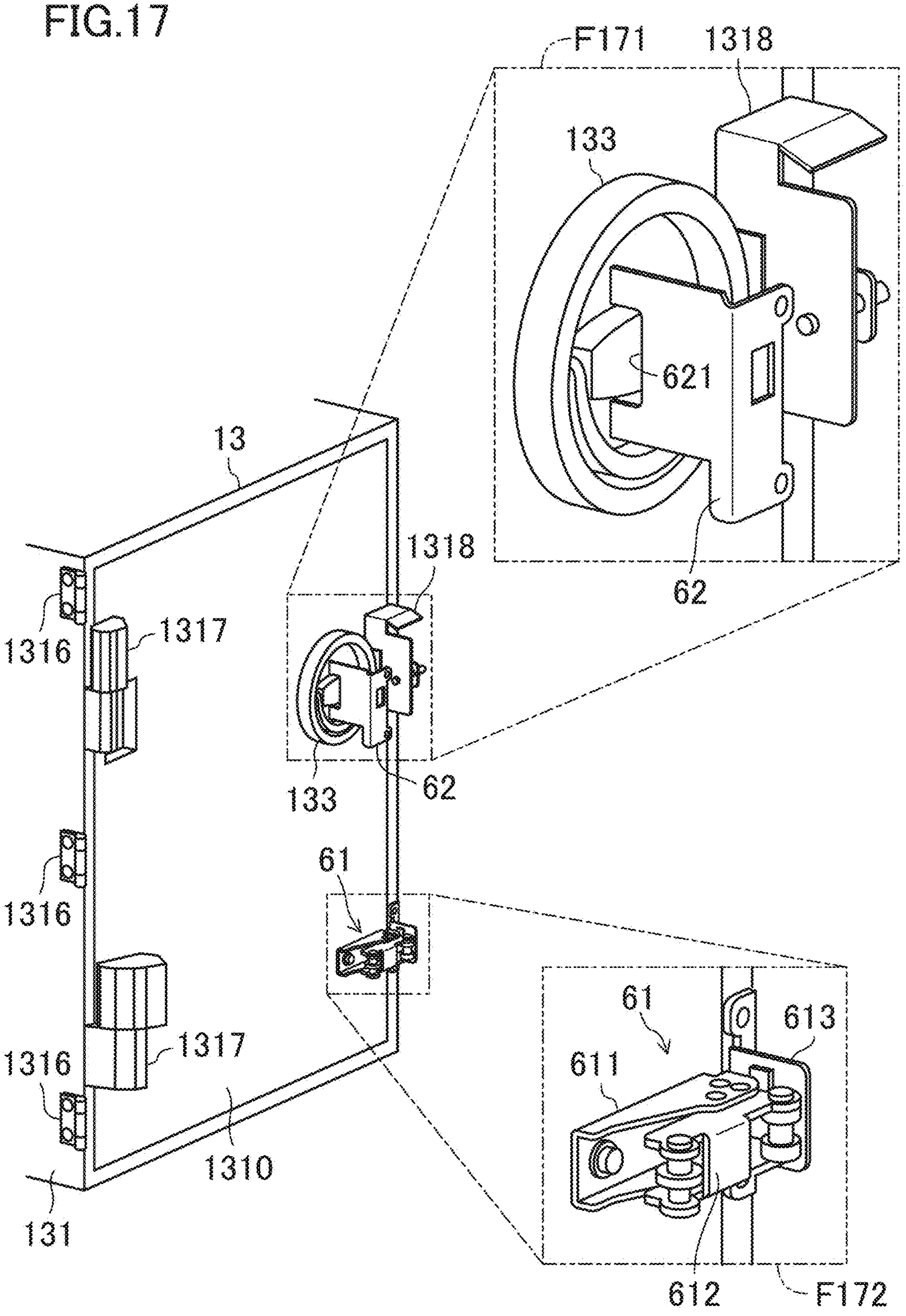
FIG. 17 is a perspective view illustrating an interference configuration of the mounting unit and a door.
Figure 18:
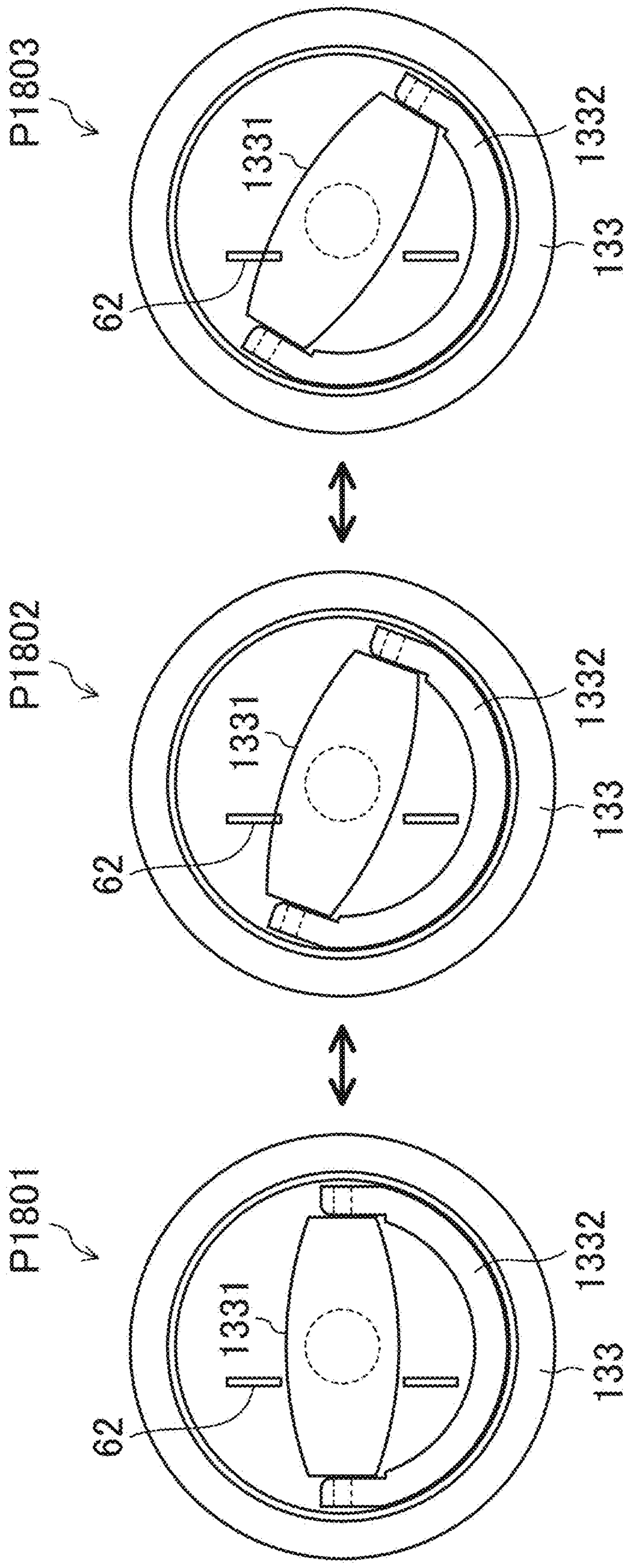
FIG. 18 is a view illustrating a relation between a handle of the door and a first interference part.

As shown in FIG. 17, the door 1310 is provided with an opening/closing handle 133. The opening/closing handle 133 is provided at the right end position of the door 1310 on the opposite side of the second hinge 1317. As shown in FIG. 18, the opening/closing handle 133 includes a rotating part 1331 and a grip part 1332. The rotating part 1331 has a shape of a laid barrel. The rotating part 1331 is provided so as to rotate with respect to the door 1310 about an axis perpendicularly crossing the surface of the door 1310. Rotating the rotating part 1331 causes switching between a state of locking the door 1310 and a state of unlocking and permitting the door 1310 to open. In the state of locking the door 1310, the rotating part 1331 is horizontal as shown in P1801 of FIG. 18. As shown in P1802 and P1803, the door 1310 is not locked when the rotating part 1331 is inclined.

The grip part 1332 has a substantially semicircle arc shape, and is attached to the rotating part 1331 so as to be able to swing in the front-rear direction. The operator can rotate the rotating part 1331 by holding the grip part 1332.

Between the mounting unit 9 and the door 1310, an engaging part 1318 that can engage the mounting unit 9 with the door 1310 is interposed. The engaging part 1318 is fixed to the door 1310. On the back side of the mounting unit 9, an engaged part 1319 that engages with the engaging part 1318 is provided as shown in FIG. 20. As the door 1310 closes with respect to the safe housing 131, the engaging part 1318 and the engaged part 1319 are engaged with each other, thereby fixing the mounting unit 9 to the door 1310 and covers the door 1310. The door 1310 and the mounting unit 9 are integrated.

Regardless of whether the door 1310 is closed or open, the engaging part 1318 of the door 1310 and the engaged part 1319 of the mounting unit 9 can engage with each other. Supposing that the engaging part 1318 and the engaged part 1319 are engaged with each other thus integrating the door 1310 with the mounting unit 9. In this state, if an attempt is made to rotate the mounting unit 9 about the fifth axis Z5 while rotating the door 1310 about the first axis Z1, the door 1310 and the mounting unit 9 integrated with each other may interfere with each other, and a trouble may occur in opening/closing operation of the door 1310 and in opening/closing operation of the mounting unit 9, because the rotation trajectory of the door 1310 does not coincide with the rotation trajectory of the mounting unit 9.

To address this, an interference member is provided to the banknote handling device 1. The interference member allows the engaging part 1318 and the engaged part 1319 to be engaged with each other between the door 1310 and the mounting unit 9 only when the door 1310 is closed and locked to the safe housing 131, and prohibits the engaging part 1318 and the engaged part 1319 from being engaged with each other otherwise.

The interference member includes a first interference member 61 and a second interference member 62. The first interference member 61 is attached to the door 1310. The second interference member 62 is attached to the mounting unit 9.

Figure 19:
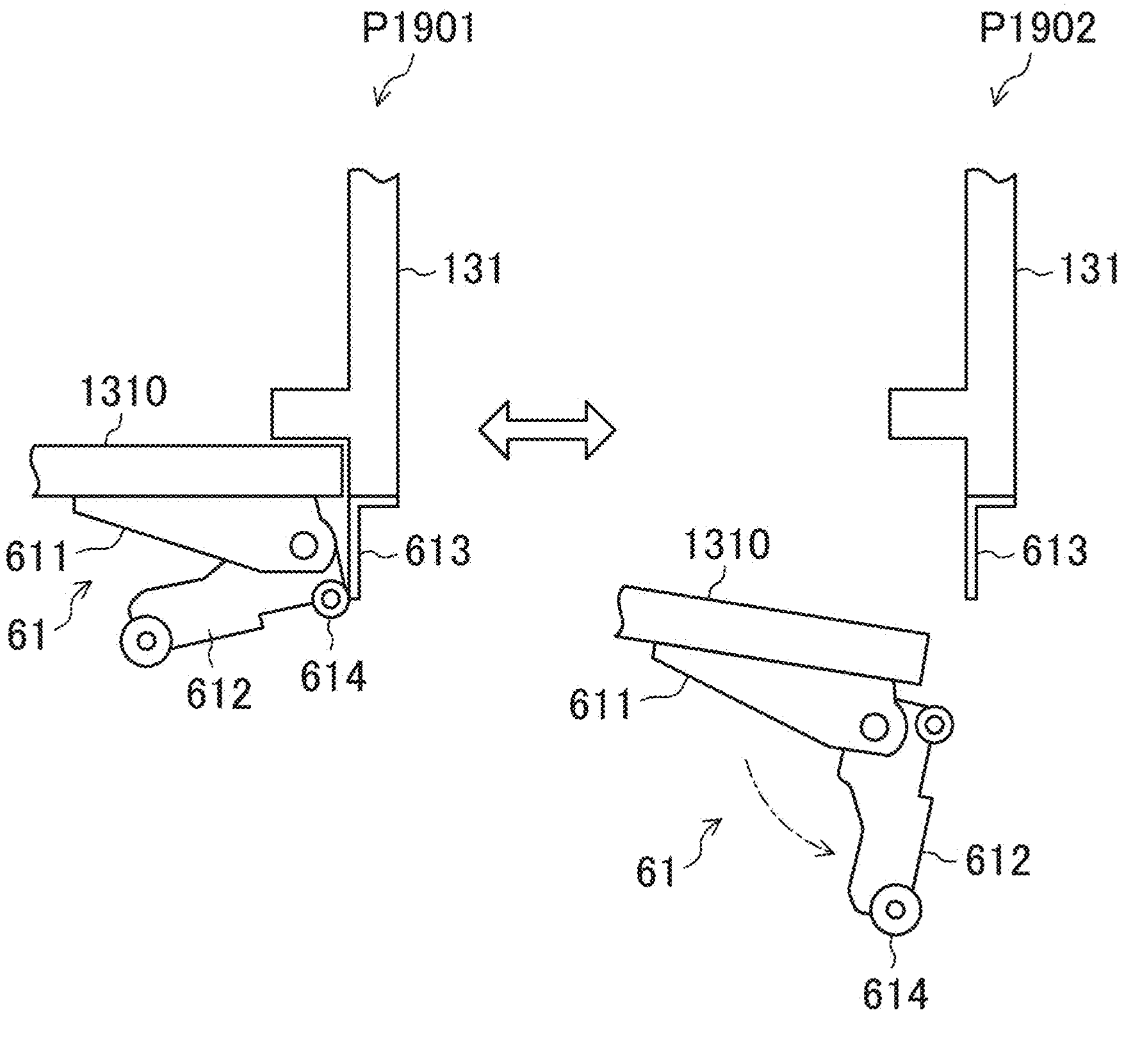
FIG. 19 is a view illustrating a movement of a second interference part.

When the door 1310 is open, the first interference member 61 maintains the door 1310 and the mounting unit 9 distanced by a certain distance or more. As shown in an enlarged view F172 of FIG. 17, the first interference member 61 is attached to the lower side of the opening/closing handle 133 on the opposite side of the second hinge 1317 of the door 1310. The first interference member 61 includes a fixed part 611 and a rising part 612. The fixed part 611 is fixed to the door 1310. As shown in FIG. 19, the rising part 612 is attached to the fixed part 611 so as to be rotatable about an axis extending in the up-down direction. The rising part 612 is capable of changing its posture to a standing state (P1901 of FIG. 19) and to a fallen state (P1902 of FIG. 19).

Between the fixed part 611 and the rising part 612, a biasing member is disposed. The biasing member biases the rising part 612 to be in the standing state. When the door 1310 is opened, the rising part 612 is brought into the standing state by the biasing member.

At the proximal end of the rising part 612, a roller 614 is attached. The roller 614 abuts against a restriction piece 613 attached to an edge of the safe housing 131. When the door 1310 open as shown in P1902 of FIG. 19 is rotated in the closing direction, the roller 614 comes into contact with the restriction piece 613, and the rising part 612 is displaced to the fallen state (see P1902). When the door 1310 is closed, the rising part 612 is maintained in the fallen state.

When the rising part 612 is standing, the back side of the mounting unit 9 contacts the distal end of the rising part 612, as shown in P2001 of FIG. 20. This keeps the space between the mounting unit 9 and the door 1310 from being narrower. In this case, the engaging part 1318 and the engaged part 1319 are not engaged with each other. That is, when the door 1310 (and the mounting unit 9) is/are open, the engaging part 1318 and the engaged part 1319 are not engaged with each other.

The second interference member 62 is attached to the back side of the mounting unit 9 as described above. Note that FIG. 17 illustrates only the second interference member 62 and omits illustration of the mounting unit 9, for the sake of easier understanding. As shown in an enlarged view F171, the second interference member 62 is a thin strip-shaped member extending from the back side of the mounting unit 9 toward the door 1310. The second interference member 62 faces the opening/closing handle 133. The second interference member 62 has a cutout part 621 formed at its distal end. The cutout part 621 is open at the distal end of the second interference member 62 and is cutout from the distal end toward the proximal end.

As shown in FIG. 18, when the rotating part 1331 of the opening/closing handle 133 is horizontal, that is, the door 1310 is closed and locked, the second interference member 62 does not interfere with the rotating part 1331 of the opening/closing handle 133. The rotating part 1331 is located in the cutout part 621. The mounting unit 9 can approach the door 1310 to a position covering the door 1310. When the rotating part 1331 is inclined, in other words, when the door 1310 is not closed or when the door 1310 is closed but is not locked, the distal end of the second interference member 62 interferes with the rotating part 1331. The mounting unit 9 cannot approach the door 1310 to a position covering the door 1310. In particular, as shown in P2002 of FIG. 20, while the door 1310 is closed with respect to the safe housing 131, the rising part 612 of the first interference member 61 is in the fallen state as described above and does not interfere with the mounting unit 9. In this case, if the engaging part 1318 and the engaged part 1319 between the mounting unit 9 and the door 1310 are engaged with each other while the opening/closing handle 133 is not locked, the mounting unit 9 and the door 1310 rotate while being integrated each other, as above described. The second interference member 62 avoids engagement between the mounting unit 9 and the door 1310 when the door 1310 is closed.

When the first interference member 61 is not provided and only the second interference member 62 is provided, the mounting unit 9 and the door 1310 are engaged with each other in a state where the door 1310 is opened and the opening/closing handle 133 is horizontal. With both the first interference member 61 and the second interference member 62, engagement of the mounting unit 9 and the door 1310 is restricted in all the states except when the door 1310 is closed and the opening/closing handle 133 is locked.

(Other Configurations of Banknote Handling Device)

Figure 22:
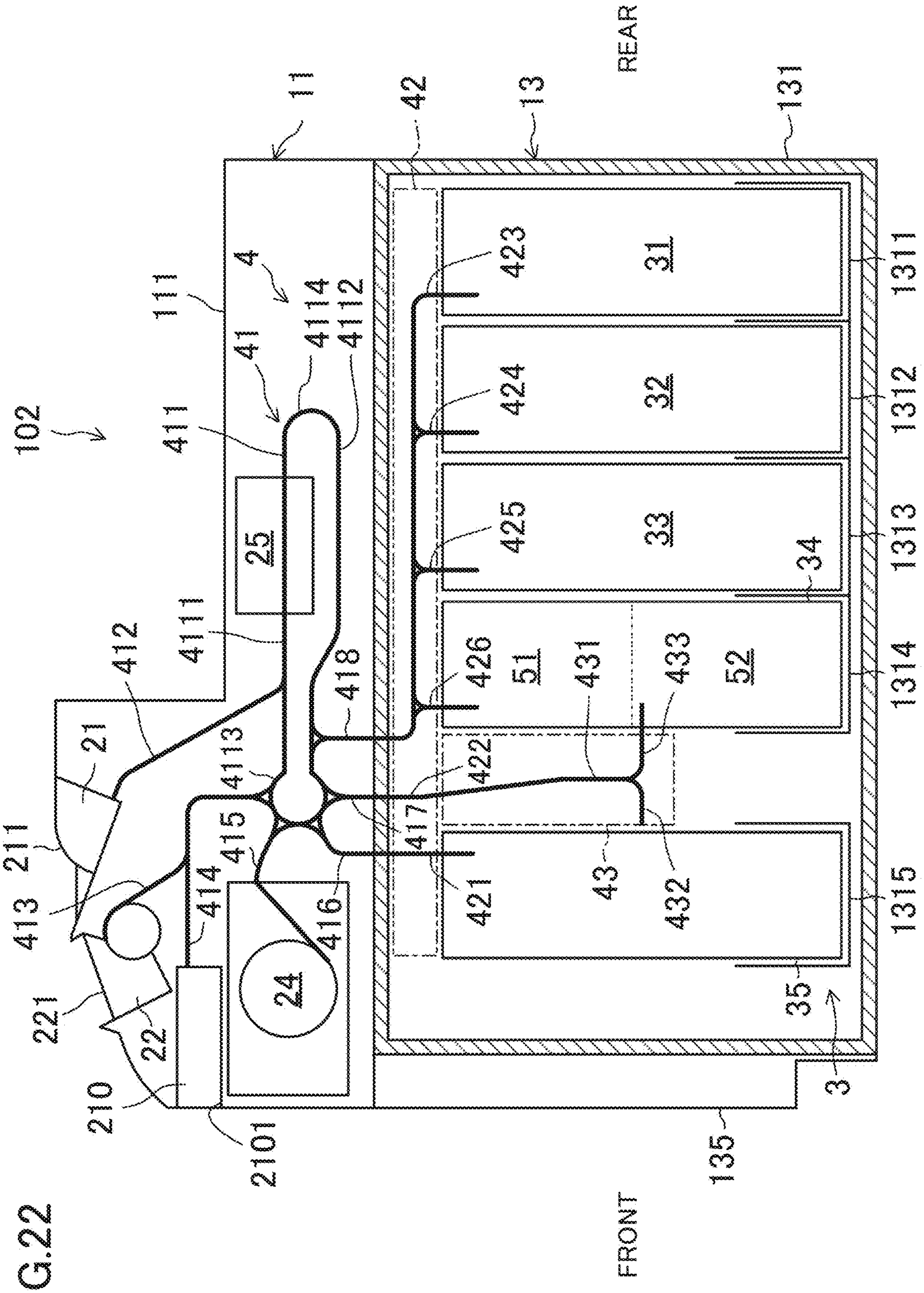
FIG. 22 is a view showing a modification of the banknote handling device having no mounting unit.
Figure 23:
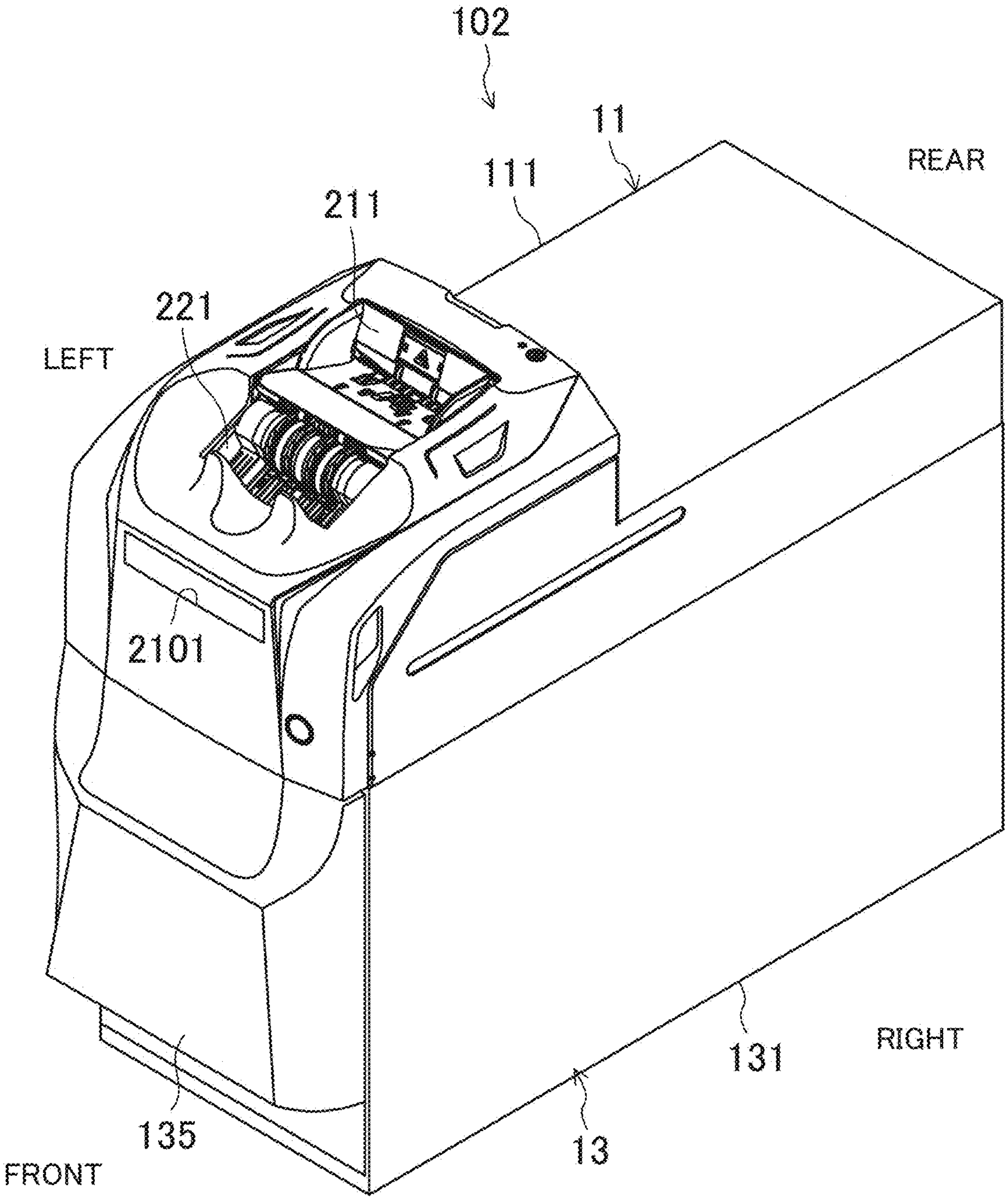
FIG. 23 is a perspective view illustrating an appearance of the banknote handling device having no mounting unit.

The mounting unit 9 described above may be an optional unit in the banknote handling device. That is, the banknote handling device can be configured with the mounting unit 9 removed. FIG. 22 and FIG. 23 illustrate a configuration example of a banknote handling device 102 that does not include a mounting unit. In front of the door 1310 of the safe housing 131, a cover 135 is attached instead of the mounting unit. The cover 135 covers the door 1310. The cover 135 increases the security of the banknote handling device 102 and improves the good appearance of the banknote handling device 102. The cover 135 moves between a state of covering the door 1310 and a state of opening the door 1310.

The banknote handling device 102 does not require the transport module 23. The arrangement position of the transport module 23 may be empty, or another module may be attached. For example, in FIG. 22, a small stacking module 210 is disposed. The stacking module 210 is connected to the fourth transport path 414. The stacking module 210 is capable of storing banknotes.

As shown in FIG. 23, the stacking module 210 may have an opening 2101 positioned on the front surface of the banknote handling device 102. The banknote handling device 102 may be provided with a shutter that opens and closes the opening 2101. When the shutter is open, the operator is able to take out by hand the banknotes stacked in the stacking module 210. The shutter may be omitted, and the opening 2101 may always be open on the front surface of the banknote handling device 102. The stacking module 210 does not have to have an opening.

As shown in FIG. 8, the mounting unit 9 is attached to the outside of the safe housing 131. The height of the mounting unit 9 in the stowed state does not exceed the height H of the safe housing 131. The mounting unit 9 is compact. Further, the mounting unit 9 is connected to the handling unit 11 only in the unfolded state. Therefore, the handling unit 11 and the safe unit 13 of the banknote handling device 1 having the mounting unit 9 can be used as the handling unit 11 and the safe unit 13 of the banknote handling device 102 without the mounting unit 9.

Figure 25:
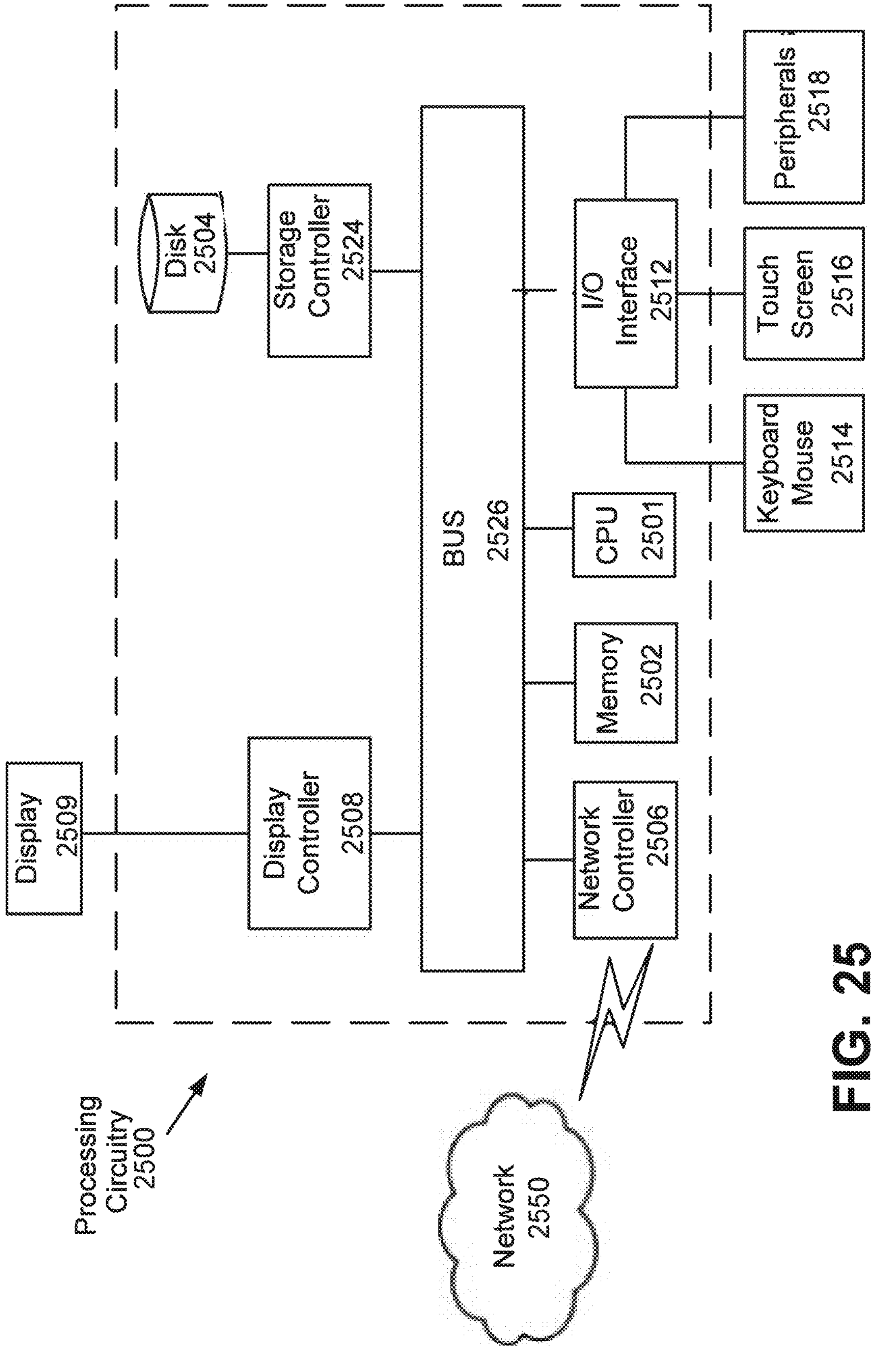
FIG. 25 is a block diagram of processing circuitry that performs computer-based operations in accordance with the present disclosure.

FIG. 25 is a block diagram of processing circuitry that performs computer-based operations in accordance with the present disclosure. FIG. 25 illustrates processing circuitry 2500 which is included in or encompasses controller 15, which is a component of the banknote handling device 1.

Processing circuitry 2500 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 25, the processing circuitry 2500 includes a CPU 2501 which performs one or more of the control processes discussed in this disclosure. The process data and instructions may be stored in memory 2502. These processes and instructions may also be stored on a storage medium disk 2504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 2500 communicates, such as a server or computer. The processes may also be stored in network based storage, cloud-based storage or other mobile accessible storage and executable by processing circuitry 2500.

Further, the claimed advancements may be provided as a utility application, background daemon, or component of an operating system, or combination thereof, executing in conjunction with CPU 2501 and an operating system such as Microsoft Windows, UNIX, Solaris, LINUX, Apple MAC-OS, Apple iOS and other systems known to those skilled in the art.

The hardware elements in order to achieve the processing circuitry 2500 may be realized by various circuitry elements. Further, each of the functions of the above described embodiments may be implemented by circuitry, which includes one or more processing circuits. A processing circuit includes a particularly programmed processor, for example, processor (CPU) 2501, as shown in FIG. 25. A processing circuit also includes devices such as an application specific integrated circuit (ASIC) and conventional circuit components arranged to perform the recited functions.

In FIG. 25, the processing circuitry 2500 may be a computer or a particular, special-purpose machine. Processing circuitry 2500 is programmed to execute processing to control the banknote handling device 1.

Alternatively, or additionally, the CPU 2501 may be implemented on an FPGA, ASIC, PLD or using discrete logic circuits, as one of ordinary skill in the art would recognize. Further, CPU 2501 may be implemented as multiple processors cooperatively working in parallel to perform the instructions of the inventive processes described above.

The processing circuitry 2500 in FIG. 25 also includes a network controller 2506, such as an Ethernet PRO network interface card, for interfacing with network 2550. As can be appreciated, the network 2550 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 2550 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 2506 may be compliant with other direct communication standards, such as Bluetooth, a near field communication (NFC), infrared ray or other. The processing circuitry 2500 further includes a display controller 2508, such as a graphics card or graphics adaptor for interfacing with display 2509, such as a monitor. An I/O interface 2512 interfaces with a keyboard and/or mouse 2514 as well as a touch screen panel 2516 on or separate from display 2509. I/O interface 2512 also connects to a variety of peripherals 2518. The storage controller 2524 connects the storage medium disk 2504 with communication bus 2526, which may be an ISA, EISA, VESA, PCI, or similar, for interconnecting all of the components of the processing circuitry 2500. A description of the general features and functionality of the display 2509, keyboard and/or mouse 2514, as well as the display controller 2508, storage controller 2524, network controller 2506, and I/O interface 2512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Note that the technique disclosed herein is not limited to a banknote handling device, and is widely applicable to medium handling devices that handle a medium.

What is claimed is:

1. A medium handling device, comprising:

a first portion of the medium handling device, wherein the first portion includes a first transport that transports a medium along a first transport path, a recognition circuit that recognizes the medium that has been transported by the first transport, and a connection port to the first transport path;

a second portion of the medium handling device, wherein the second portion includes an internal storage that stores the medium to be transported to or from the first portion; and a third portion of the medium handling device, wherein the third portion includes a mounter on which an external cassette that stores the medium is mounted and a second transport that transports the medium along a second transport path between the external cassette and the first transport, wherein at least a part of the third portion is supported by the second portion on an outside of the second portion, the second transport is moved to connect to the first transport path via the connection port when the third portion is used, the third portion has a link mechanism that moves the second transport between a state in which the second transport path connects to the first transport path and a state in which the second transport path does not connect to the first transport path, the first portion is positioned above the second portion, the third portion is positioned on a lateral side of the second portion, and the second transport moves upward from the lateral side of the second portion to connect the second transport path to the first transport path, and after the upward movement, the second transport path is positioned above the external cassette mounted on the mounter.

2. The medium handling device of claim 1, wherein the mounter deforms in conjunction with the movement of the second transport.

3. The medium handling device of claim 2, wherein the mounter deforms from a state that does not allow mounting of the external cassette to a state that allows mounting of the external cassette, in conjunction with the movement of the second transport so as to connect the second transport path to the first transport path.

4. The medium handling device of claim 2, wherein after the second transport moves upward from a position on the lateral side of the second portion, the external cassette mounted on the mounter is disposed below the second transport and in a space of the second transport before the movement of the second transport.

5. The medium handling device of claim 2, wherein the third portion further includes a coupling mechanism that couples the second transport to the mounter, and transmits the movement of the second transport to the mounter, and the coupling mechanism has a torque limiter provided between the second transport and the mounter.

6. The medium handling device of claim 2, wherein the second transport reciprocates in a curved manner around a first axis extending in a horizontal direction, and the mounter swings about a second axis parallel to the first axis.

7. The medium handling device of claim 6, wherein the first transport path includes a first engagement part arranged at the connection port, the second transport path includes a second engagement part that engages with the first engagement part, the connection port is positioned on a side face of the first portion, and the second engagement part engages with the first engagement part by having the second transport approach the connection port substantially in the horizontal direction.

8. The medium handling device of claim 1, wherein the mounter moves in a direction away from the second portion to be in the state that allows mounting of the external cassette.

9. The medium handling device of claim 1, wherein the second portion includes an opening/closing door, and the third portion is located at a position covering the opening/closing door.

10. The medium handling device of claim 9, wherein the third portion is supported by the second portion so as to move from a position covering the opening/closing door to a position where the opening/closing door is exposed.

11. The medium handling device of claim 10, wherein the second transport path is open when the third portion is positioned at the position where the opening/closing door is exposed.

12. The medium handling device of claim 10, wherein the third portion includes:
a first handle operated when the second transport is moved away from the mounter, and
a second handle operated when the third portion is moved without moving the second transport away from the mounter.

13. The medium handling device of claim 12, wherein the third portion locks the second handle when the first handle is operated, and locks the first handle when the second handle is operated.

14. The medium handling device of claim 12, wherein the third portion further includes a release switch, and the first handle is operable after the release switch is operated.

15. The medium handling device of claim 12, wherein the first portion further includes a shutter provided at the connection port, and the shutter operates based on a signal of a sensor that detects an operation of the first handle.

16. The medium handling device of claim 1, wherein the mounter has a first surface, the second transport has a second surface, the first surface and the second surface are substantially continuous without a step in a non-using state of the third portion, and the first surface and the second surface are not continuous in a using state of the third portion.

17. The medium handling device of claim 16, wherein the first surface covers at least a part of the external cassette, while the external cassette is mounted on the mounter.

18. The medium handling device of claim 1, wherein in the non-using state of the third portion, the third portion protrudes from the outer surface of the first portion.

19. The medium handling device of claim 1, wherein the internal storage includes an internal cassette and a second mounter on which the internal cassette is detachably mounted, and the external cassette is mountable on the second mounter.

20. A medium handling device comprising:
a first portion of the medium handling device, wherein the first portion includes a first transport that transports a medium along a first transport path, a recognition circuit that recognizes the medium that has been transported by the first transport, and a connection port to the first transport path;
a second portion of the medium handling device, wherein the second portion includes an internal storage that stores the medium to be transported to or from the first portion; and
a third portion of the medium handling device, wherein the third portion includes a mounter on which an external cassette that stores the medium is mounted and a second transport that transports the medium along a second transport path between the external cassette and the first transport, wherein
at least a part of the third portion is supported by the second portion on an outside of the second portion,
the second transport is moved, when the third portion is used, to be connected to the first transport path via the connection port, and to be positioned above the external cassette mounted on the mounter after the movement,
the third portion has a link mechanism that moves the second transport between a state in which the second transport path connects to the first transport path and a state in which the second transport path does not connect to the first transport path,
the link mechanism has a first arm and a second arm that are arranged to face each other,
a first end portion of the first arm is rotatably supported by a support of the third portion, and a second end portion of the first arm is rotatably supported by the second transport,
a first end portion of the second arm is rotatably supported by the support of the third portion, and a second end portion of the second arm is rotatably supported by the second transport, and
the second transport reciprocates in a curved manner around an axis extending in a horizontal direction as the first arm and the second arm rotate about their respective first end portions as fulcrums.

21. A medium handling device, comprising:
a first portion of the medium handling device, wherein the first portion includes a first transport that transports a medium along a first transport path, a recognition circuit that recognizes the medium that has been transported by the first transport, and a connection port to the first transport path;
a second portion of the medium handling device, wherein the second portion includes an internal storage that stores the medium to be transported to or from the first portion; and
a third portion of the medium handling device, wherein the third portion includes a mounter on which an external cassette that stores the medium is mounted and a second transport that transports the medium along a second transport path between the external cassette and the first transport, wherein at least a part of the third portion is supported by the second portion on an outside of the second portion, the second transport is moved, when the third portion is used, to be connected to the first transport path via the connection port, and to be positioned above the external cassette mounted on the mounter after the movement, the first portion is positioned above the second portion, the third portion is positioned on a lateral side of the second portion, the second transport moves upward from the lateral side of the second portion to position the second transport path on a lateral side of the first portion and to connect the second transport path to the first transport path, and after the second transport moves upward from the lateral side of the second portion, the external cassette mounted on the mounter is positioned below the second transport and in a space of the second transport before the movement of the second transport and the external cassette is connected to the second transport path.

* * * * *